United States Patent
Kim et al.

(10) Patent No.: US 9,244,601 B2
(45) Date of Patent: Jan. 26, 2016

(54) METHOD FOR PROVIDING A USER INTERFACE BASED ON TOUCH PRESSURE, AND ELECTRONIC DEVICE USING SAME

(75) Inventors: Kun Nyun Kim, Yongin-si (KR); Kwang Bum Park, Yongin-si (KR); Won Hyo Kim, Yongin-si (KR); Kang Ryeol Lee, Yongin-si (KR); Kyeung Hak Seo, Seoul (KR)

(73) Assignee: KOREA ELECTRONICS TECHNOLOGY INSTITUTE, Seongnam-Si, Gyeonggi-Di (KR)

( * ) Notice: Subject to any disclaimer, the term of this patent is extended or adjusted under 35 U.S.C. 154(b) by 213 days.

(21) Appl. No.: 13/375,362

(22) PCT Filed: Jan. 20, 2011

(86) PCT No.: PCT/KR2011/000405
§ 371 (c)(1),
(2), (4) Date: Nov. 30, 2011

(87) PCT Pub. No.: WO2011/090324
PCT Pub. Date: Jul. 28, 2011

(65) Prior Publication Data
US 2012/0274662 A1    Nov. 1, 2012

(30) Foreign Application Priority Data

Jan. 22, 2010  (KR) ................. 10-2010-0006177
Dec. 30, 2010  (KR) ................. 10-2010-0139579
Dec. 30, 2010  (KR) ................. 10-2010-0139604

(51) Int. Cl.
G09G 5/00     (2006.01)
G06F 3/0484   (2013.01)
G06F 3/0488   (2013.01)
G11B 27/10    (2006.01)
G11B 27/34    (2006.01)

(52) U.S. Cl.
CPC .......... *G06F 3/04847* (2013.01); *G06F 3/0488* (2013.01); *G11B 27/10* (2013.01); *G11B 27/34* (2013.01); *G06F 2203/04806* (2013.01)

(58) Field of Classification Search
None
See application file for complete search history.

(56) References Cited

U.S. PATENT DOCUMENTS 6,388,655 B1 *  5/2002  Leung ............................ 345/157
8,209,628 B1 *  6/2012  Davidson ....................... 715/790
(Continued)

FOREIGN PATENT DOCUMENTS

CN       1194691     9/1998
CN      201222239    4/2009
(Continued)

OTHER PUBLICATIONS

International Search Report dated Oct. 31, 2011 from PCT/KR2011/000405.

*Primary Examiner* — Ryan R Yang
*Assistant Examiner* — Anh-Tuan V Nguyen
(74) *Attorney, Agent, or Firm* — Hauptman Ham, LLP

(57) ABSTRACT

A method for providing a User Interface (UI) based on a touch pressure and an electronic device using the same are provided. The UI providing method of the electronic device detects a touch pressure of a single touch input through a touch screen of the electronic device, and controls the electronic device based on the touch pressure. Since various UIs can be provided based on the touch pressure applied by the user in the touch screen, user convenience and entertainment can be improved.

14 Claims, 95 Drawing Sheets

(56) References Cited

U.S. PATENT DOCUMENTS

| | | | |
|---|---|---|---|
| 8,286,199 B1* | 10/2012 | Pulaski et al. | 719/329 |
| 2001/0024195 A1* | 9/2001 | Hayakawa | G06F 3/04847 345/173 |
| 2006/0132457 A1* | 6/2006 | Rimas-Ribikauskas et al. | 345/173 |
| 2006/0161870 A1* | 7/2006 | Hotelling et al. | 715/863 |
| 2007/0124697 A1* | 5/2007 | Dongelmans | 715/805 |
| 2007/0150842 A1* | 6/2007 | Chaudhri et al. | 715/863 |
| 2007/0200775 A1* | 8/2007 | Hirota | 343/702 |
| 2008/0256472 A1* | 10/2008 | Kim et al. | 715/769 |
| 2009/0046110 A1 | 2/2009 | Sadler et al. | |
| 2009/0095541 A1* | 4/2009 | Lee | 178/18.03 |
| 2009/0135147 A1* | 5/2009 | Hsu et al. | 345/173 |
| 2009/0160793 A1* | 6/2009 | Rekimoto | 345/173 |
| 2010/0005390 A1* | 1/2010 | Bong | 715/702 |
| 2010/0079380 A1* | 4/2010 | Nurmi | 345/172 |
| 2010/0099394 A1* | 4/2010 | Hainzl | 455/418 |
| 2010/0156807 A1* | 6/2010 | Stallings et al. | 345/173 |
| 2010/0156818 A1* | 6/2010 | Burrough et al. | 345/173 |
| 2010/0257490 A1* | 10/2010 | Lyon et al. | 715/863 |
| 2010/0277432 A1* | 11/2010 | Tsai | 345/174 |
| 2010/0315337 A1* | 12/2010 | Ferren et al. | 345/158 |
| 2011/0080341 A1* | 4/2011 | Helmes et al. | 345/163 |
| 2011/0134047 A1* | 6/2011 | Wigdor et al. | 345/173 |

FOREIGN PATENT DOCUMENTS

| | | |
|---|---|---|
| CN | 101566920 | 10/2009 |
| CN | 101620507 | 1/2010 |
| JP | 2004-206178 A | 7/2004 |
| JP | 2008-508628 A | 3/2008 |
| KR | 2009-0011367 A | 2/2009 |
| KR | 2009-0050109 A | 5/2009 |

* cited by examiner

| Annunciator |
|:---:|
| Home View |

210  220

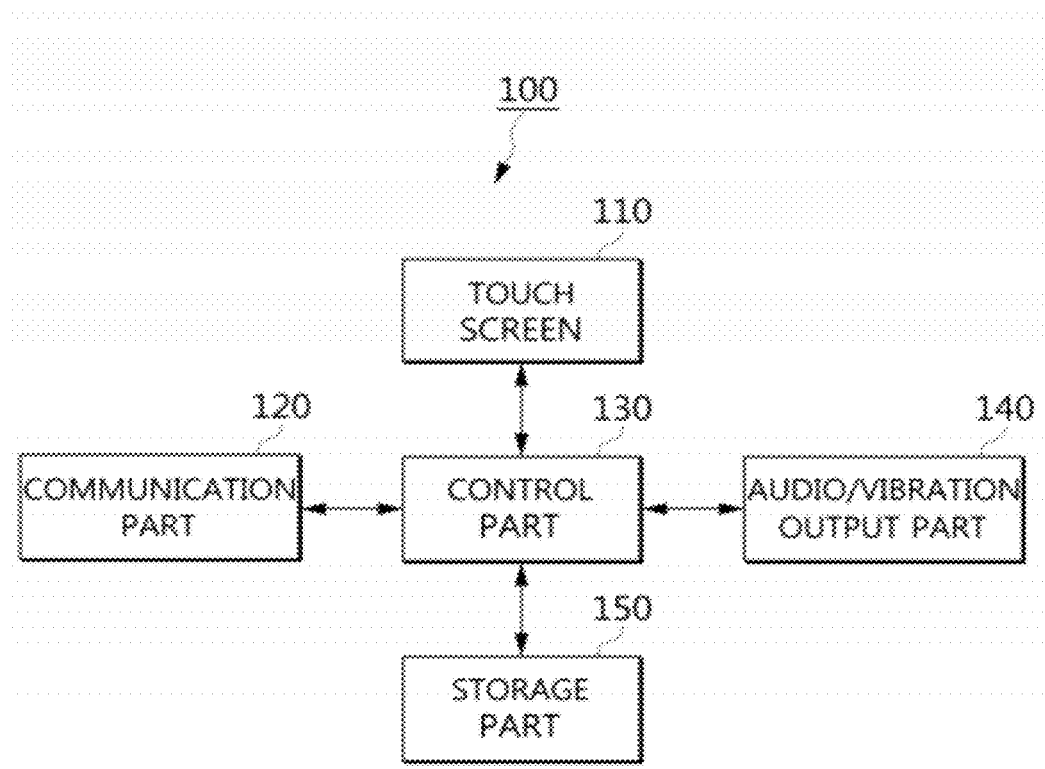

METHOD FOR PROVIDING A USER INTERFACE BASED ON TOUCH PRESSURE, AND ELECTRONIC DEVICE USING SAME

TECHNICAL FIELD OF THE INVENTION

The present invention relates generally to a User Interface (UI) providing method and an electronic device using the same. More particularly, the present invention relates to a UI providing method for receiving a user command through a touch screen, and an electronic device using the same.

BACKGROUND OF THE INVENTION

There are various input devices for efficiently inputting characters in an electronic device such as mobile device. Representative input methods include the input using a button, the input using the pointing, the input using a touch screen, and so on.

In recent, in accordance with advances of touch device technology, various touch pads or touch screens and touch devices are applied to the mobile device. Using the touch device, a user can input information or a command through the touch device and thus there is no need to attach a separate input device to the mobile device. As recognition and accuracy of the touch device gradually enhance, the mobile devices including the touch device are increasing.

However, despite the technical advances of the touch device, a user interface for fully utilizing the features of the device is insufficient. For example, a mobile device including only the touch device as the input device can be more awkward than a conventional mobile device using key buttons in terms of the user.

FIG. 1 is a perspective view of a conventional mobile device. The mobile device 10 includes a touch screen including a display 11 and a transparent touch screen 12 disposed on the display 11. The transparent touch screen is an input device for detecting user touch. The user communicates with a Graphical User Interface (GUI) on the display 11.

For example, using the touch screen 12, the user can select or set the GUI by moving an input pointer or selecting a GUI element.

The touch screen can sense locations touched by a plurality of fingers in the time order of T1, T2, T3 and T4 as shown in FIG. 1, and thus enlarge, reduce, scroll, or move contents such as character or image.

SUMMARY OF THE INVENTION

To address the above-discussed deficiencies of the prior art, it is a primary aspect of the present invention to provide a method for providing a touch pressure based UI providing method for providing various UIs based on a pressure of the touch applied by a user in a touch screen, and an electronic device using the same.

According to one aspect of the present invention, a method for providing a User Interface (UI) of an electronic device, includes detecting a touch pressure of a single touch input through a touch screen of the electronic device; and controlling the electronic device based on the touch pressure.

The controlling operation may adjust a size or a zoom of a Graphical User Interface (GUI) element displayed in the touch screen, based on the touch pressure.

The controlling operation may control a speed of the GUI element displayed in the touch screen, based on the touch pressure.

When the size or zoom control object is changed to other GUI element, the controlling operation may adjust a size or a zoom of the other GUI element changed.

The controlling operation may control at least one of a size, a movement, and a rotation of the GUI element displayed in the touch screen, based on the touch pressure.

The controlling operation may control at least one of a thickness, a saturation, and a color of the GUI element displayed in the touch screen, based on the touch pressure.

The controlling operation may control a speed of the GUI element displayed in the touch screen, based on the touch pressure.

The speed of the GUI element may be any one of a speed for moving the GUI element, a speed for turning the GUI element, and a speed for playing the GUI element.

The controlling operation may control movement of the GUI element given a weight, based on the touch pressure.

The controlling operation may control at least one of an acoustic output and a tactile output of the electronic device, based on the touch pressure.

The controlling operation may select or execute a different menu item based on the touch pressure.

The controlling operation may control a mode of the electronic device based on the touch pressure.

The controlling operation may unlock the electronic device based on the touch pressure.

The controlling operation may control a wireless output of the electronic device based on the touch pressure.

An electronic device includes a touch screen for detecting a touch pressure of a single touch input by a user; and a control part for controlling operations based on the touch pressure.

According to another aspect of the present invention, a method for providing a UI of an electronic device includes detecting touch pressures of multi-touch input through a touch screen of the electronic device; and controlling the electronic device based on the touch pressures.

The controlling operation may adjust a size or a zoom of GUI elements displayed in the touch screen, based on the touch pressures.

The controlling operation may adjust a size of the GUI element, based on a first point multi-touched, in a direction from the first point to a second point multi-touched.

The touch pressure applied to the second point may be greater than the touch pressure applied to the second point.

The controlling operation may control at least one of a size, a movement, and a rotation of the GUI elements displayed in the touch screen, based on the touch pressures.

The controlling operation may control at least one of a size, a movement, and a rotation of the GUI element displayed in the touch screen, based on a combination of the touch pressures.

The controlling operation may control at least one of a thickness, a saturation, and a color of the GUI elements displayed in the touch screen, based on the touch pressures.

The controlling operation may control a speed of the GUI elements displayed in the touch screen, based on the touch pressures.

The controlling operation may control a speed of the GUI element displayed in the touch screen, based on a combination of the touch pressures.

The controlling operation may control movement of the GUI elements given a weight, based on the touch pressures.

The controlling operation may control at least one of an acoustic output and a tactile output of the electronic device in three dimensions, based on the touch pressures.

When the touch pressures of the first point and the second point which are multi-touched are a second touch pressure greater than a first touch pressure, the controlling operation may provide a list of menu items of the GUI element.

The controlling operation may provide the list of the menu items of the GUI element in a region of the first point and the second point which are multi-touched.

The controlling operation may control a wireless output of the electronic device in three dimensions, based on the touch pressures.

An electronic device includes a touch screen for detecting touch pressures of multi-touch input by a user; and a control part for controlling operations based on the touch pressures.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 39 through 75 are diagrams of function setting/execution according to the single touch pressure;

FIG. 98 is a block diagram of an electronic device for providing the UIs.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents.

1. Classification of Touch Manipulations

Figure 1:
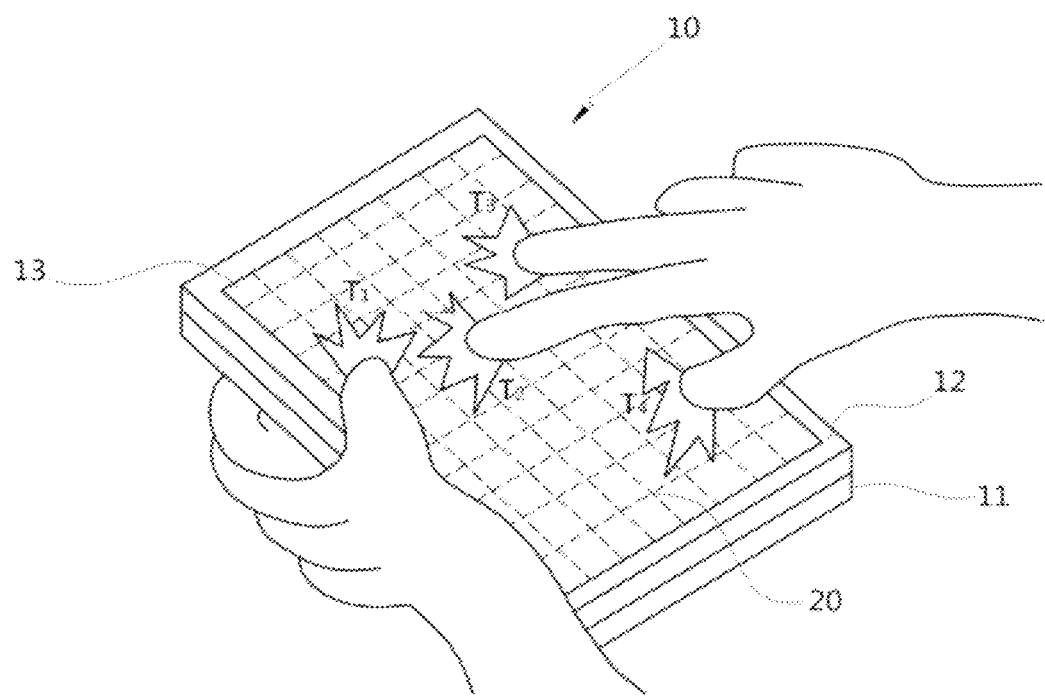
FIG. 1 is a perspective view of a conventional mobile device.
Figure 2:
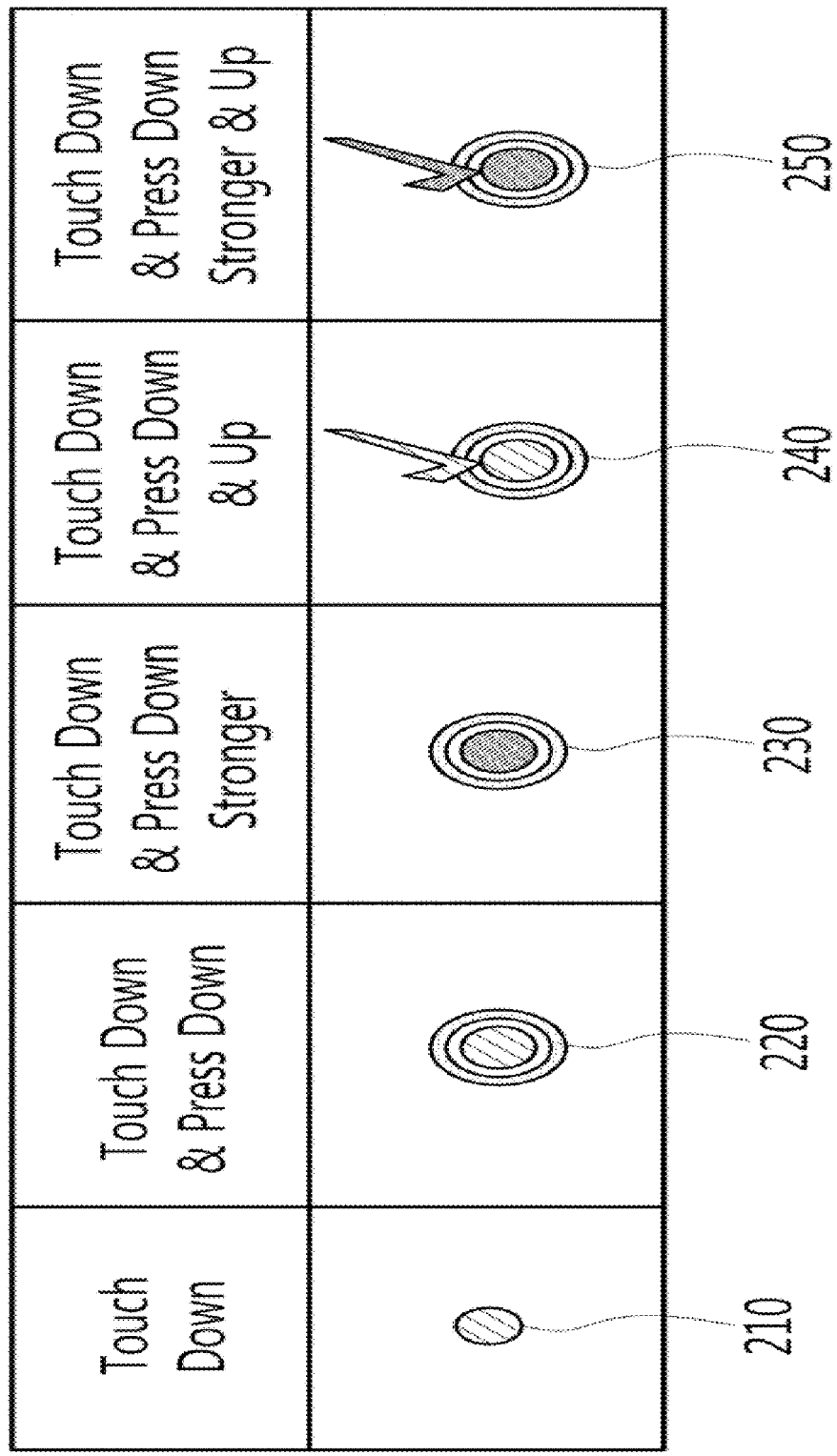
FIG. 2 is a table of legends for classifying touch manipulations of a user.

FIG. 2 is a table of legends for classifying touch manipulations of a user. In FIG. 2, 1) Touch Down 210 is the touch on a touch screen with a low pressure,
2) Touch Down & Press Down 220 is the touch on the touch screen with a high pressure,
3) Touch Down & Press Down & Stronger 230 further increases the pressure after the Touch Down & Press Down 220,
4) Touch Down & Press Down & Up 240 releases the touch (i.e., detaches a finger from the touch screen) after the Touch Down & Press Down 220, and
5) Touch Down & Press Down & Stronger & Up 250 releases the touch (i.e., detaches the finger from the touch screen) after the Touch Down & Press Down & Stronger 230.

Hereinafter, various User Interfaces (UIs) for controlling those manipulations are provided. The various UIs include Graphical User Interface (GUI) elements.

The GUI element is an element which is displayed in the touch screen, such as icon, widget, graphic controller, text, contents, and application execution window, provides information and contents, and manipulated.

2. Single Touch 2.1 Size/Zoom Adjustment According to the Touch Pressure

A size of the GUI element touched can be adjusted according to the touch pressure. In detail, 1) when the user's touch pressure for the GUI element is great, the size of the GUI element can be increased, and 2) when the user's touch pressure for the GUI element is small, the size of the GUI element can be decreased.

Figure 3:
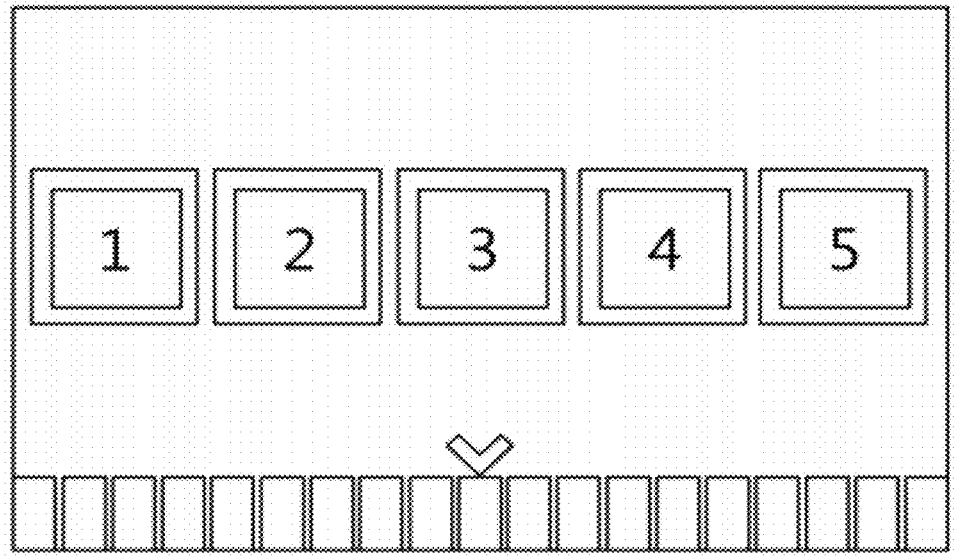
FIGS. 3 through 14 are diagrams of size/zoom adjustment according to a input touch pressure.
Figure 4:
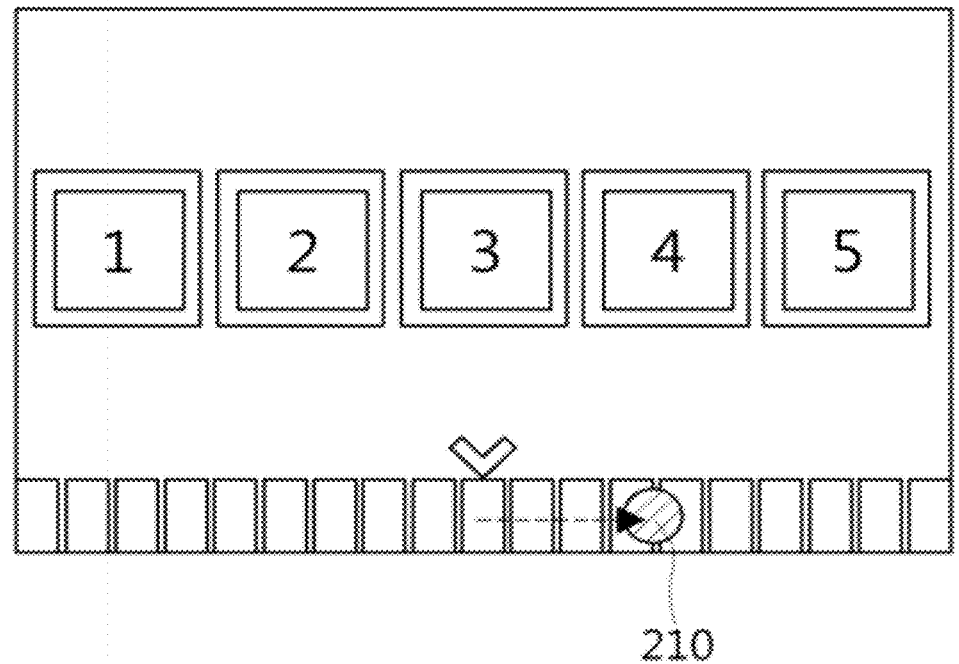
Figure 5:
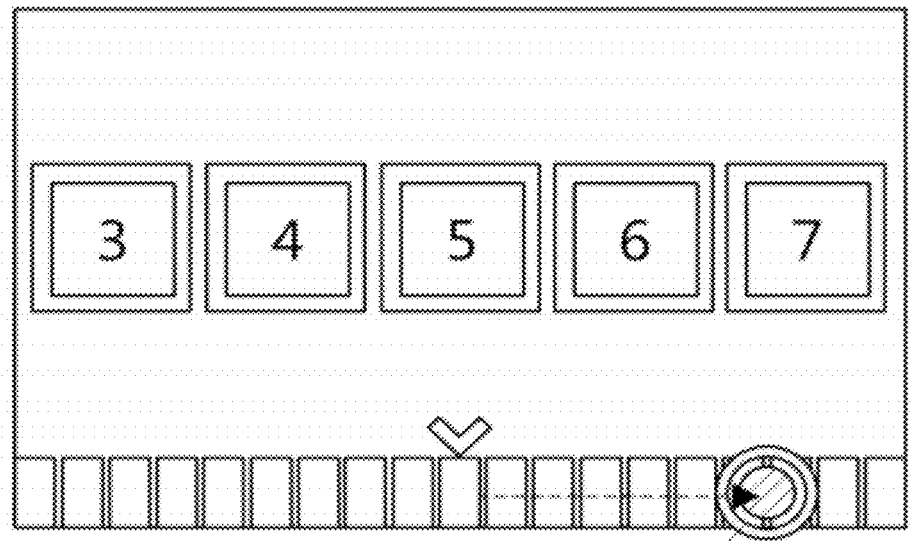

When a plurality of contents 1 through 5 is arranged in the touch screen as shown in FIG. 3 and the Touch Down 210 is applied to the right part of a scroll bar displayed at the bottom as shown in FIG. 4, the displayed contents are scrolled to increase their sequences as shown in FIG. 5.

As such, when the touch point in the scroll bar is on the right side, the scroll increases the sequence of the contents. As the touch point goes more to the right, the scroll speed accelerates.

Figure 6:
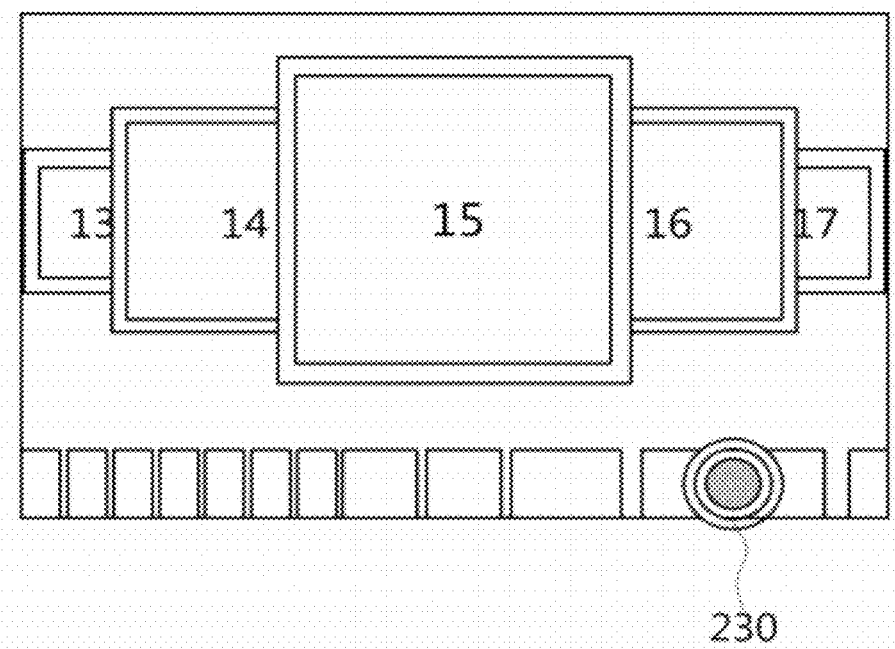

Meanwhile, when the touch manipulation is changed to the Touch Down & Press Down 220 as shown in FIG. 5, the scroll speed decreases and the content at the center is enlarged as shown in FIG. 6.

Figure 7:
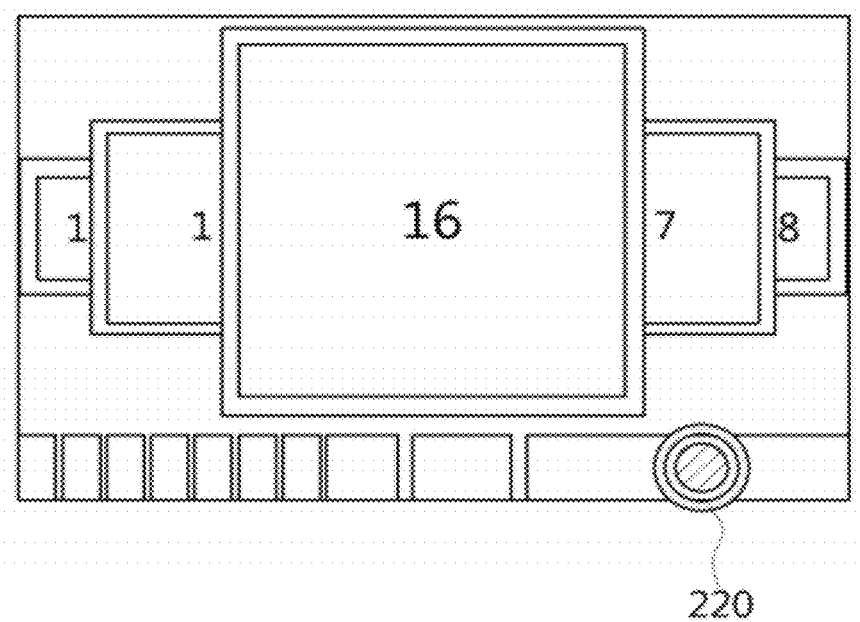

When the touch manipulation is changed to the Touch Down & Press Down & Stronger 230 as shown in FIG. 6, the scroll speed further decreases and the content at the center is enlarged even more as shown in FIG. 7.

When the touch manipulation is changed to the Touch Down & Press Down 220 in FIG. 7, the content at the center is reduced but the scroll speed increases. In this situation, when the touch manipulation is changed to the Touch Down 210, the content at the center is further reduced but the scroll speed far more increases.

Figure 8:
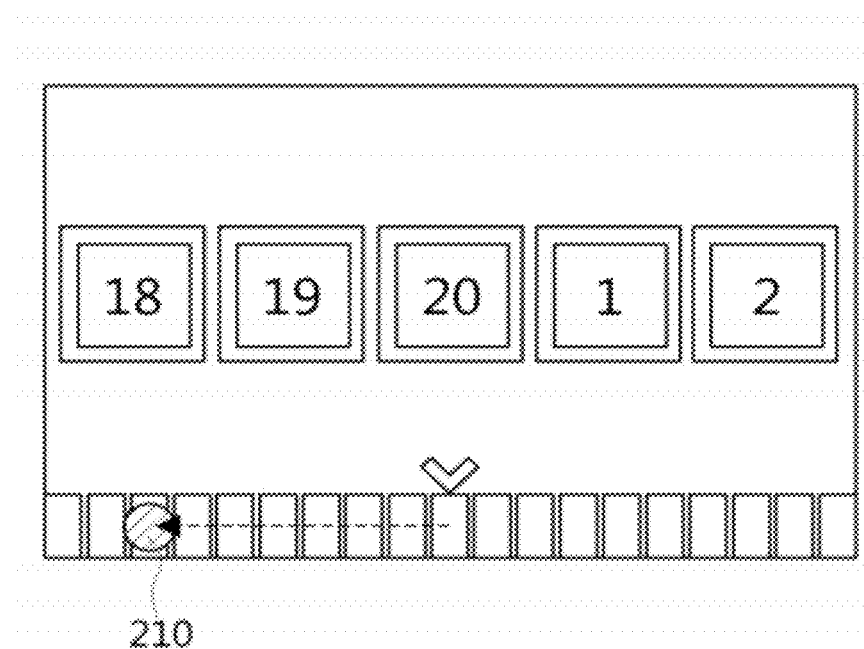

When the touch point in the scroll bar is on the left side, the scroll decreases the sequence of the contents. As the touch point goes more to the left, the scroll speed accelerates in the same manner as the right side. Accordingly, when the plurality of contents 1 through 5 is arranged in the touch screen as shown in FIG. 3 and the Touch Down 210 is applied to the left part of the scroll bar displayed at the bottom as shown in FIG. 8, the displayed contents are scrolled to decrease the sequence.

1) When the user's touch pressure to the content displayed in the touch screen is great, the content is zoomed in, and 2) when the user's touch pressure to the content is small, the content is zoomed out, which are explained in detail.

Figure 9:
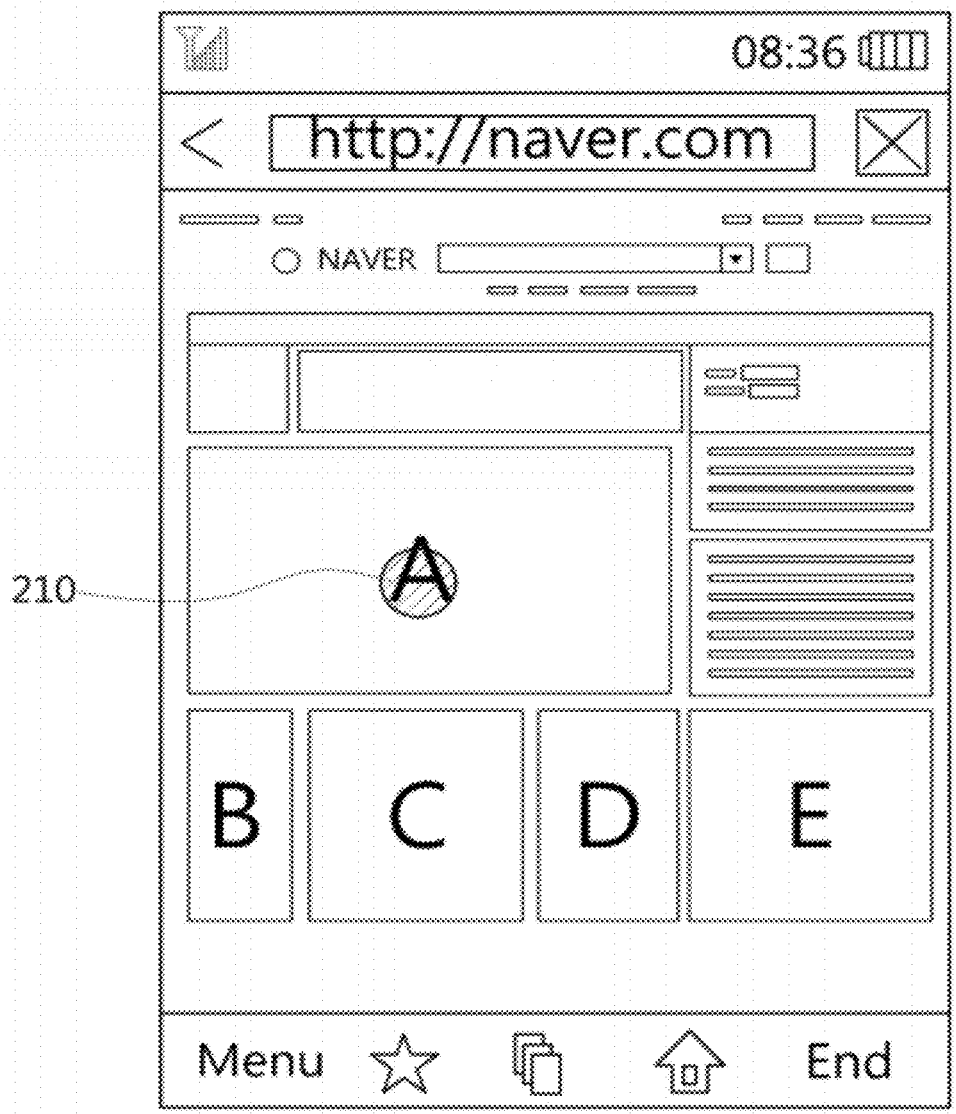
Figure 10:
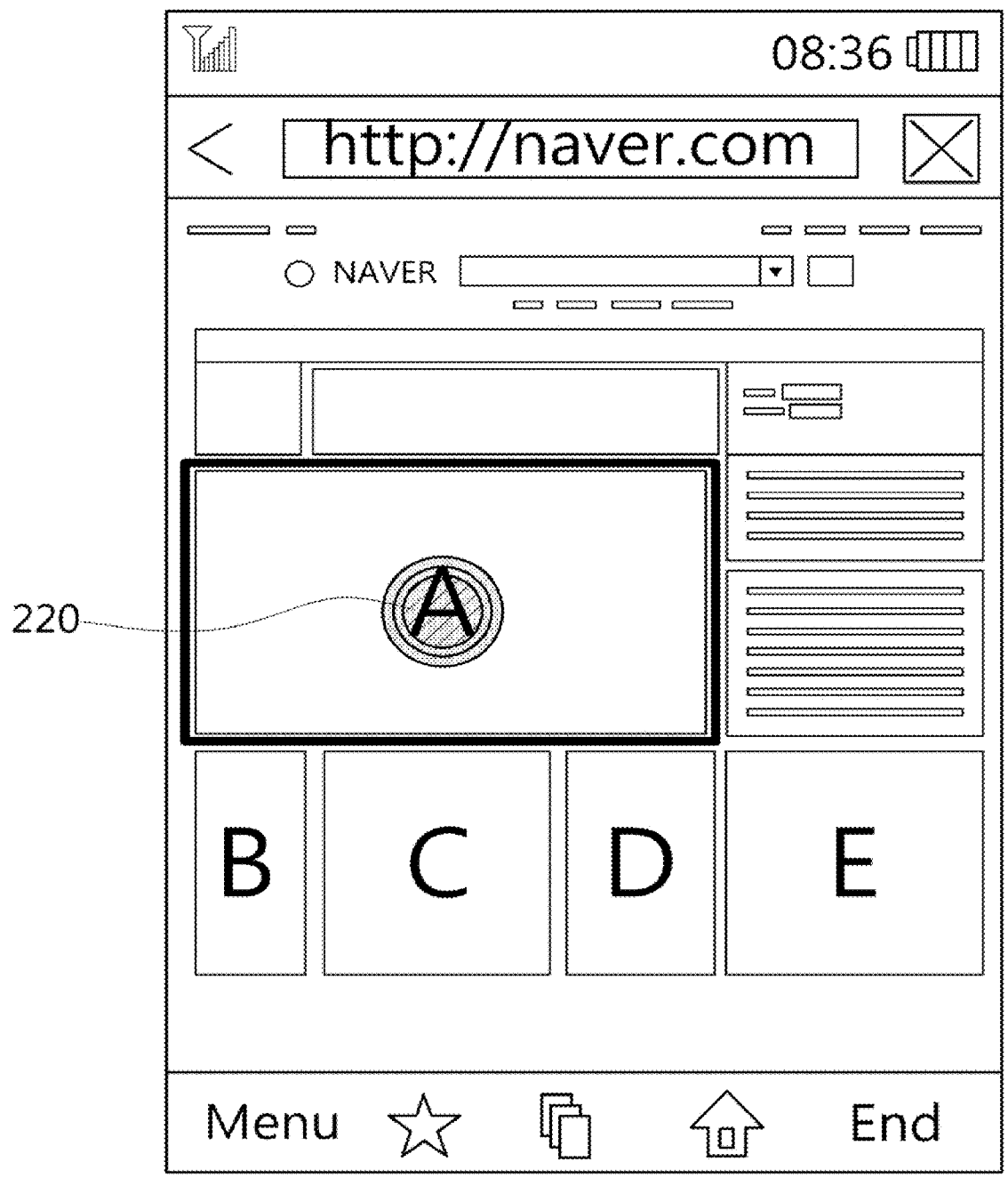
Figure 11:
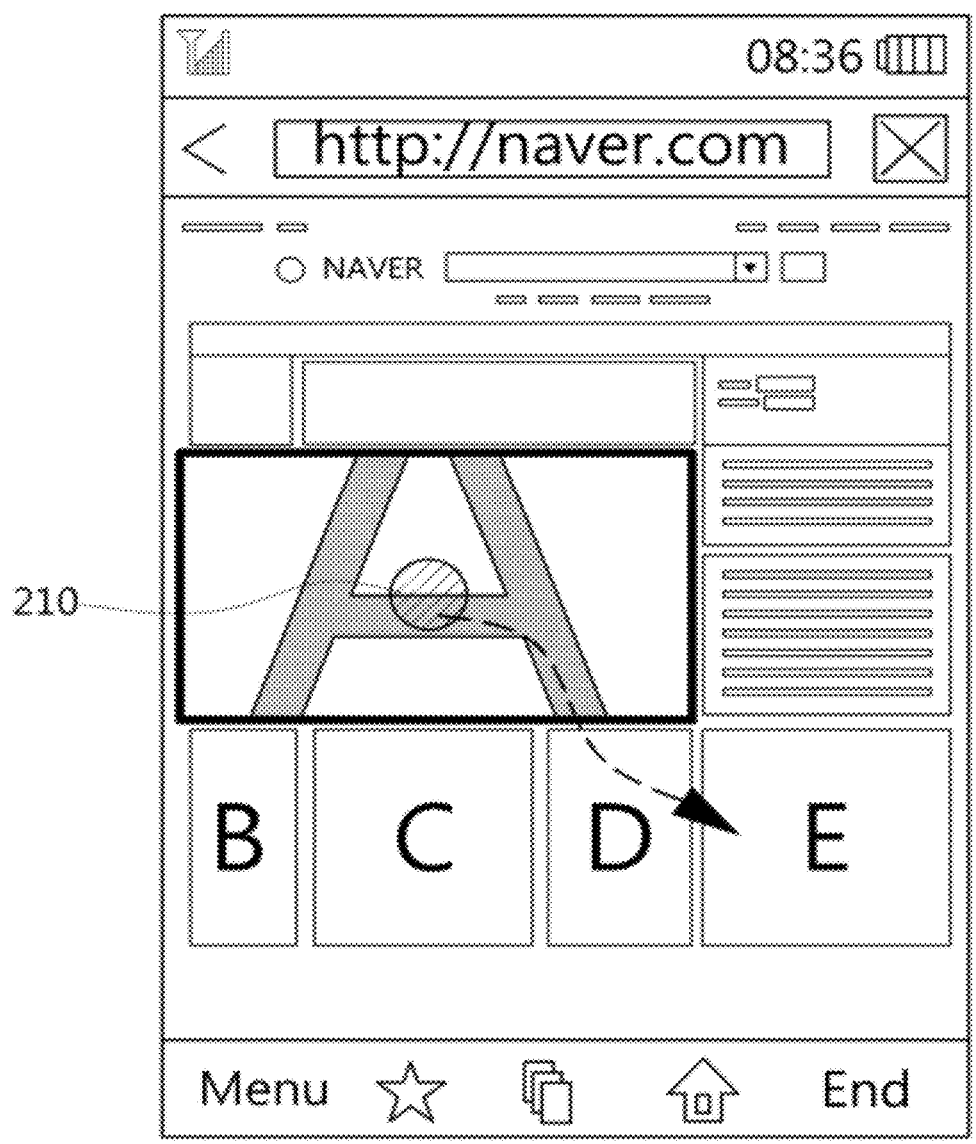

When the Touch Down 210 is applied to a block A in a web browser as shown in FIG. 9, an enlargement frame appears around borders of the block A as shown in FIG. 10. Next, when the touch manipulation is changed to the Touch Down & Press Down 220 in FIG. 10, contents of the block A in the enlargement frame are zoomed in as shown in FIG. 11. The contents of the block A can be various, such as image, text, and a combination of the image and the text.

Figure 12:
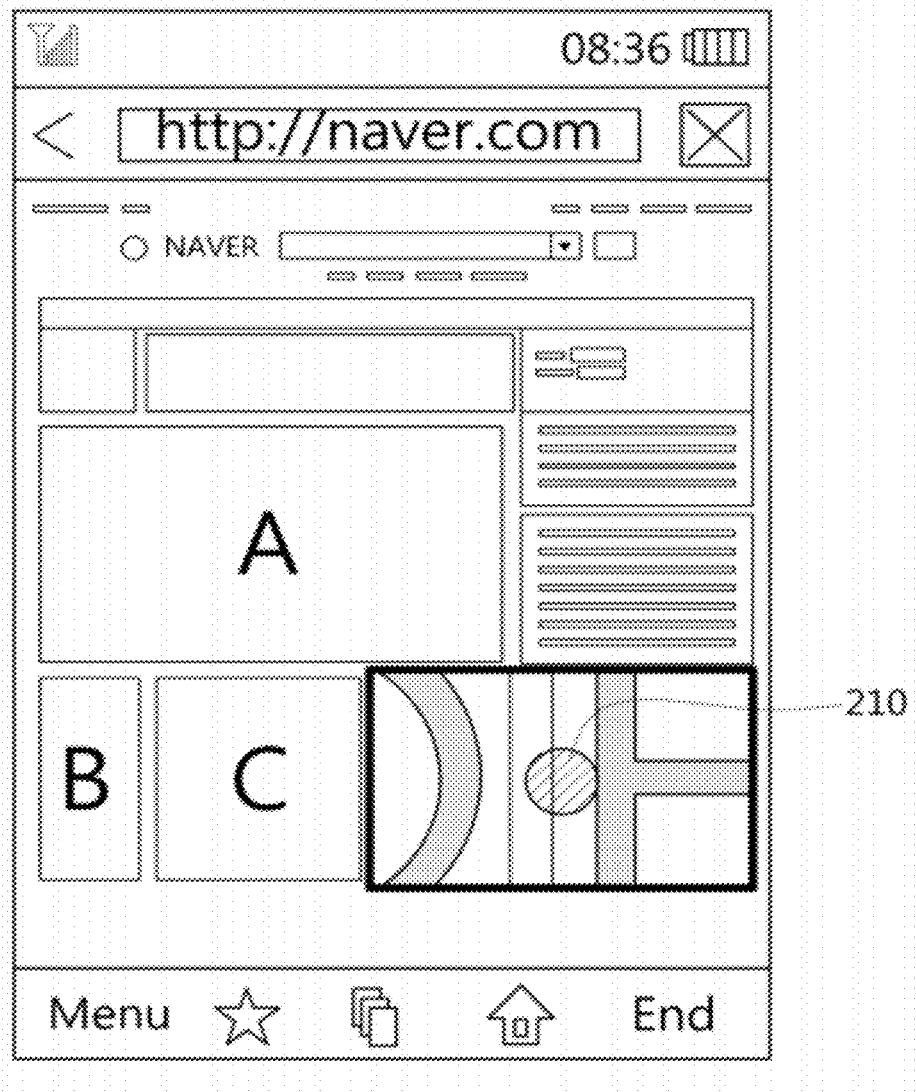

Meanwhile, when the touch manipulation is changed to the Touch Down 210 and then drags along an arrow in FIG. 11, the enlargement frame moves along the drag direction and the contents of the moved enlargement frame is zoomed in as shown in FIG. 12. By contrast, as the enlargement frame moves, the content of the block A in the enlargement frame is zoomed out to the original size.

Figure 13:
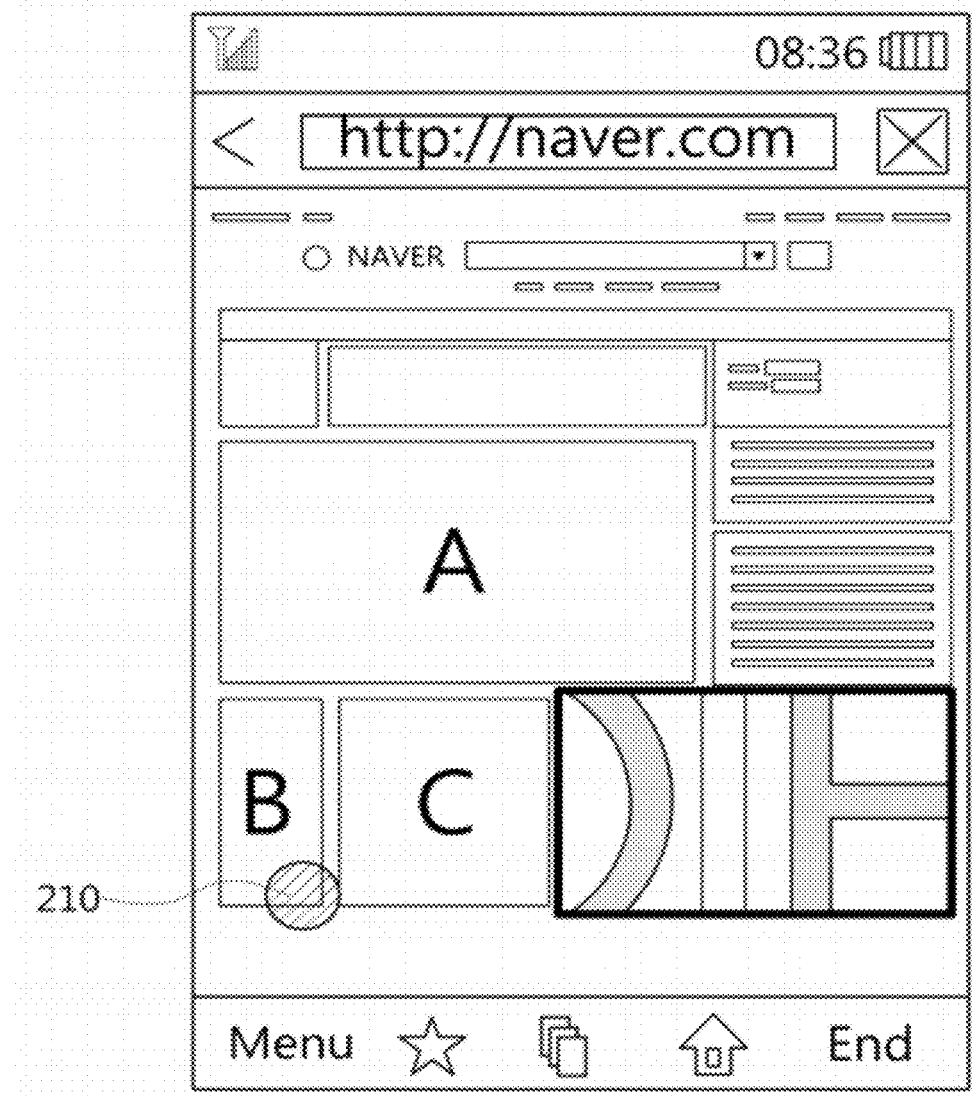
Figure 14:
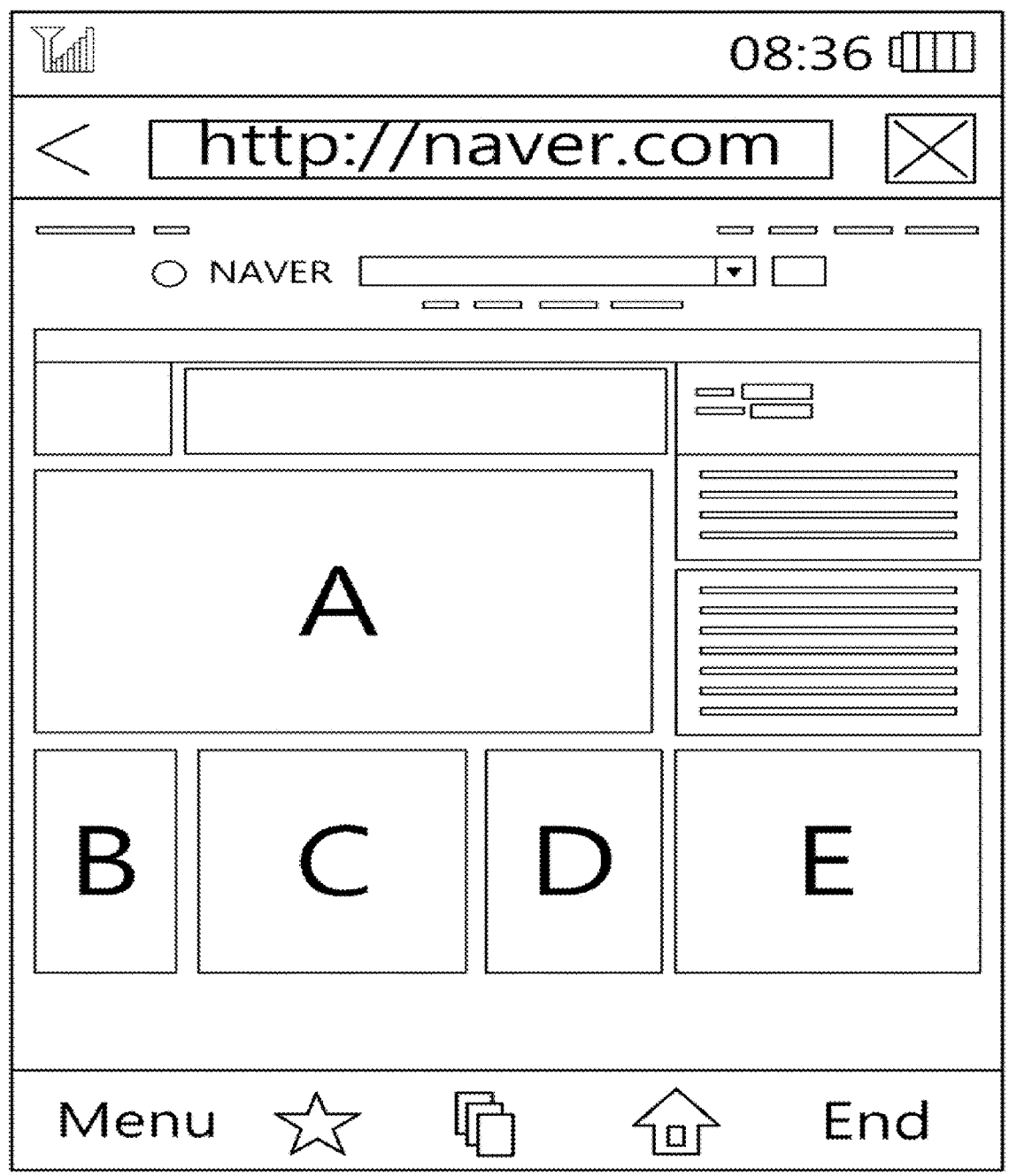

When the Touch Down 210 is applied outside the enlargement frame as shown in FIG. 13, the enlargement frame disappears from the touch screen as shown in FIG. 14.

Meanwhile, the shape of the content can be changed according to the touch input. For example, the touch screen can display pond contents including a fish as the wallpaper. In this case, concentric ripples can be displayed at the touch point and the size of the concentric circle can be determined by the touch pressure.

The content can be zoomed in/out according to the touch pressure, and the touched point can be placed at the center of the touch screen, which are useful for maps and photo contents.

2.2 Movement/Rotation Control According to the Touch Pressure

The movement of the touched GUI element can be controlled according to the touch pressure. Specifically, 1) when the user's touch pressure to the GUI element is great, the GUI element can be moved greatly in the touch screen, and 2) when the user's touch pressure to the GUI element is small, the GUI element can be moved a little in the touch screen.

The rotation of the touched GUI element can be controlled according to the touch pressure. Specifically, 1) when the user's touch pressure to the GUI element is great, the GUI element can be rotated greatly in the touch screen, and 2) when the user's touch pressure to the GUI element is small, the GUI element can be rotated a little in the touch screen.

The size can be adjusted based on the touch pressure along with the movement/rotation control. For example, 1) when the user's touch pressure to the GUI element increases, the movement or the rotation of the GUI element is increased and the GUI element is reduced or zoomed out, and 2) when the user's touch pressure to the GUI element decreases, the movement or the rotation of the GUI element is decreased and the GUI element is enlarged or zoomed in.

2.3 Thickness/Saturation/Color Control According to the Touch Pressure

The thickness of the touched GUI element can be controlled according to the touch pressure. For example, 1) when the user's touch pressure is great, the input text can be thickened, and 2) when the user's touch pressure to the GUI element is small, the text can be thinned.

The saturation of the touched GUI element can be controlled according to the touch pressure. For example, 1) when the user's touch pressure is great, the saturation of the input text can be increased (darkened), and 2) when the user's touch pressure to the GUI element is small, the saturation of the text can be decreased (lightened).

The color of the touched GUI element can be controlled according to the touch pressure. For example, 1) when the user's touch pressure is great, the color of the input text can be set to a warm color (a red color), and 2) when the user's touch pressure to the GUI element is small, the color of the text can be a cool color (a blue color).

The control objects can be combined. For example, 1) when the user's touch pressure is great, the input text can be thickened and its color can be set to a warm color (a red color), and 2) when the user's touch pressure to the GUI element is small, the text can be thinned and its color can be a cool color (a blue color).

2.4 Speed (to Move, to Turn a Page, to Play) Control According to the Touch Pressure The speed (to move, to turn a page, to play) of the touched GUI element can be controlled according to the touch pressure. For example, 1) when the user's touch pressure to the GUI element is great, the speed (to move, to turn a page, to play) of the GUI element can be increased, and 2) when the user's touch pressure to the GUI element is small, the speed (to move, to turn a page, to play) of the GUI element can be decreased.

Figure 15:
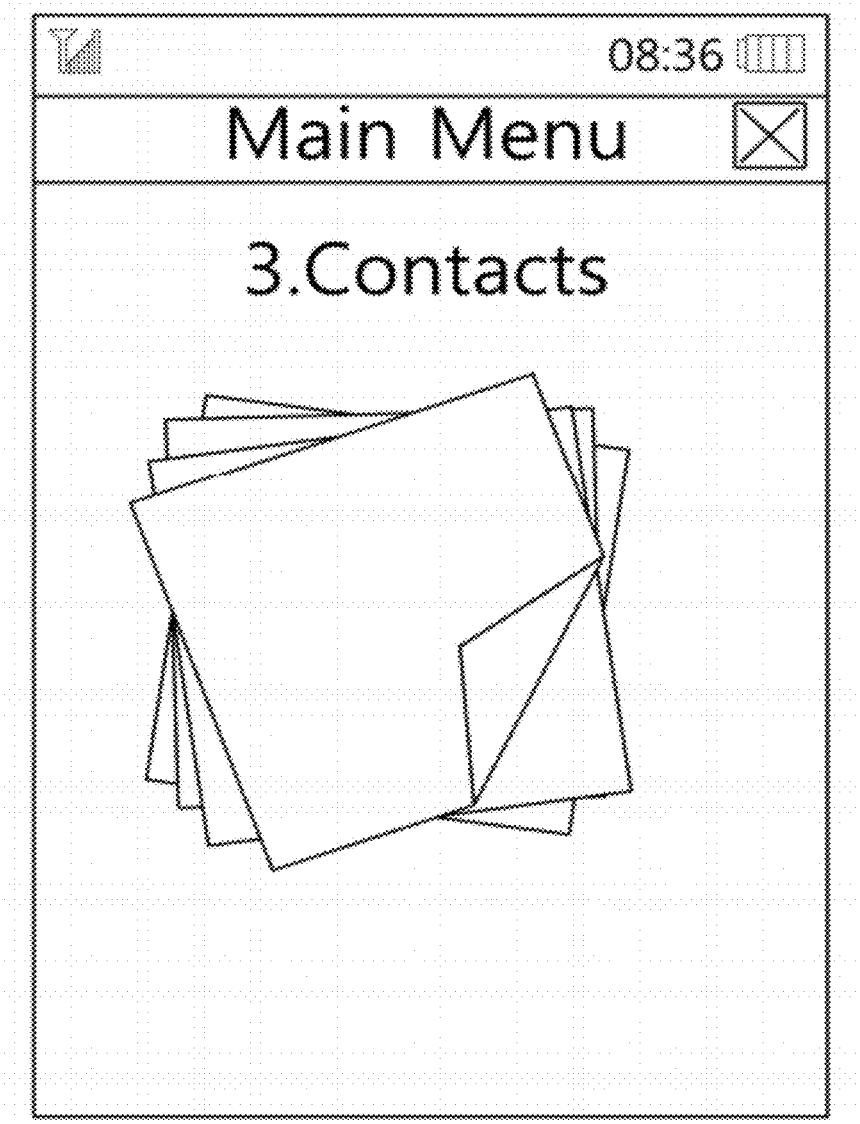
FIGS. 15 through 26 are diagrams of speed (to move, to turn a page, to play) control according to the single touch pressure.
Figure 16:
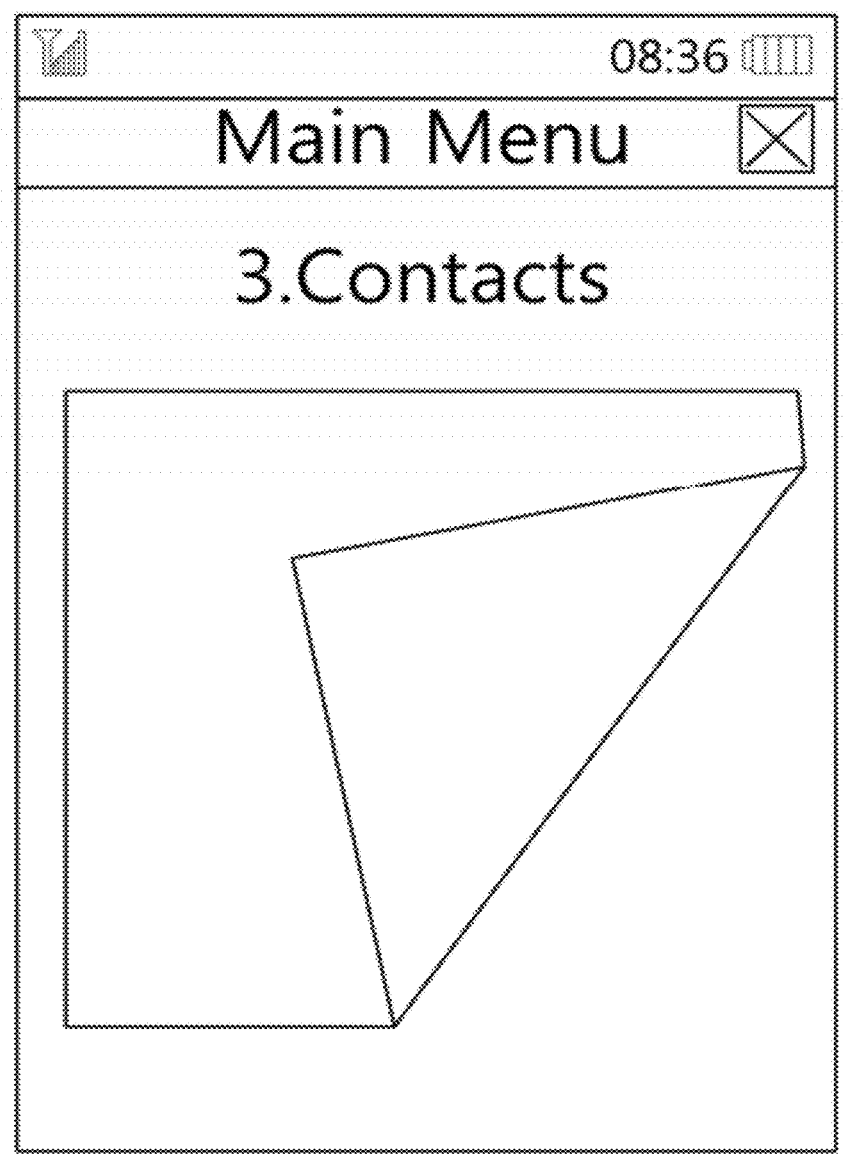
Figure 17:
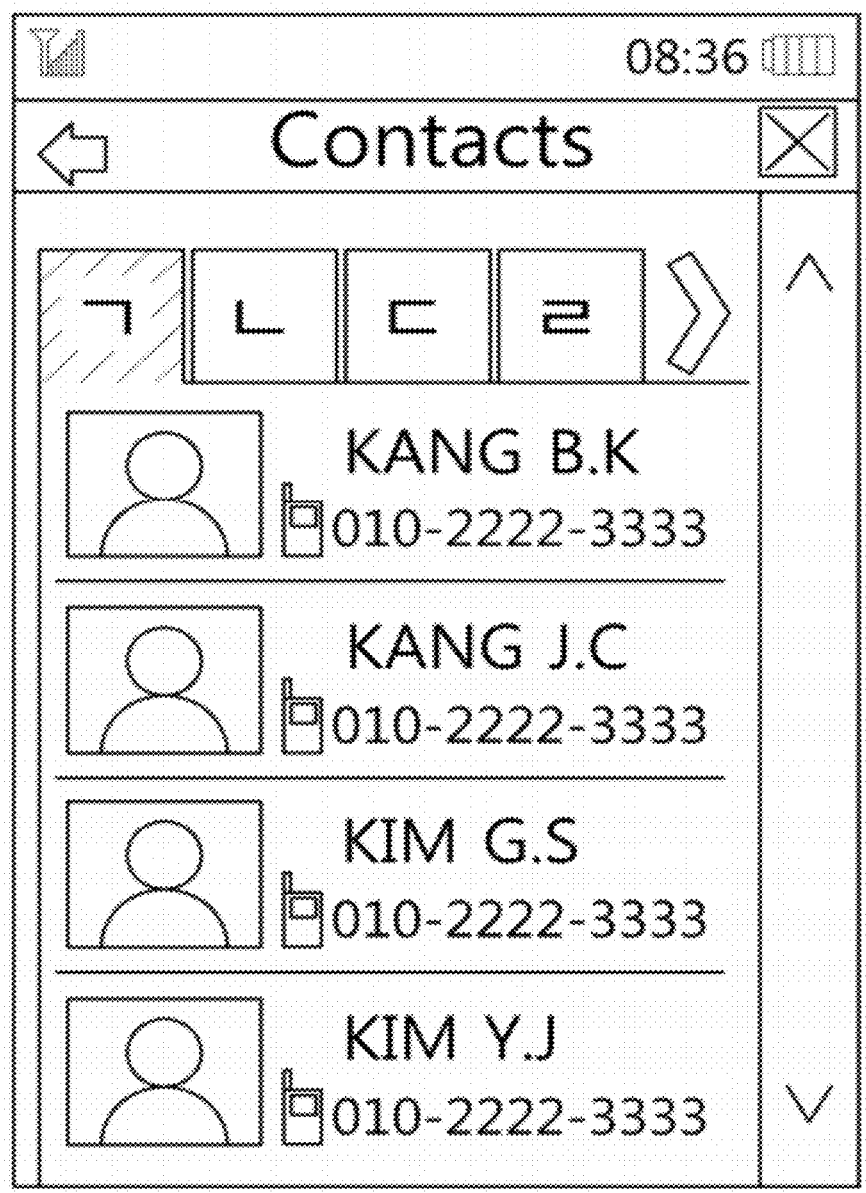

As a menu item Contacts is selected by the user as shown in FIG. 15 and the menu item Contacts is turned over as shown in FIG. 16, contact information of persons having the initial "ㄱ" appear as shown in FIG. 17.

Figure 18:
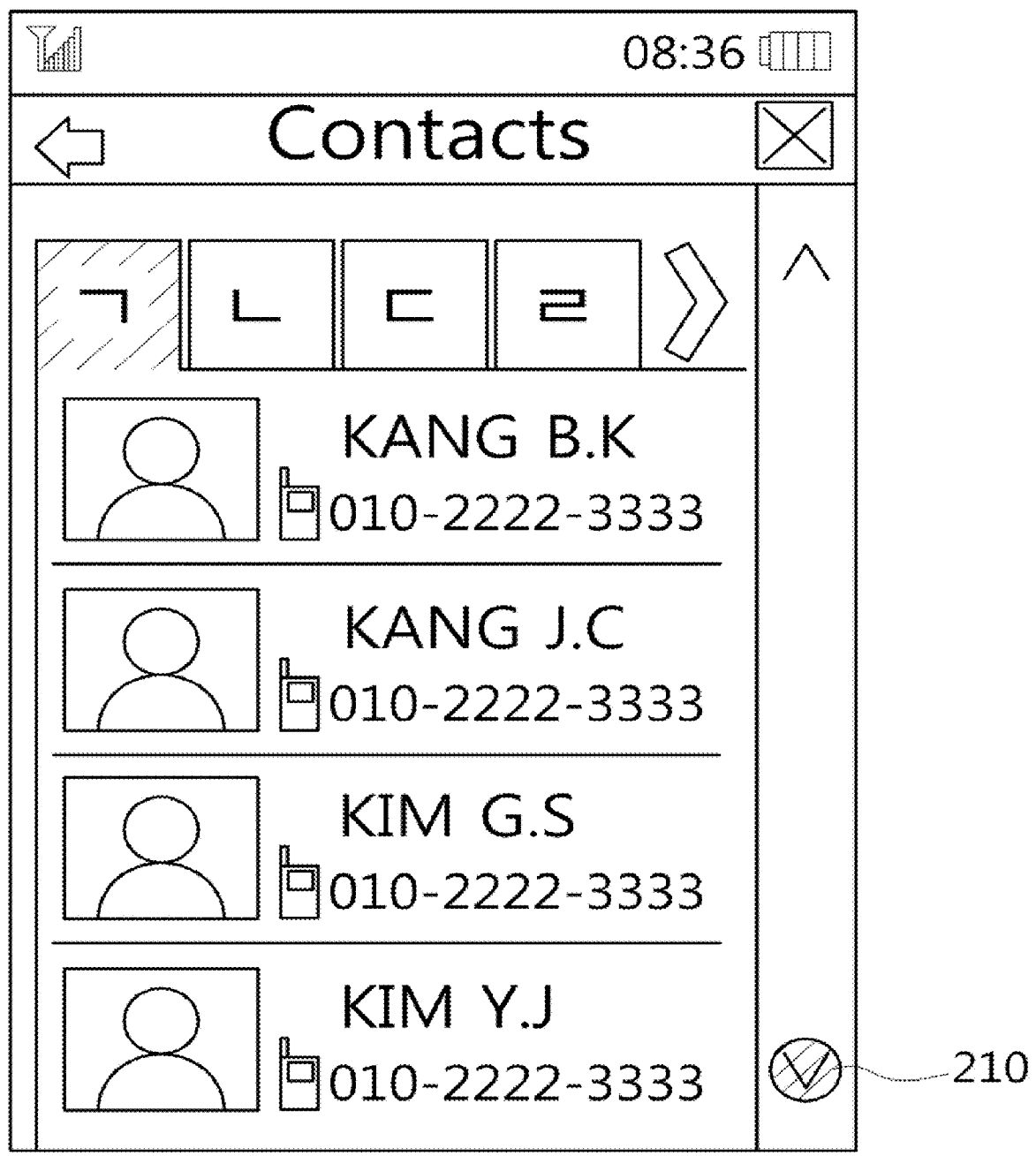
Figure 19:
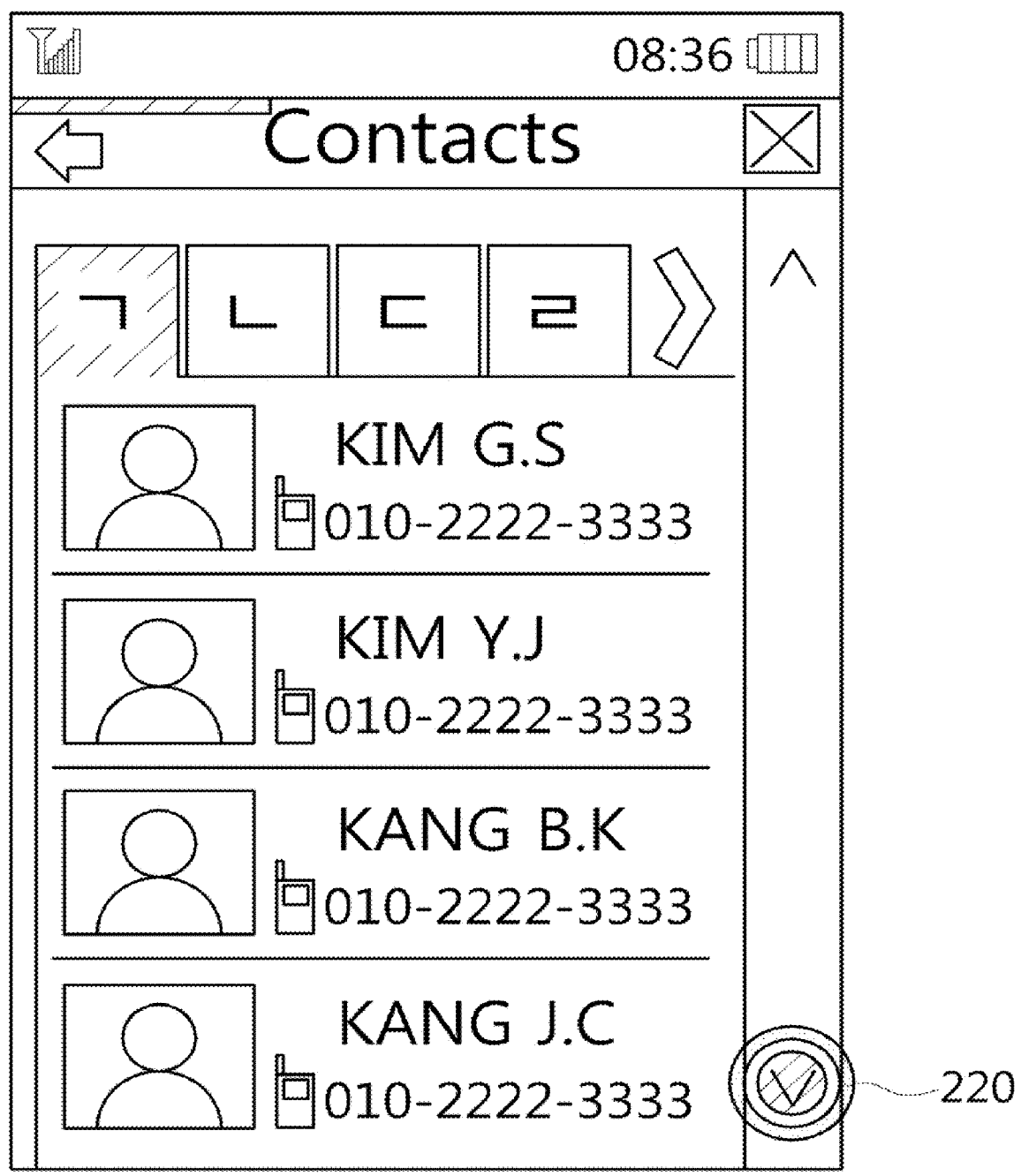
Figure 20:
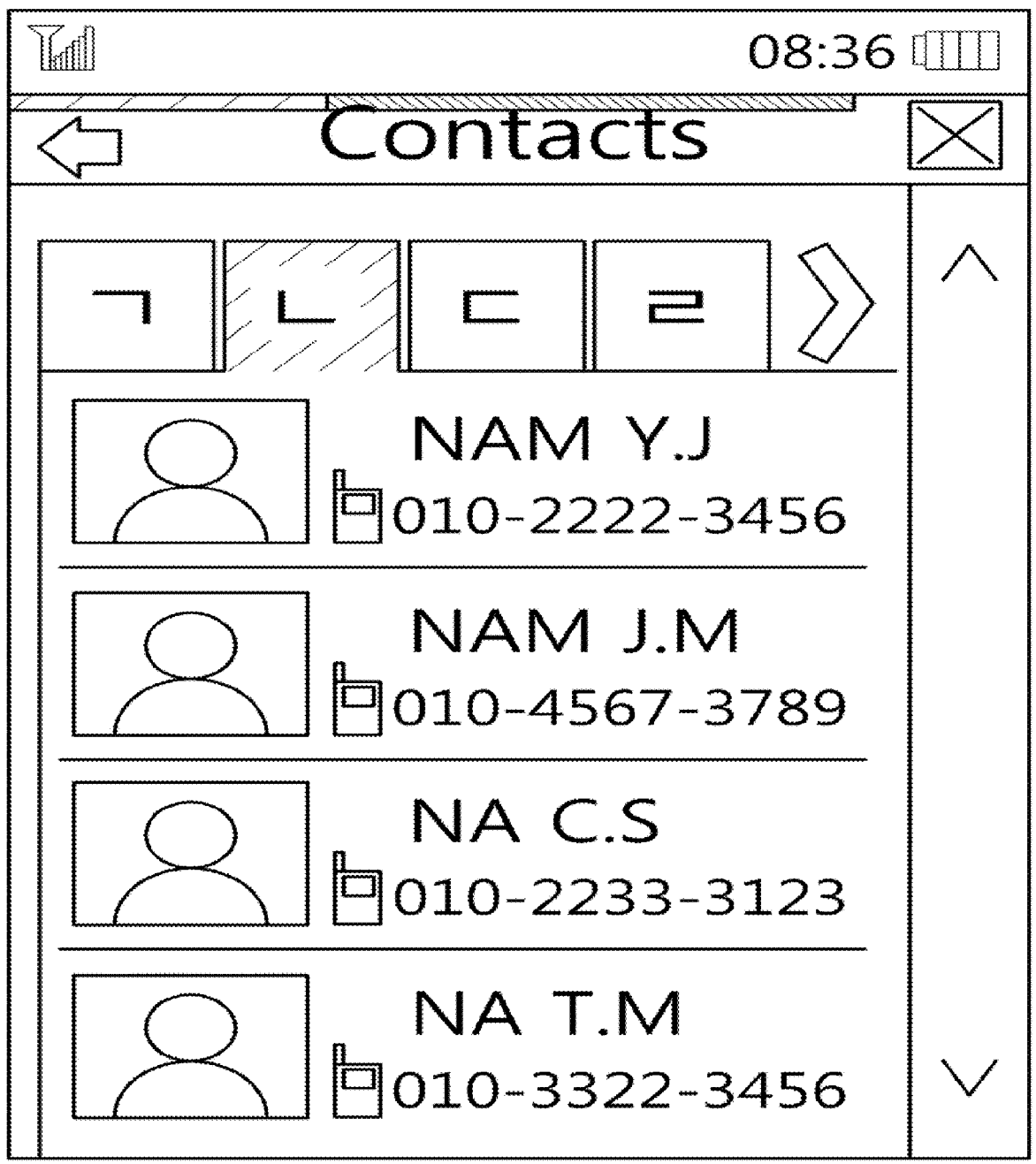

When the Touch Down 210 is applied to the bottom of the scroll bar as shown in FIG. 18, the contact information is scrolled down as shown in FIG. 19. When the touch manipulation is changed to the Touch Down & Press Down 220 as shown in FIG. 19, the contact information jumps to persons having the initial "ㄴ" as shown in FIG. 20. That is, as the touch pressure increases, the scroll speed increases.

Hereafter, a method for controlling the playback speed of music contents with the touch pressure is explained by referring to FIGS. 21 through 26.

Figure 21:
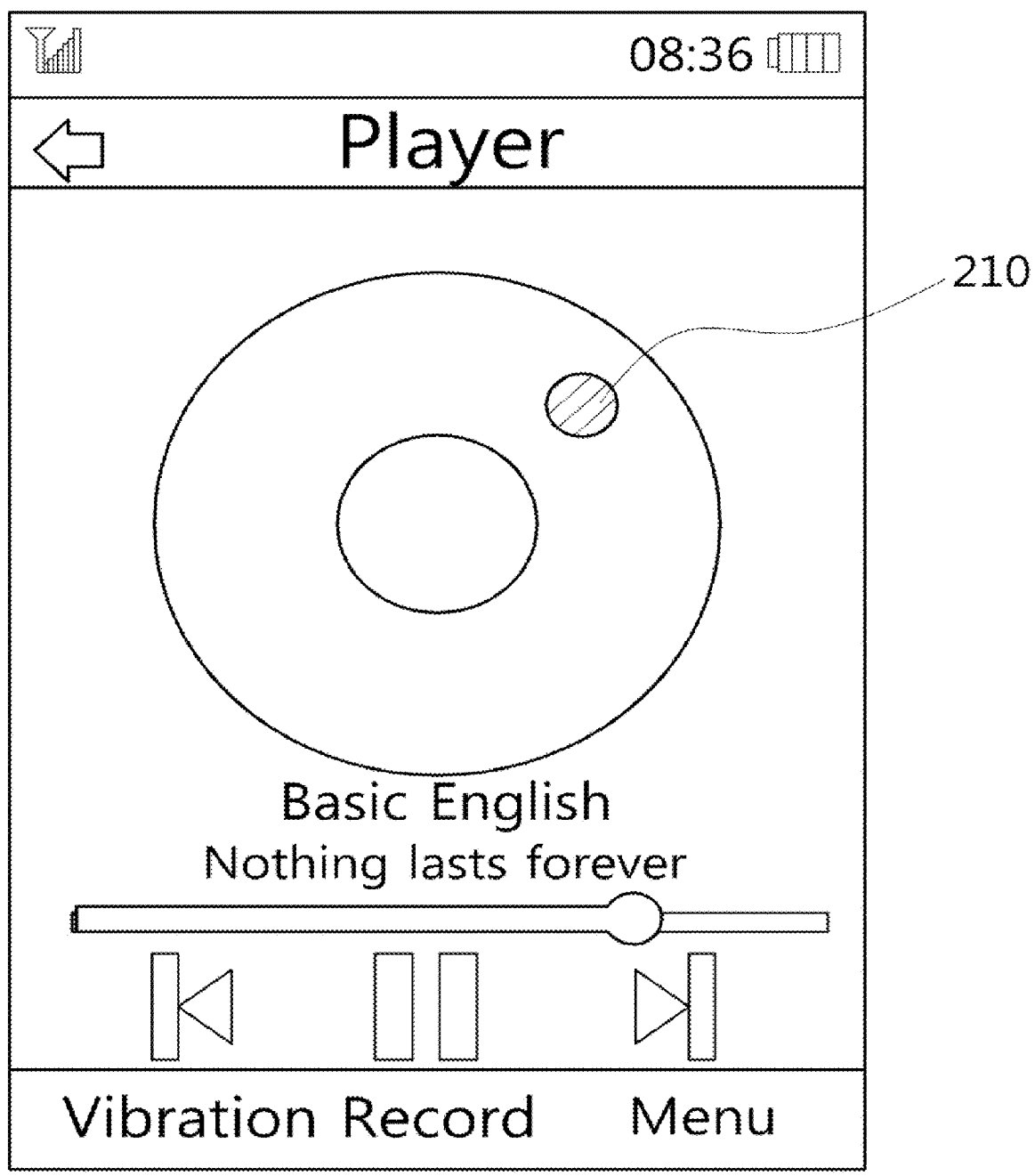
Figure 22:
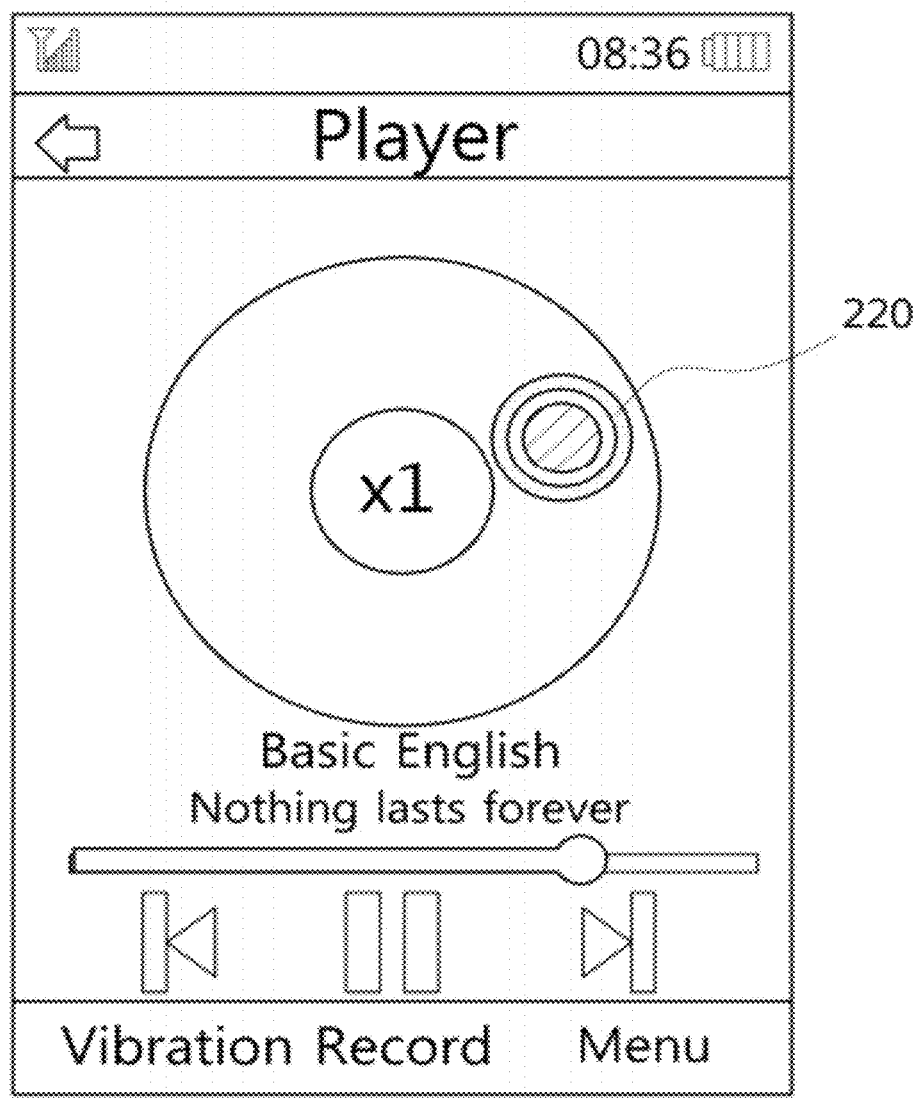

After a music content player is executed as shown in FIG. 21, when the Touch Down 210 is applied to a disc-shaped controller, the current playback speed "×1" is displayed at the center of the disc as shown in FIG. 22. Next, when the touch manipulation is changed to the Touch Down & Press Down 220 in FIG. 22, the playback speed is slowed down to "×0.5" as shown in FIG. 23.

Figure 23:
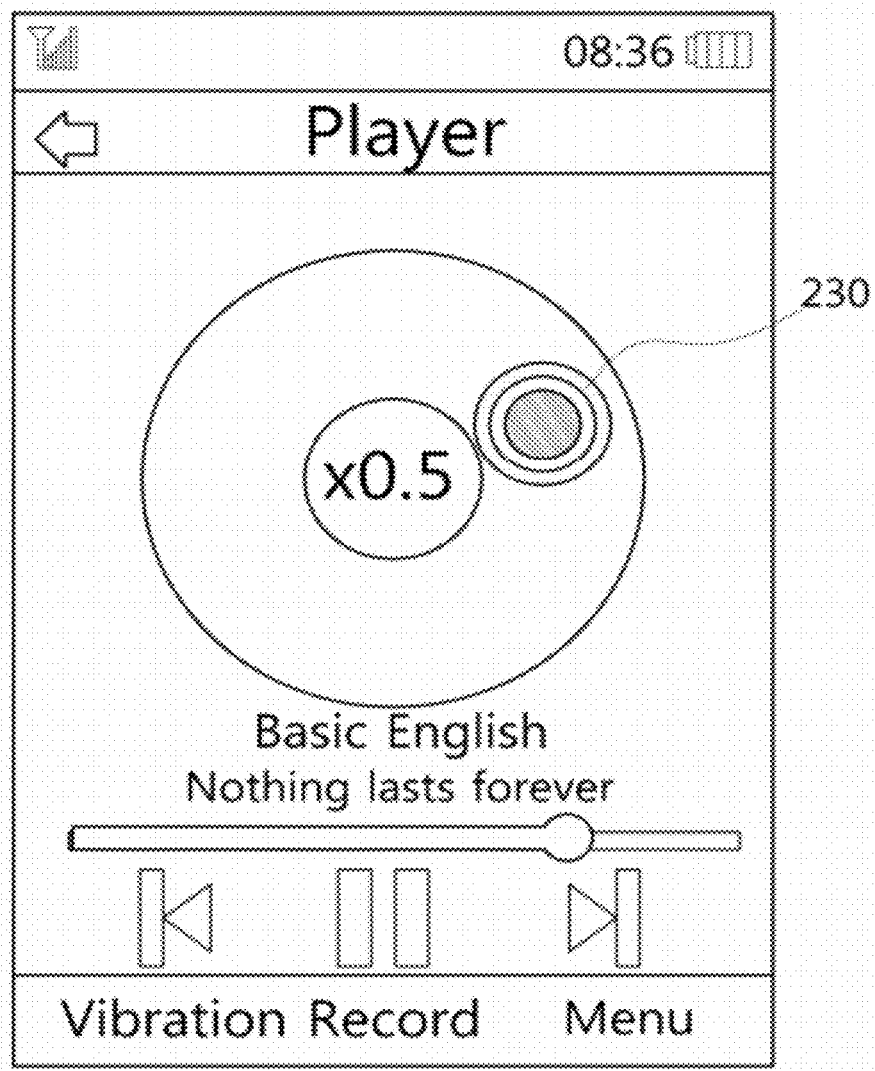
Figure 24:
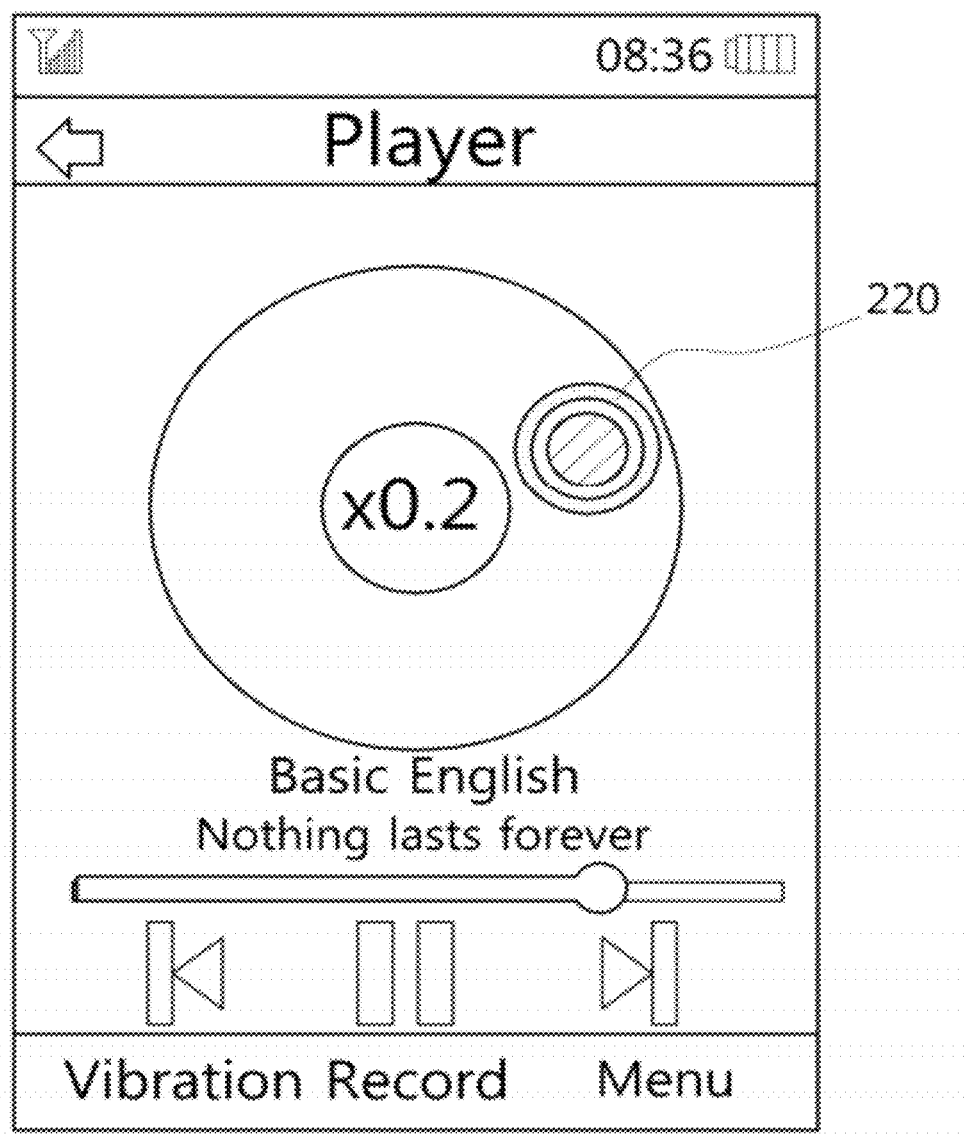

When the touch manipulation is changed to the Touch Down & Press Down & Stronger 230 in FIG. 23, the playback speed is further slowed down to "×0.2" as shown in FIG. 24.

Figure 25:
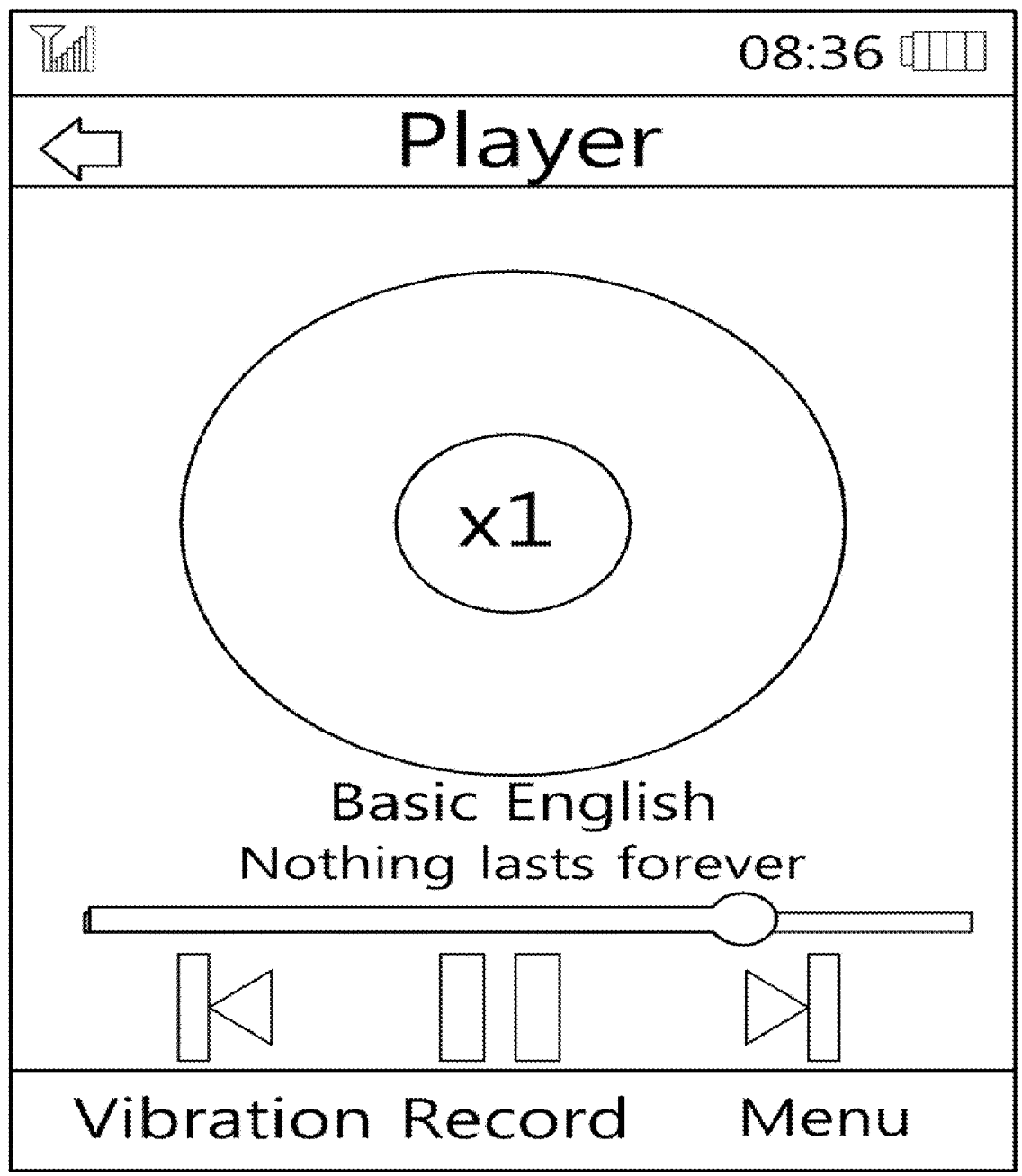
Figure 26:
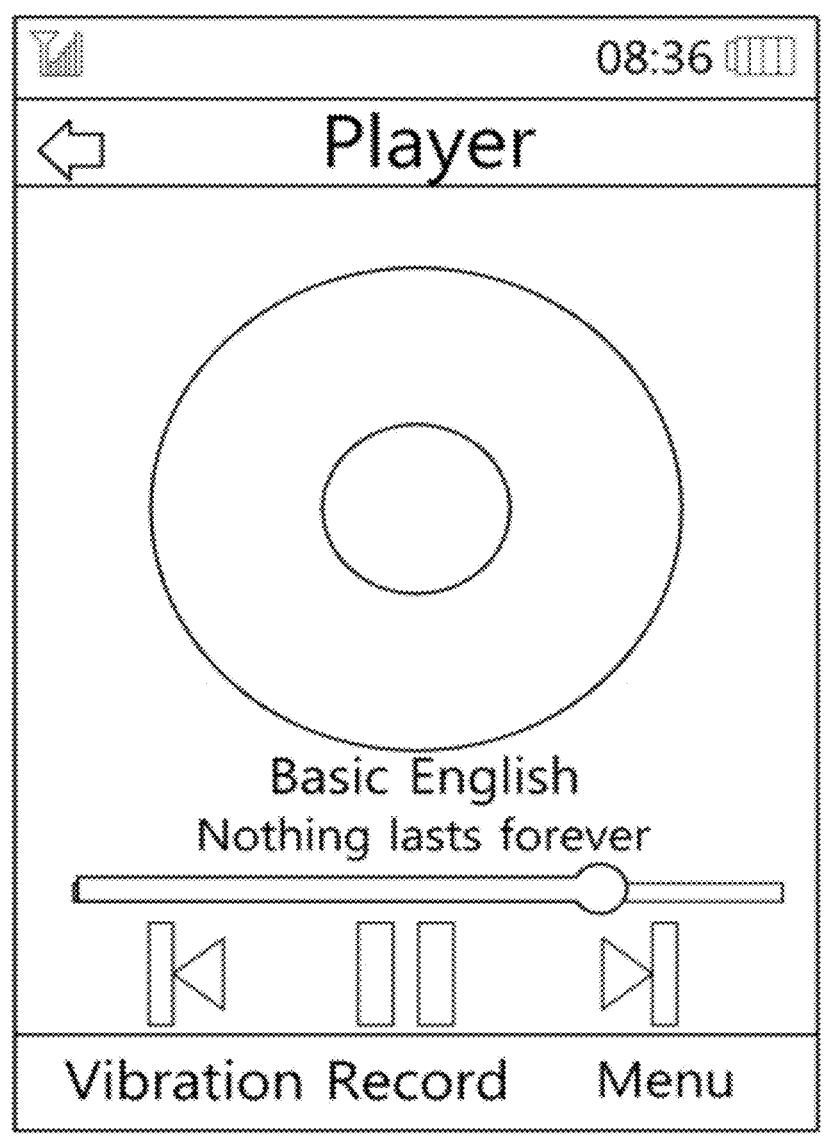

Meanwhile, when the touch is released, the playback speed gradually increases, returns to "×1" as shown in FIG. 25, and then disappears as shown in FIG. 26.

The speed (move, turn a page, and play) control according to the touch pressure can be combined with the size adjustment, which has been described in FIGS. 6, 7 and 8. In detail, according to the touch pressure in FIGS. 6, 7 and 8, the scroll speed decreases and the content size is enlarged, and the scroll speed increases and the content size is reduced.

1) When the user's touch pressure to the GUI element increases, the speed (to move, to turn a page, to play) of the GUI element can be increased and the size of the GUI element can be enlarged, and 2) when the user's touch pressure to the GUI element decreases, the speed (to move, to turn a page, to play) of the GUI element can be decreased and the size of the GUI element can be reduced.

2.5 Weightiness Representation According to the Touch Pressure

To entertain the user, weight can be given to the GUI element. That is, of the GUI elements displayed in the touch screen, one can be heavy and another can be light. More specifically, it is possible to set that a folder icon containing a number of files is heavy and a folder icon containing a small number of files is light.

Figure 27:
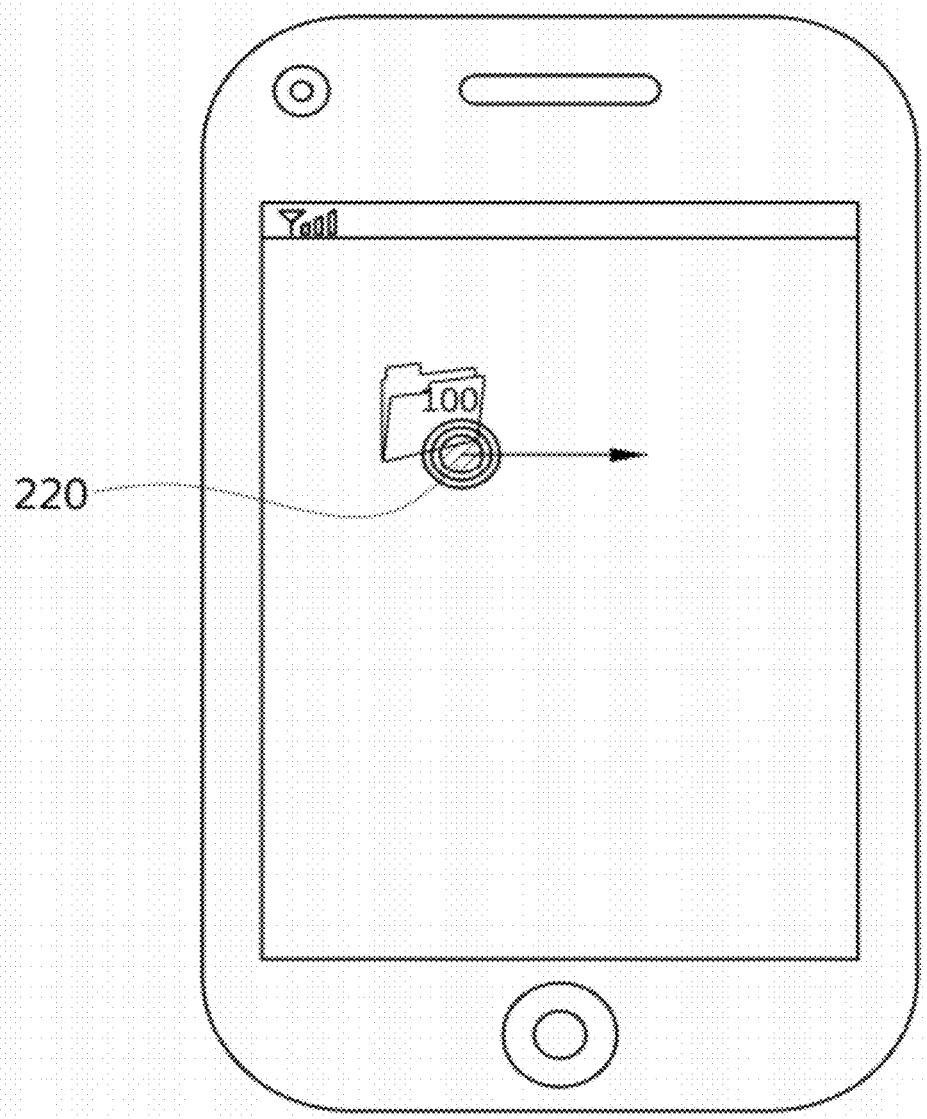
FIGS. 27 and 28 are diagrams of weightiness representation according to the single touch pressure.
Figure 28:
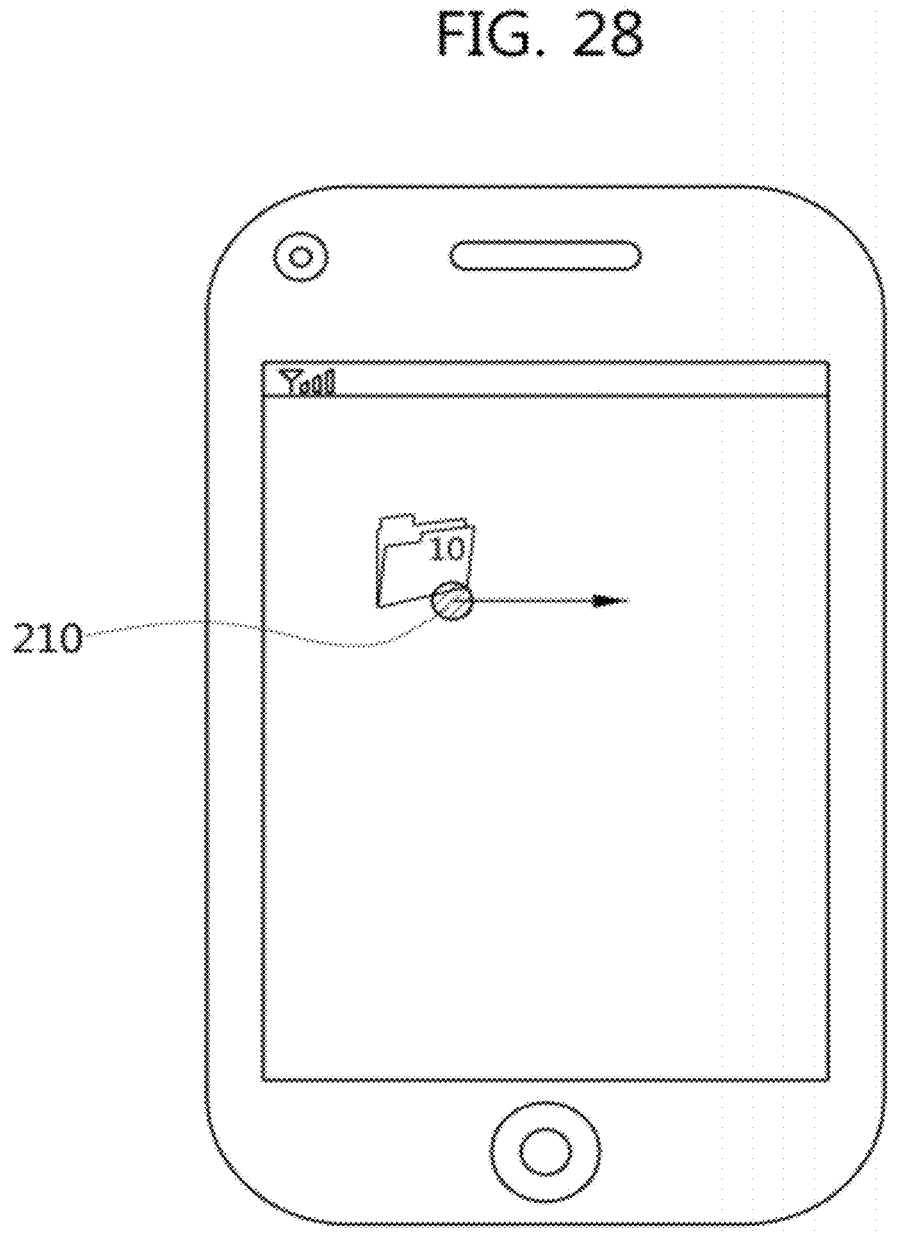

Hence, the weightiness of the GUI element can be indirectly represented by determining the required touch pressure according to the weightiness of the GUI element. That is, to drag a folder icon containing 100 files as shown in FIG. 27, the Touch Down & Press Down 220 is required. To drag a folder icon containing 10 files as shown in FIG. 28, the Touch Down 210 is required.

When the heavy folder icon of FIG. 27 is dragged using the Touch Down 210, the folder icon is not dragged.

In addition, even when the icon is dragged with the same touch pressure, the movement speed can differ according to the weightiness of the GUI element. This implies that the movement speed of dragging the heavy folder icon of FIG. 27 with the Touch Down & Press Down 220 is slower than the movement speed of dragging the light folder icon of FIG. 28 with the Touch Down & Press Down 220.

2.6 Acoustic/Tactile Output Control According to the Touch Pressure

The acoustic output (sound) can be controlled according to the touch pressure. For example, 1) when the user's touch pressure is great, the acoustic output can be increased, and 2) when the user's touch pressure is small, the acoustic output can be decreased.

Figure 29:
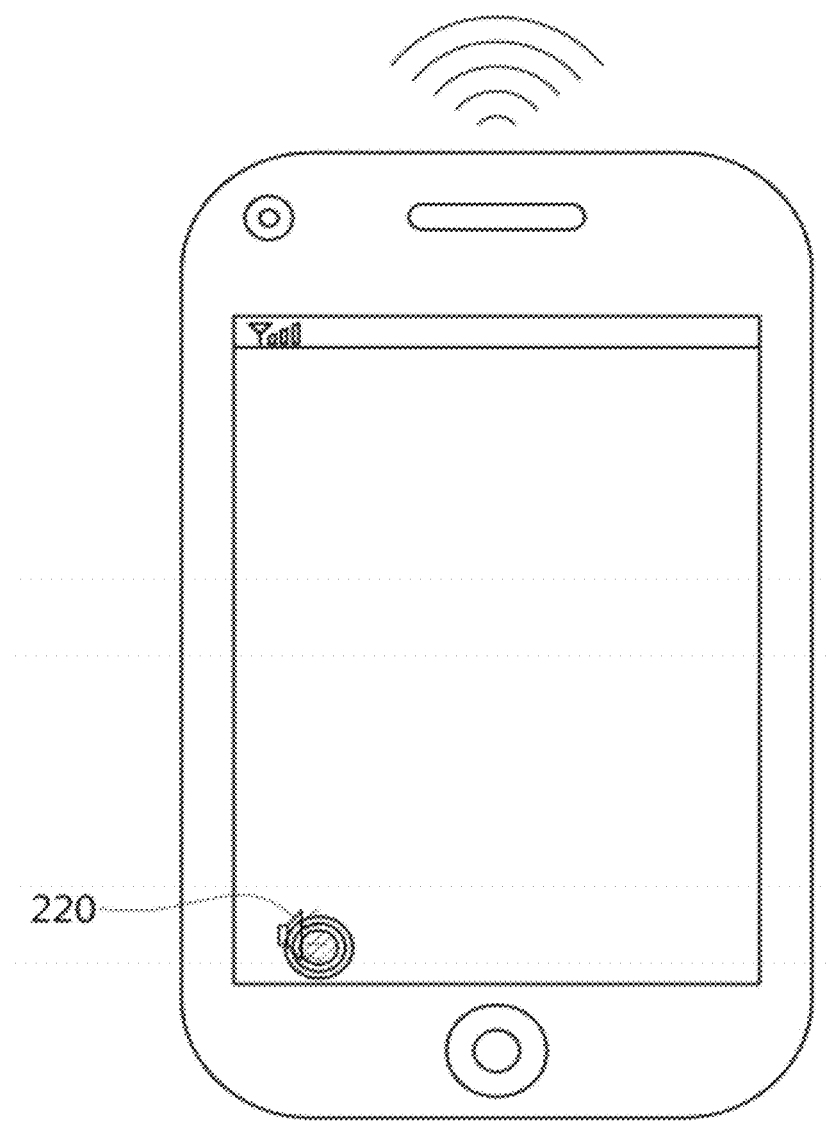
FIGS. 29 through 38 are diagrams of acoustic/tactile output control according to the single touch pressure.
Figure 30:
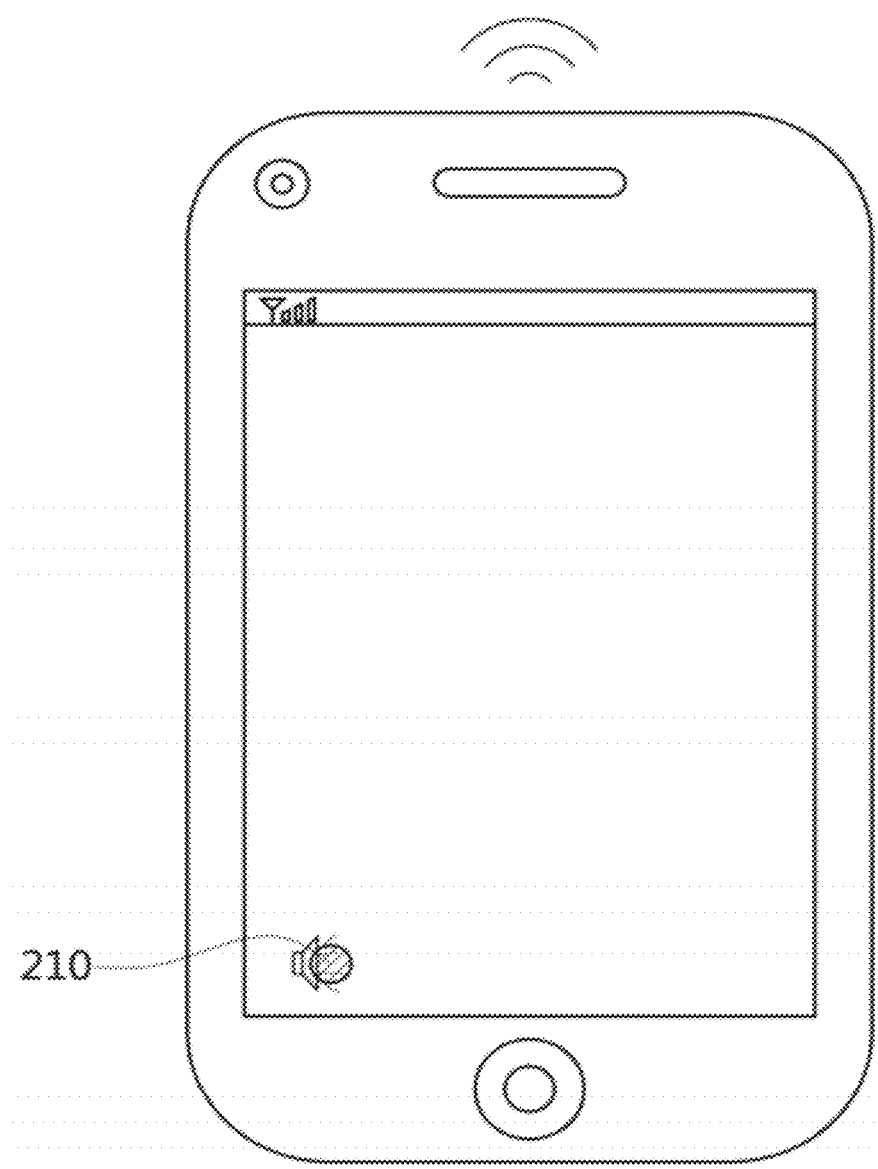

That is, 1) when the Touch Down 210 is applied to a sound control icon as shown in FIG. 29, the sound output decreases. 2) When the Touch Down & Press Down 220 is applied to the sound control icon as shown in FIG. 30, the sound output increases.

The tactile output (vibration) can be controlled according to the touch pressure. For example, 1) when the user's touch pressure is great, the vibration output can be increased, and 2) when the user's touch pressure is small, the vibration output can be decreased.

Figure 31:
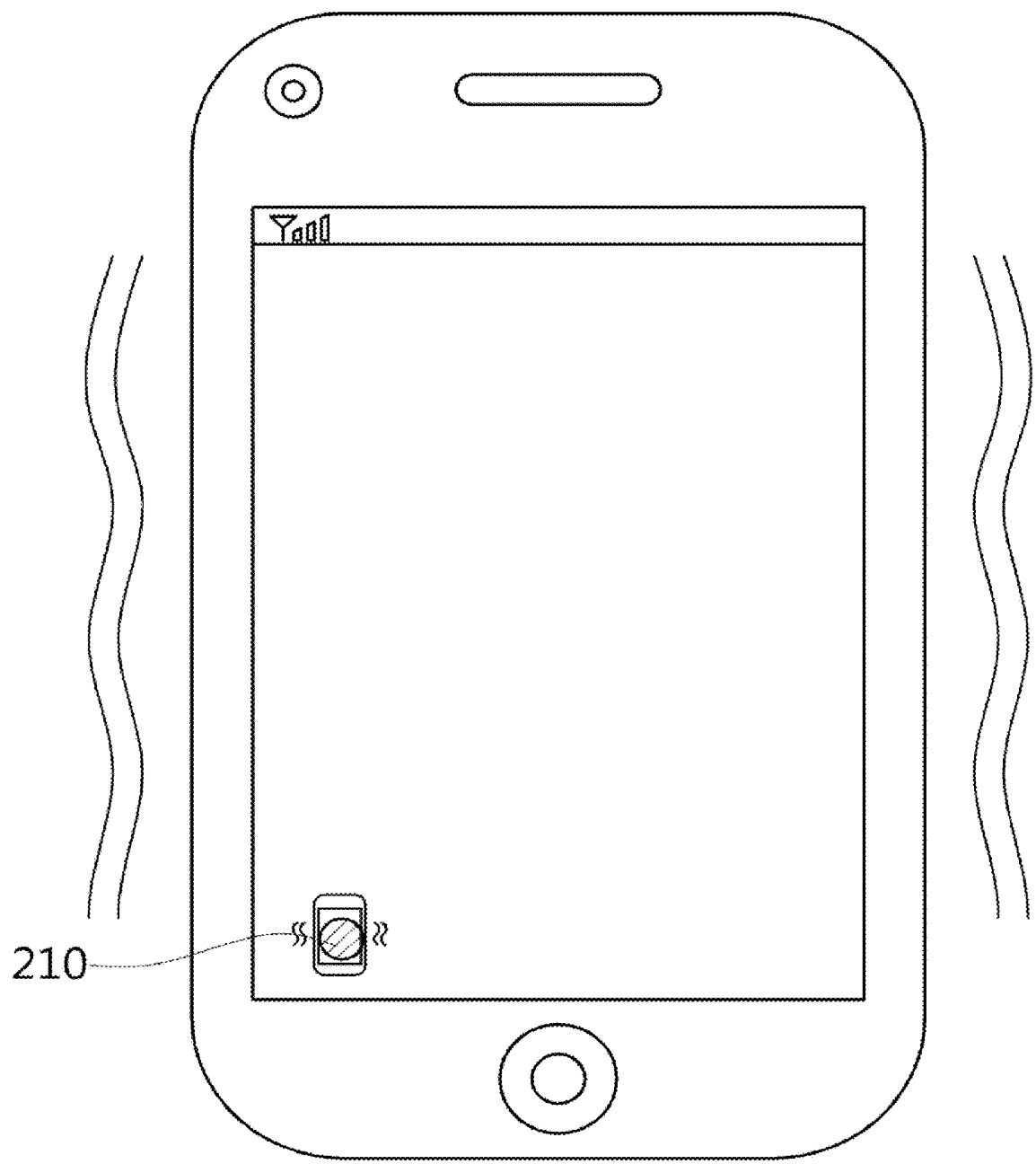
Figure 32:
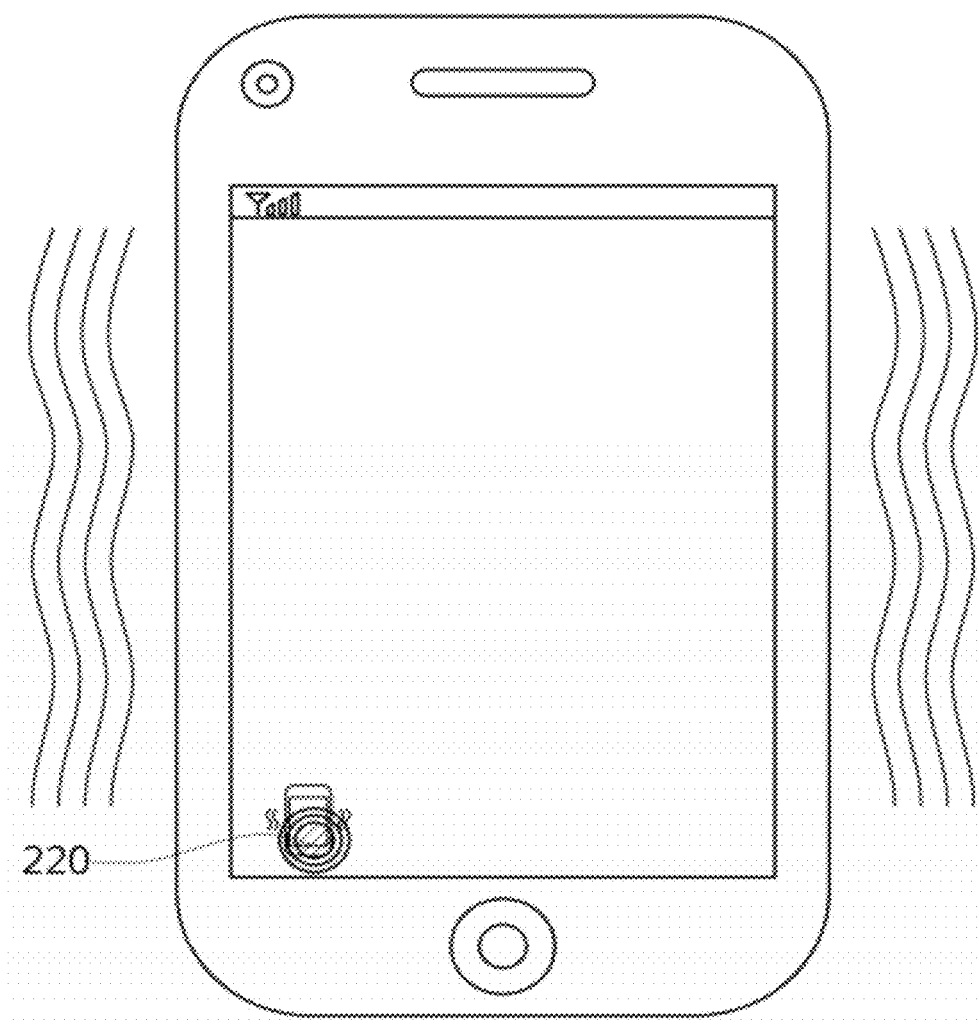

That is, 1) when the Touch Down 210 is applied to a vibration control icon as shown in FIG. 31, the vibration output decreases. 2) When the Touch Down & Press Down 220 is applied to the vibration control icon as shown in FIG. 32, the vibration output increases.

Now, how to generate/store the vibration pattern by controlling the touch pressure is elucidated by referring to FIGS. 33 through 38. The vibration pattern indicates the fluctuation of the pressure input by the user over a certain time.

Figure 33:
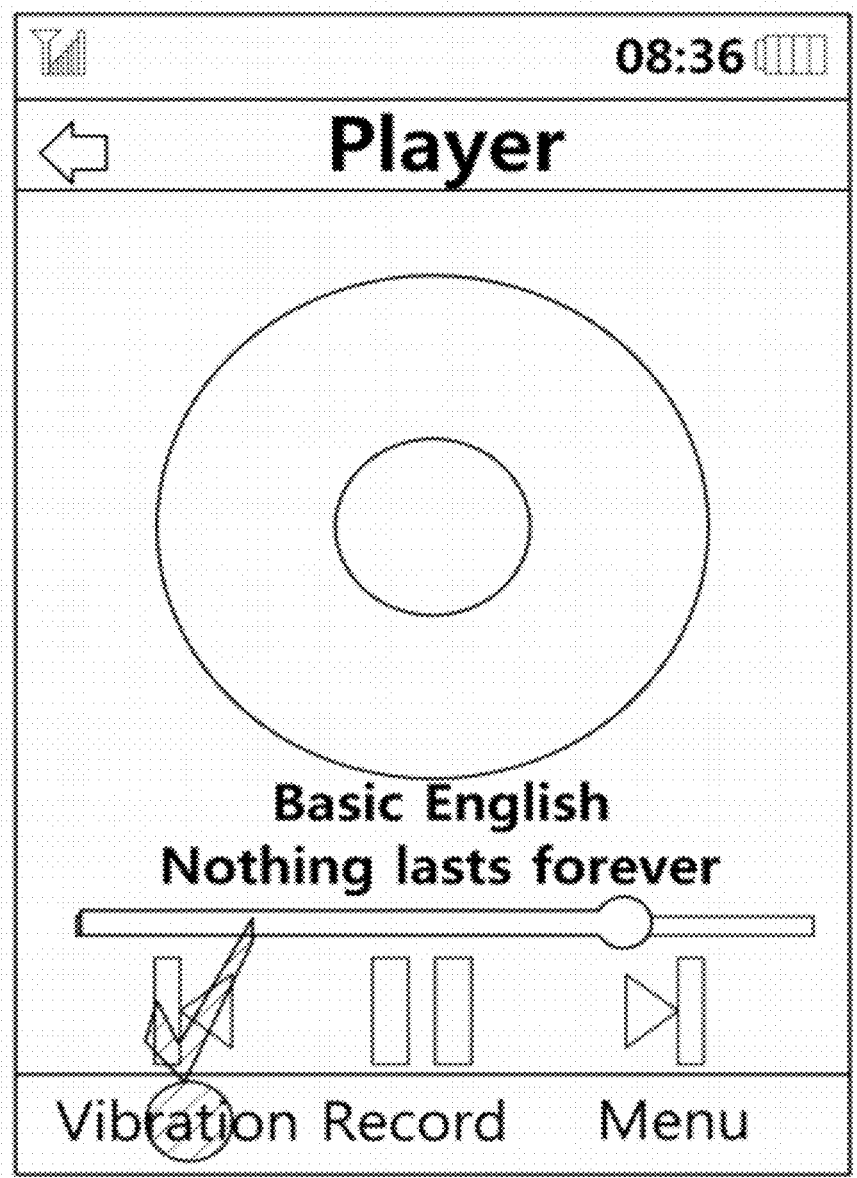
Figure 34:
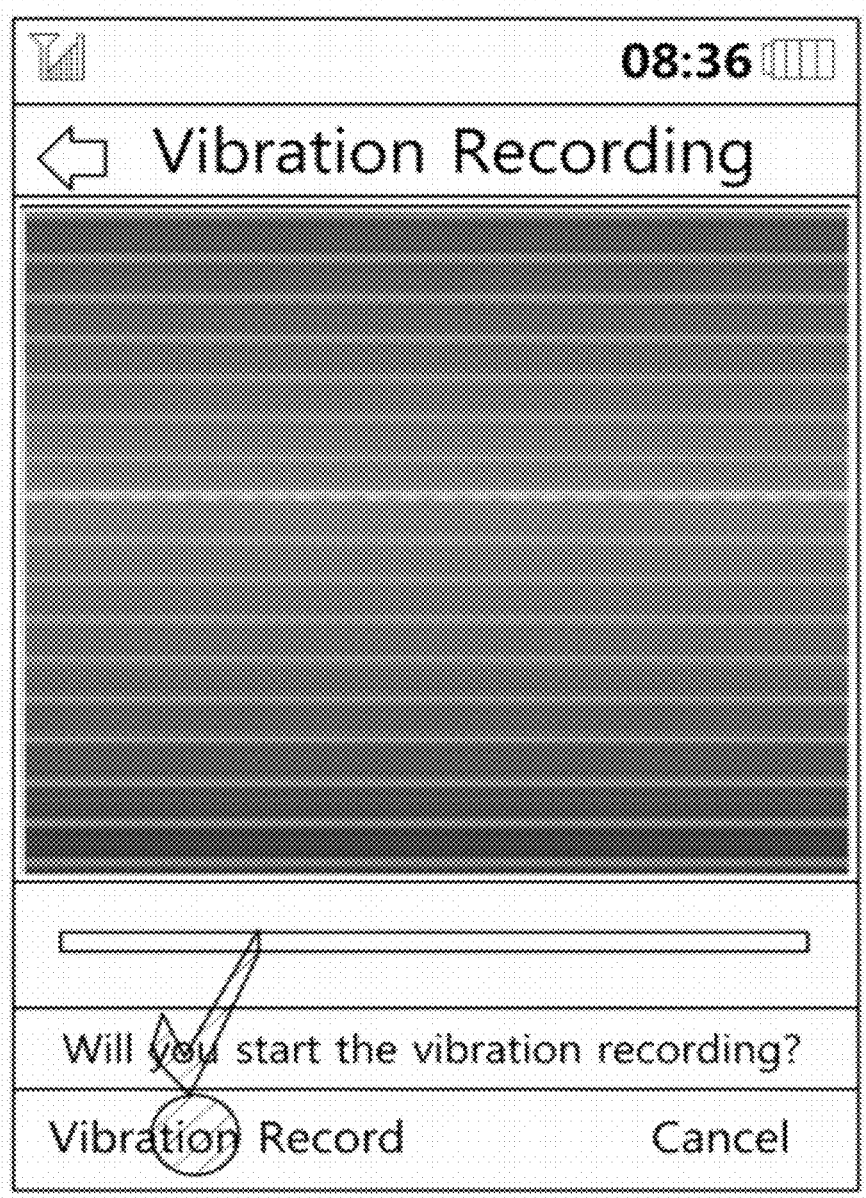
Figure 35:
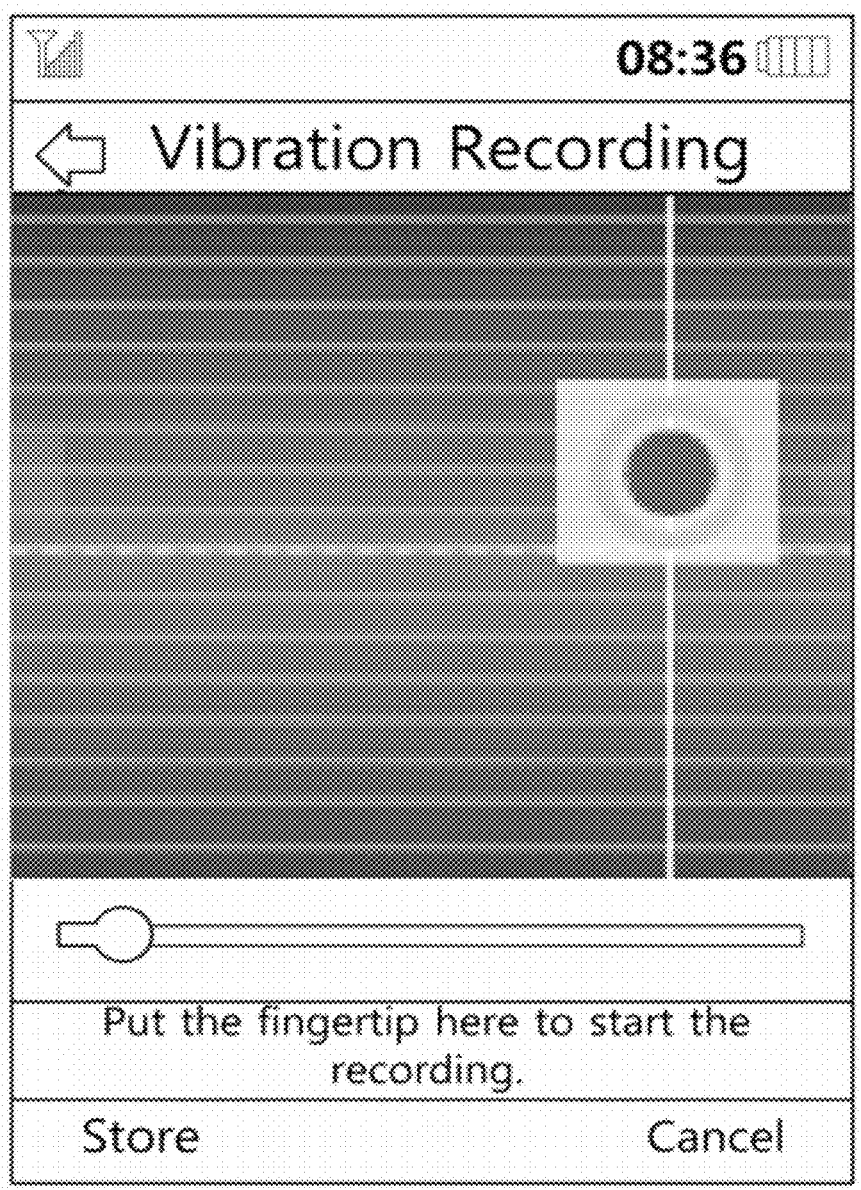

When a vibration record menu is selected in the music player as shown in FIG. 33, a vibration record screen is displayed as shown in FIG. 34. When a recording start menu is selected, the vibration recording commences as shown in FIG. 35.

Figure 36:
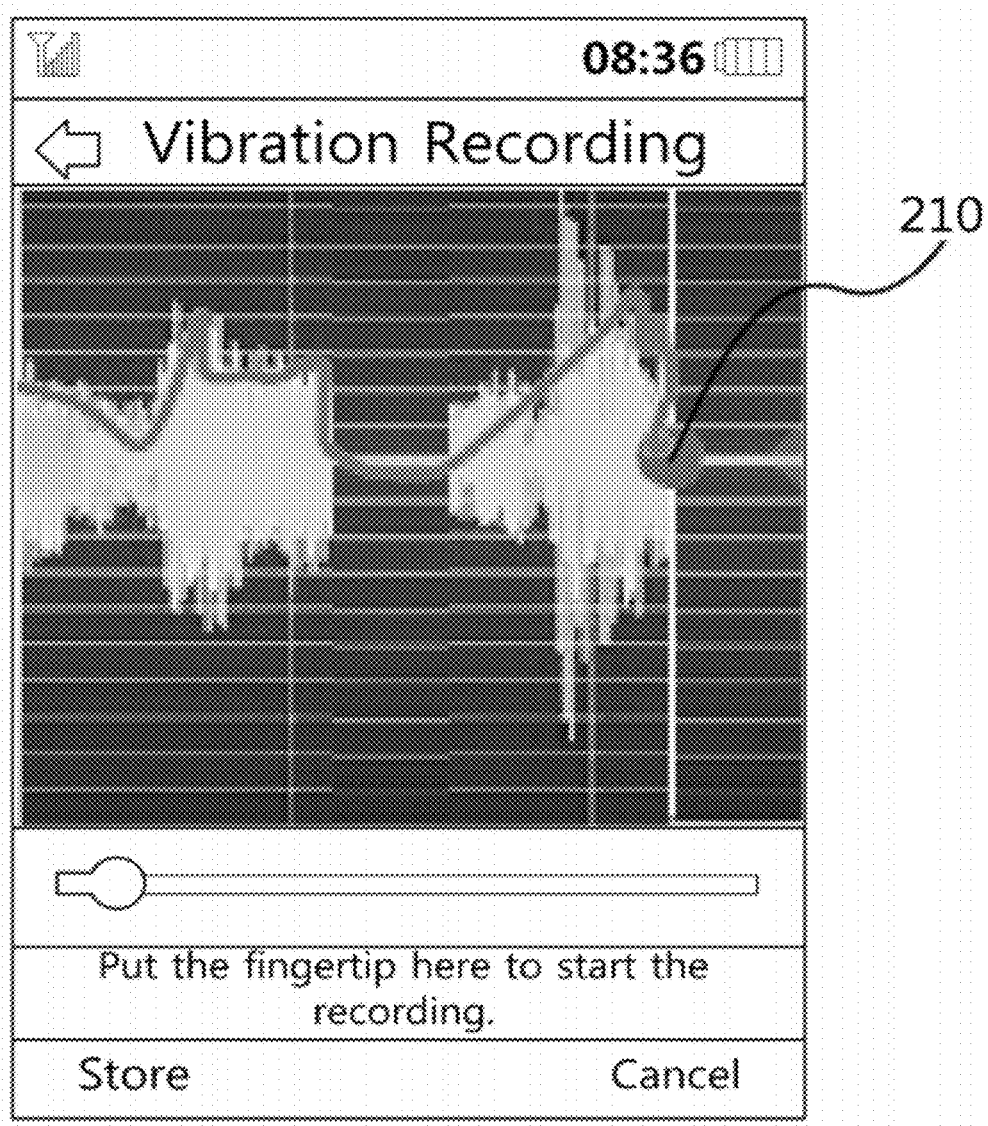
Figure 37:
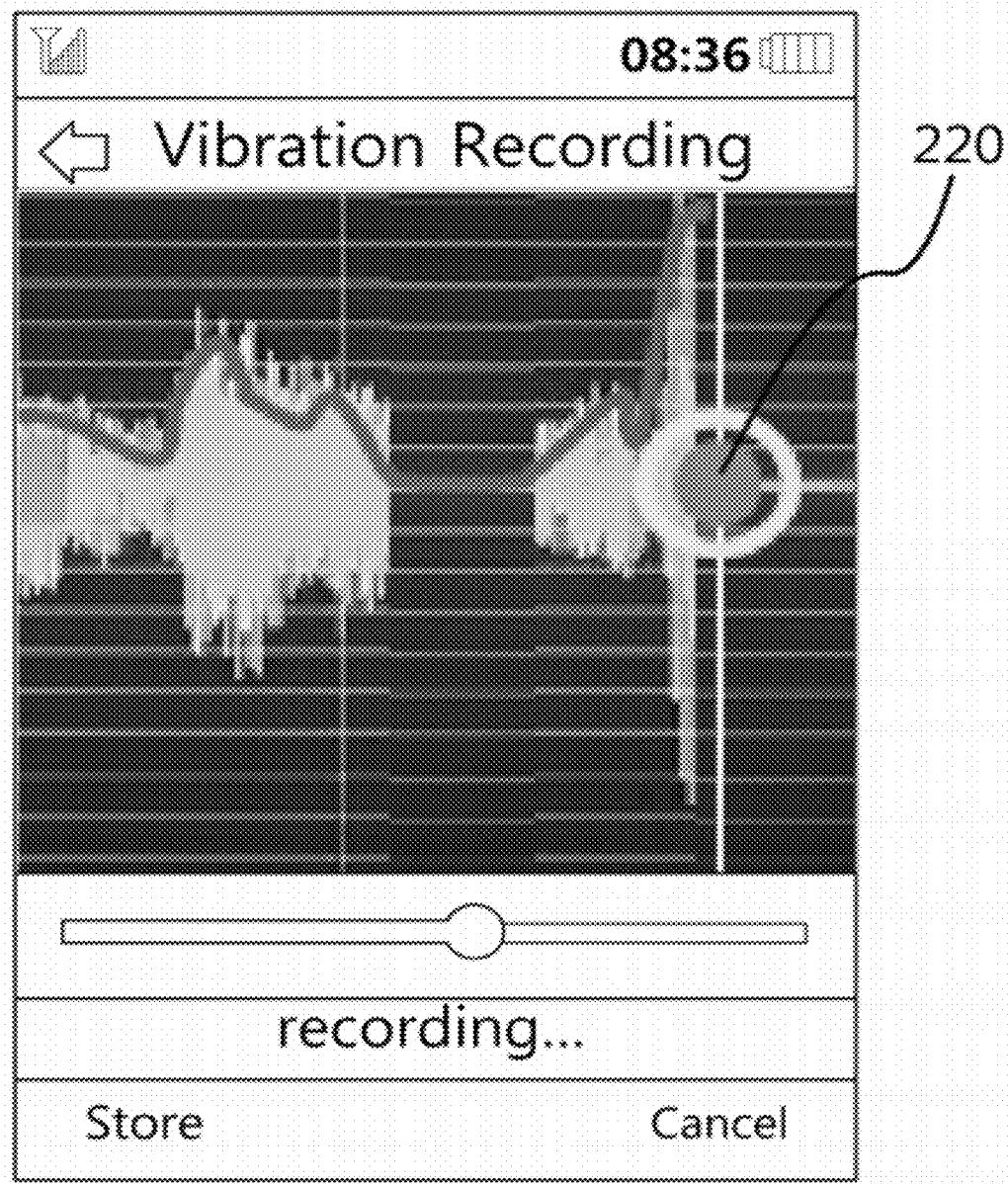
Figure 38:
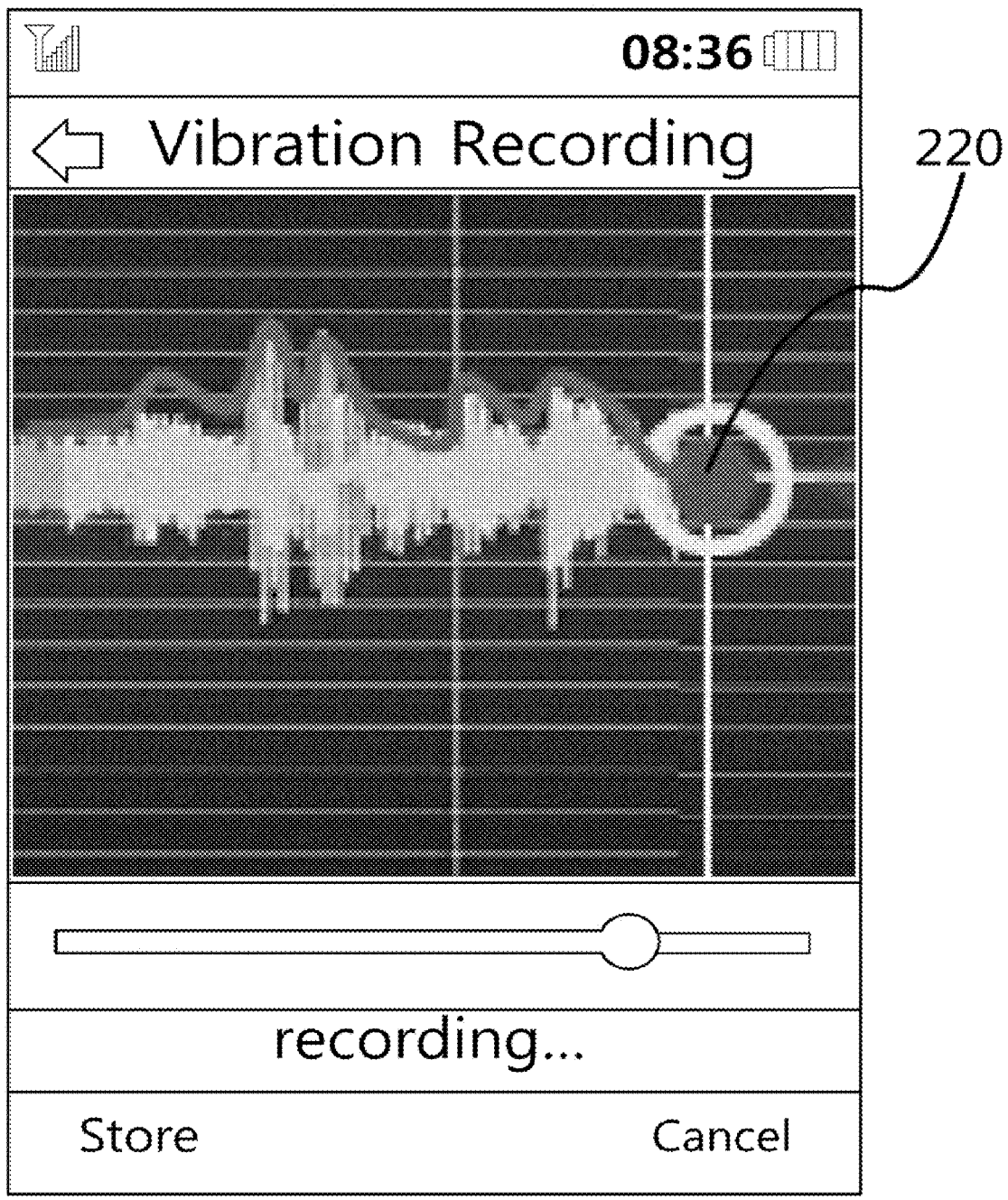

When the Touch Down 210 is applied, the vibration waveform reduces as shown in FIG. 36. When the Touch Down & Press Down 220 is applied, the vibration waveform increases as shown in FIGS. 37 and 38. Thus, the vibration waveform fluctuating with the time is stored as the vibration pattern.

Since the stored vibration pattern can be used as a call notification vibration, the user can generate and use the vibration pattern to his/her taste. A plurality of vibration patterns can be generated and stored. In this case, different vibration patterns can be mapped to groups of the contact information respectively.

When the touch screen displays the pond contents including the fish as the wallpaper as mentioned earlier, the concentric ripples in the size according to the touch pressure are displayed at the touch point. At this time, the sound of dropping the water can be also output according to the touch pressure.

2.7 Setting/Executing a Function According to the Touch Pressure

The touch pressure can be measured and a different function can be set/executed according to the measured touch pressure. This implies that one of various functions is selected and set/executed according to the touch pressure, to be explained with various examples.

FIGS. 39 through 44 depict a method for executing a main menu item according to the touch input.

Figure 39:
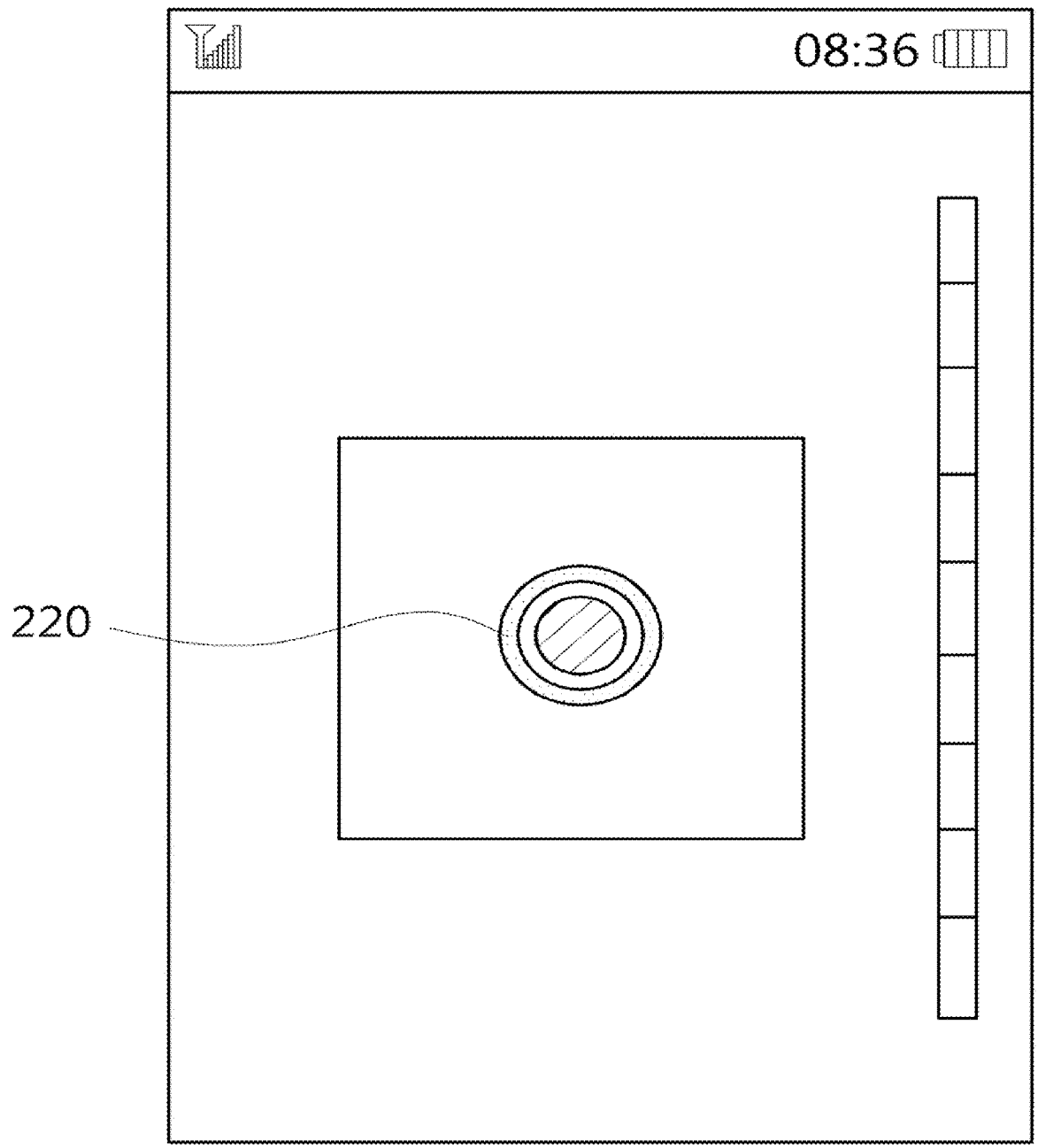
Figure 40:
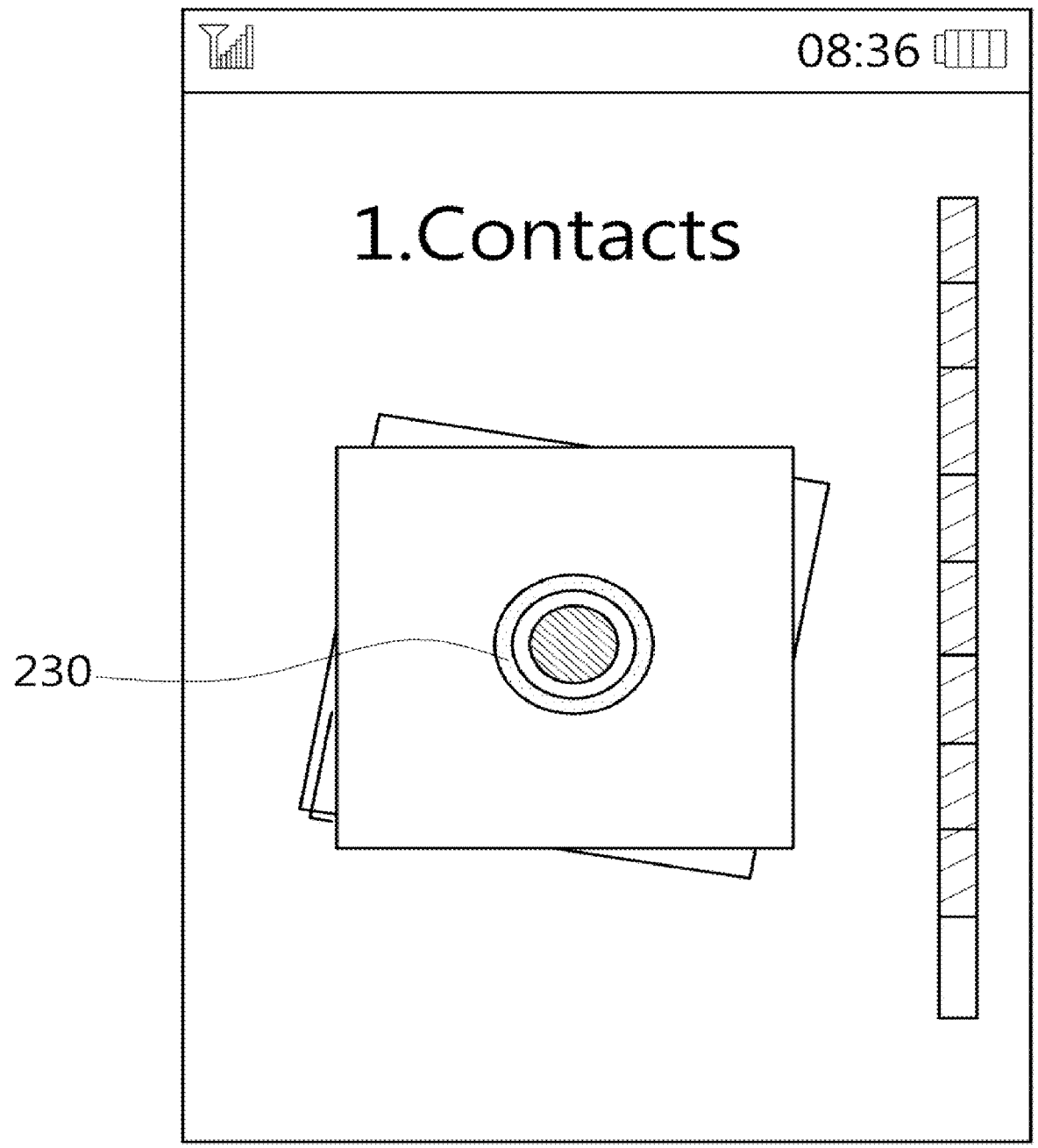

When the Touch Down & Press Down 220 is applied to an icon displayed in the touch screen as shown in FIG. 39, the first main menu item "Contacts" of the icon appears as shown in FIG. 40. On the right side of the touch screen, the touch pressure is represented as the gauge. The size of the touch pressure is the level −1.

Figure 41:
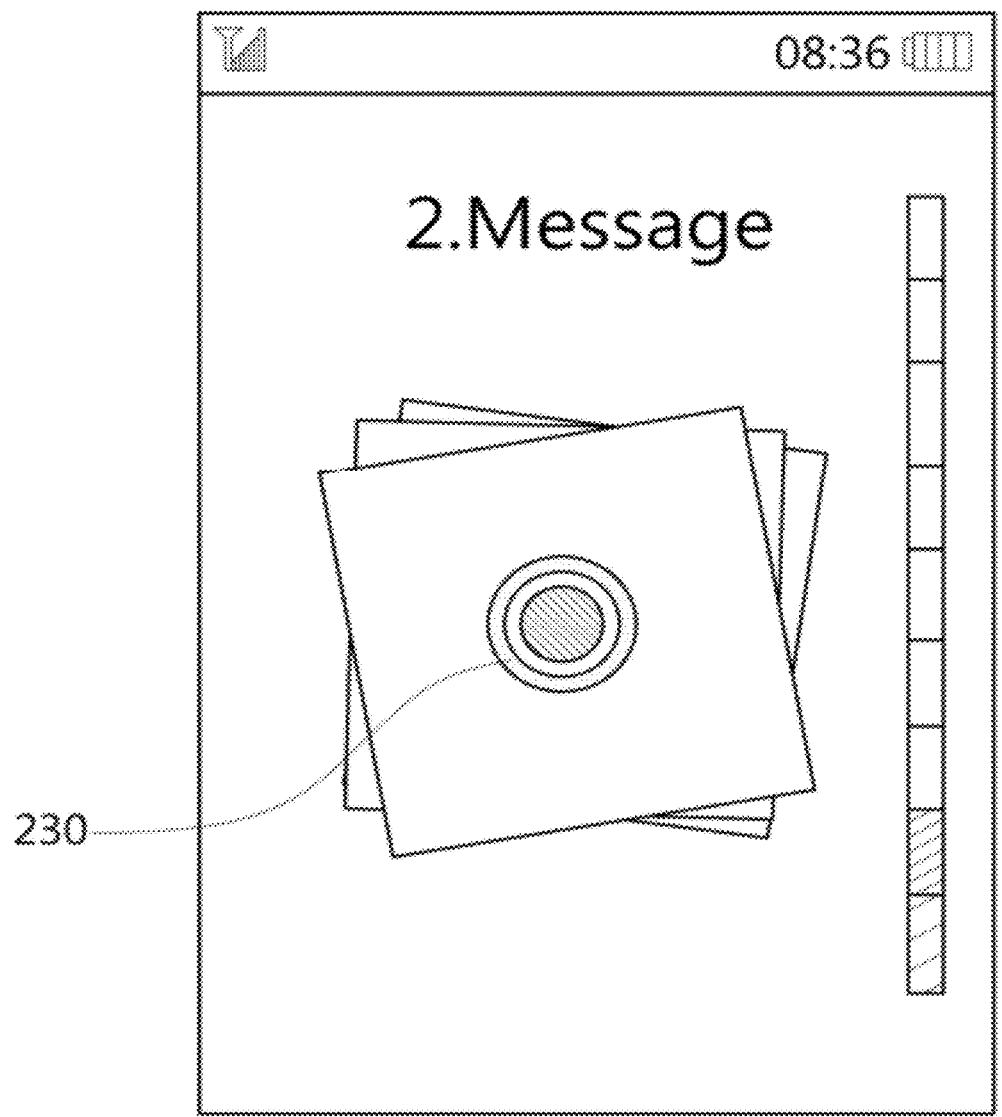

When the touch manipulation is changed to the Touch Down & Press Down & Stronger 230 and the greater touch pressure is applied in FIG. 40, the magnitude of the touch pressure increases to the level −2 and the second main menu item "Message" of the icon appears at the same time as shown in FIG. 41.

Figure 42:
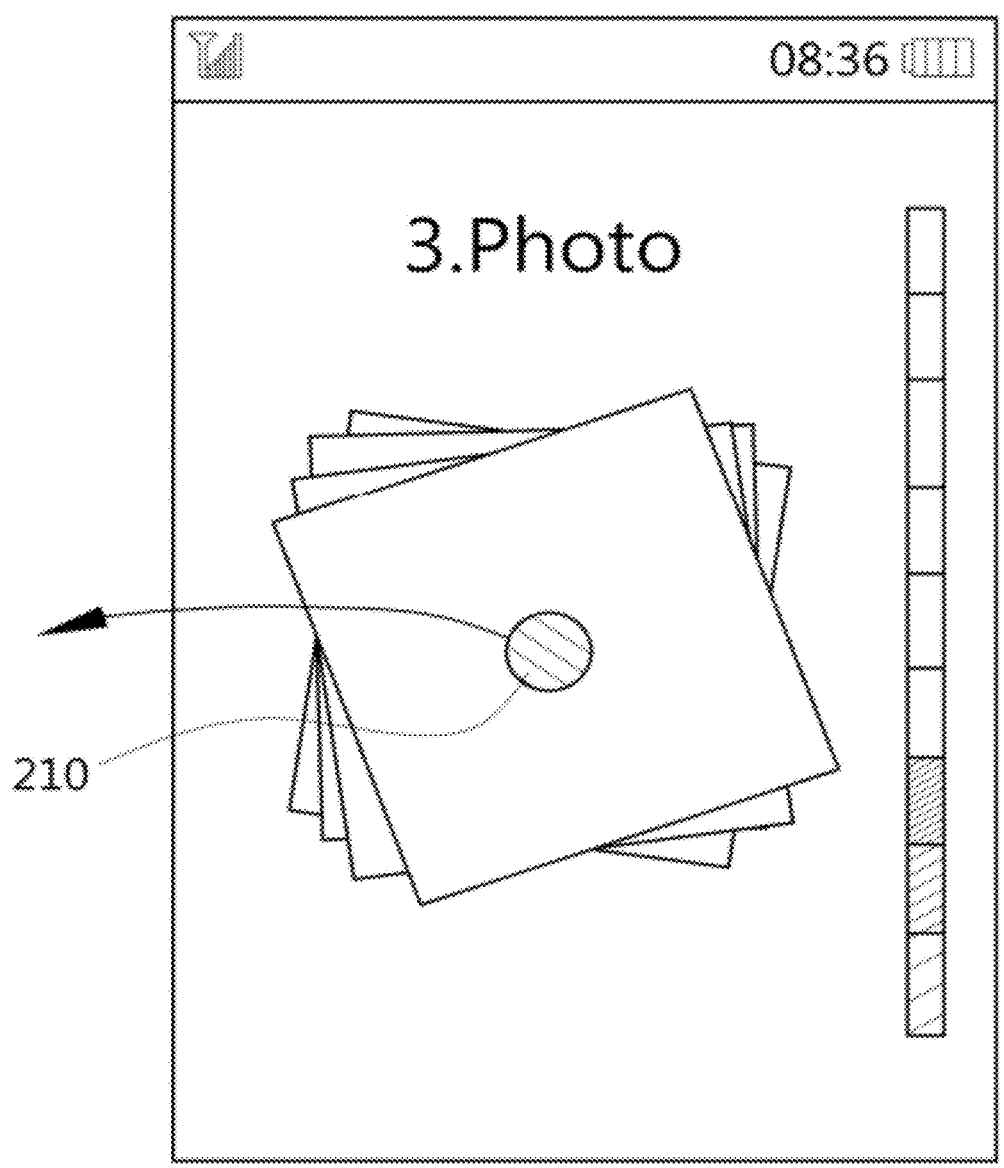

When the touch manipulation sustains the Touch Down & Press Down & Stronger 230 and the even greater touch pressure is applied in FIG. 41, the magnitude of the touch pressure increases to the level −3 and the third main menu item "Photo" of the icon appears at the same time as shown in FIG. 42.

Figure 43:
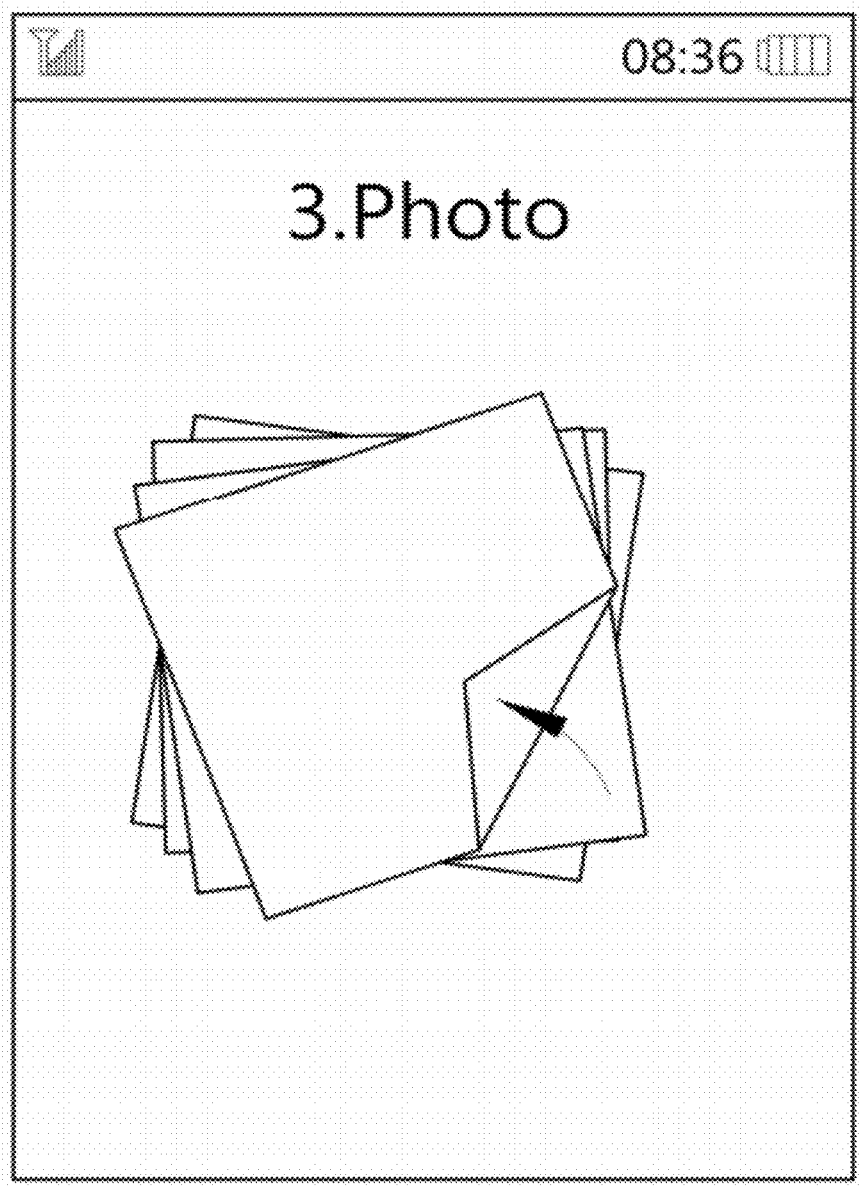
Figure 44:
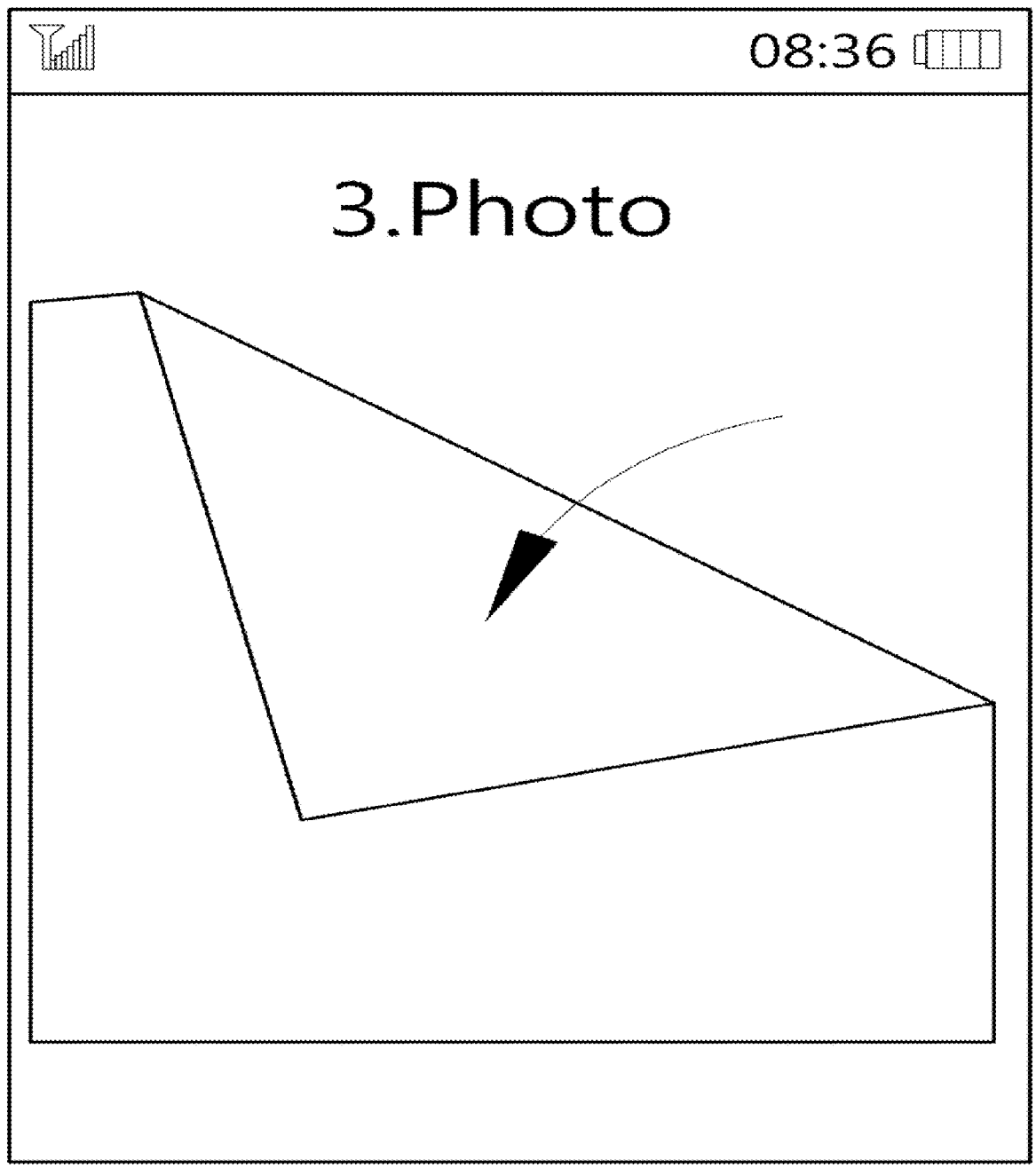

When the Touch Down 210 is applied to "Photo" in the touch screen and "Photo" is flickered to the left as shown in FIG. 42, the item "Photo" is turned over and photo contents are played as shown in FIGS. 43 and 44.

FIGS. 45 through 54 depict a method for selecting and executing the item according to the touch pressure.

Figure 45:
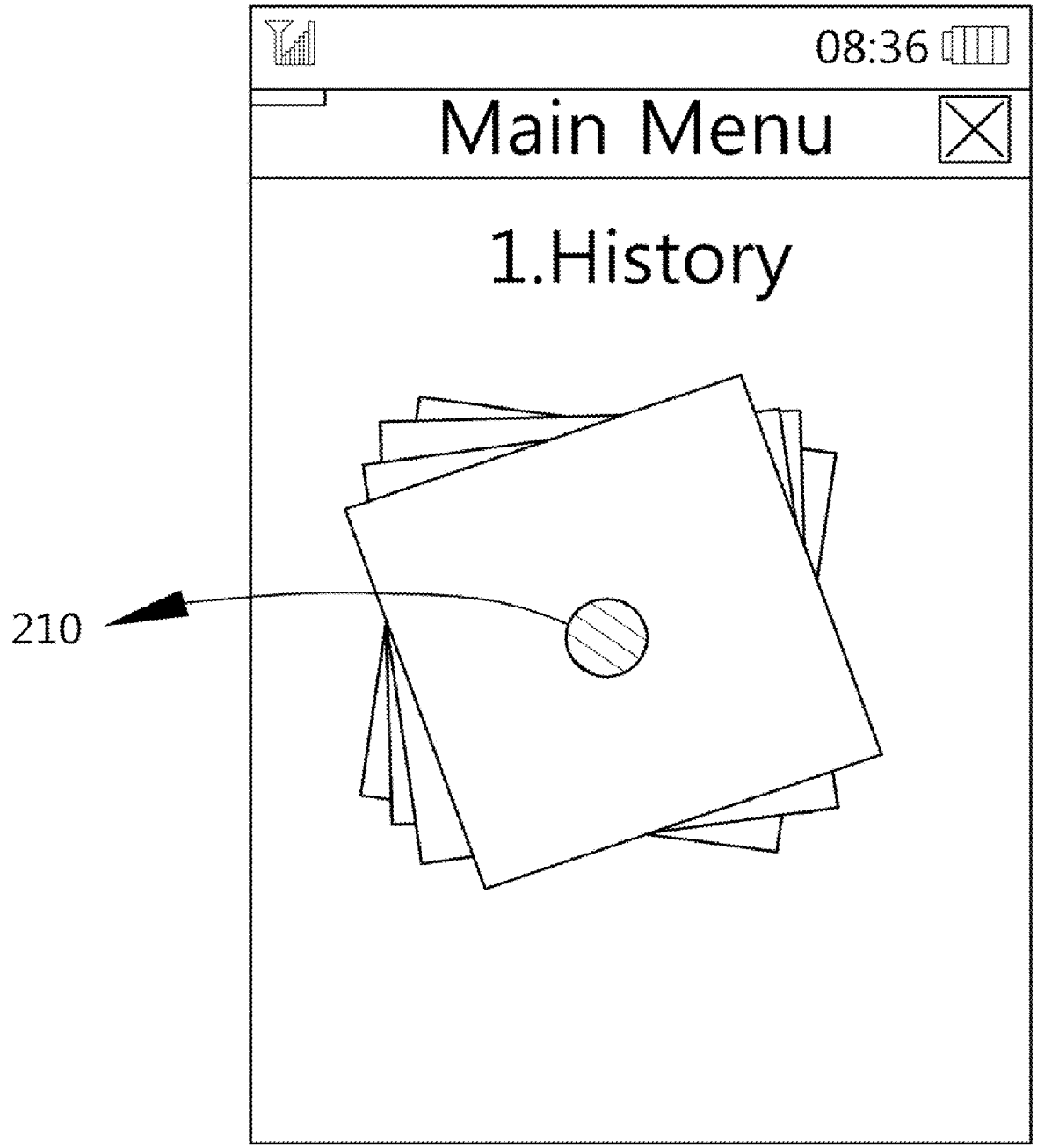
Figure 46:
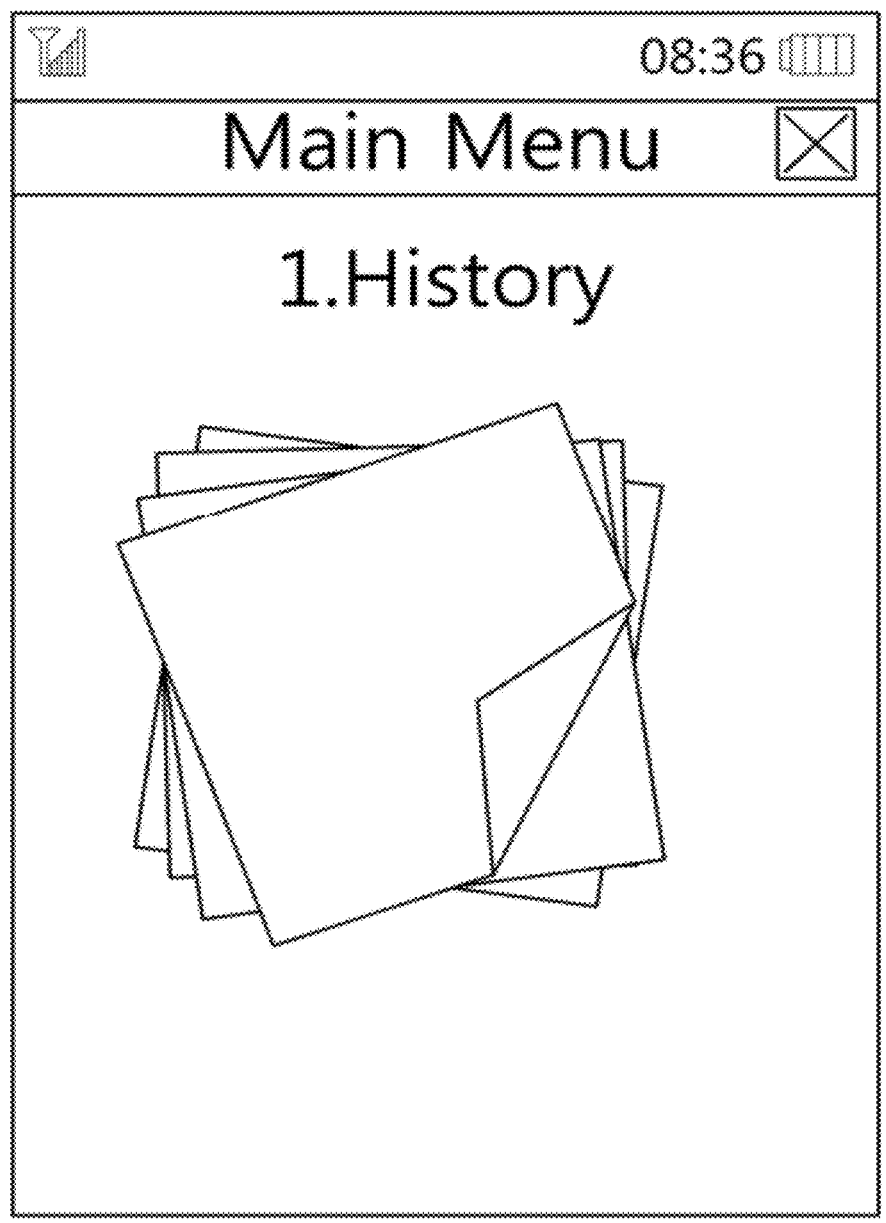
Figure 47:
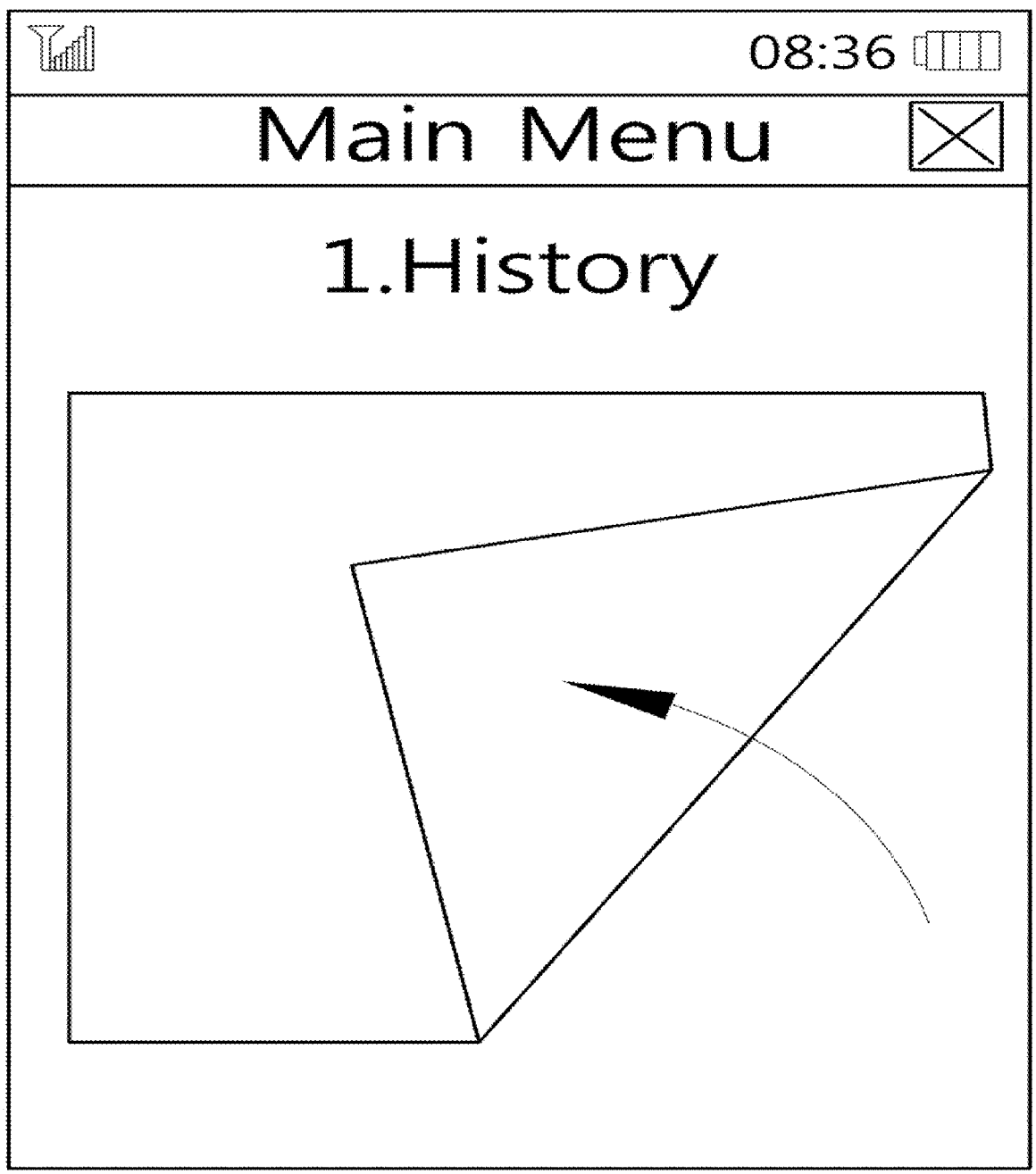

When the Touch Down 210 is applied a menu item "History" in the touch screen to flicker as shown in FIG. 45, the item "History" is turned over and executed as shown in FIGS. 46 and 47.

Figure 48:
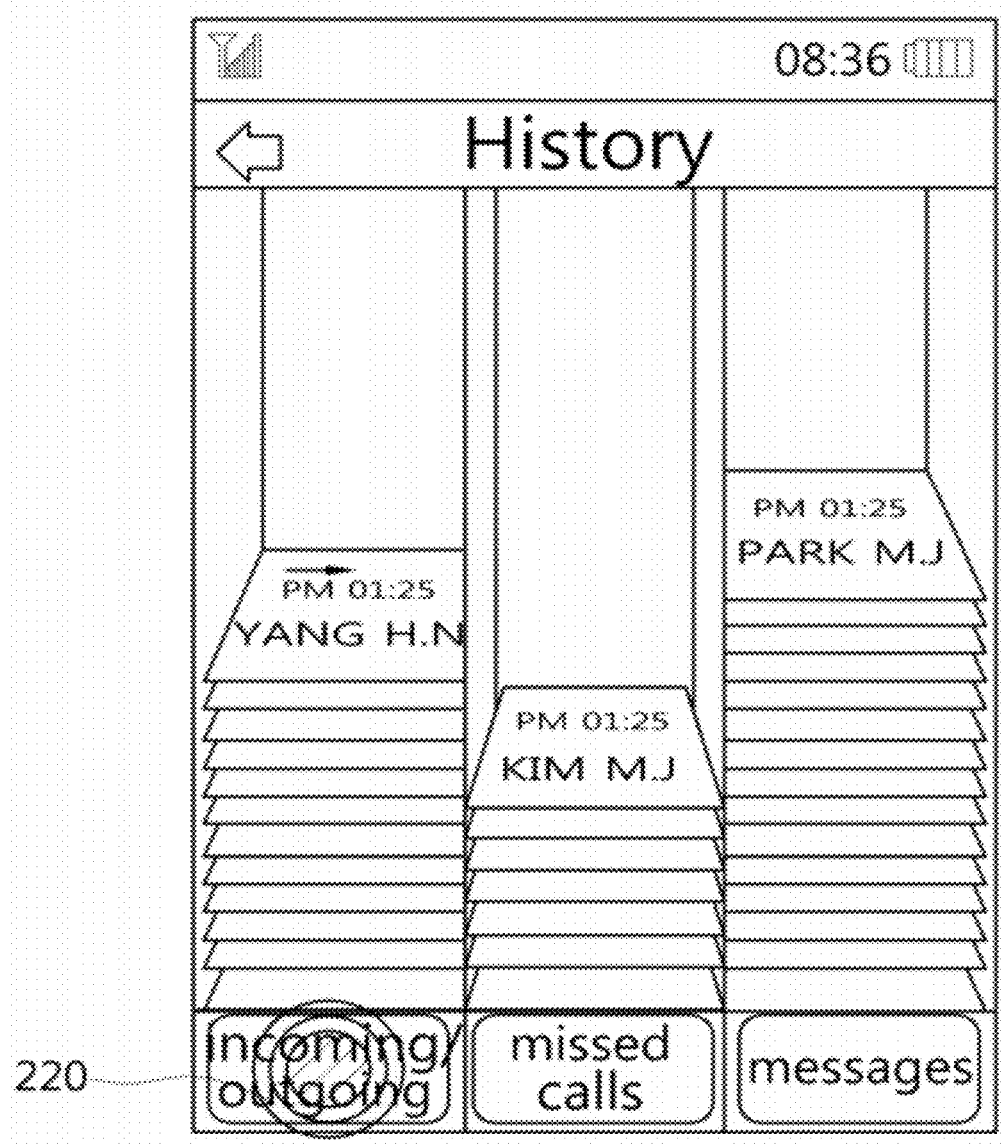
Figure 49:
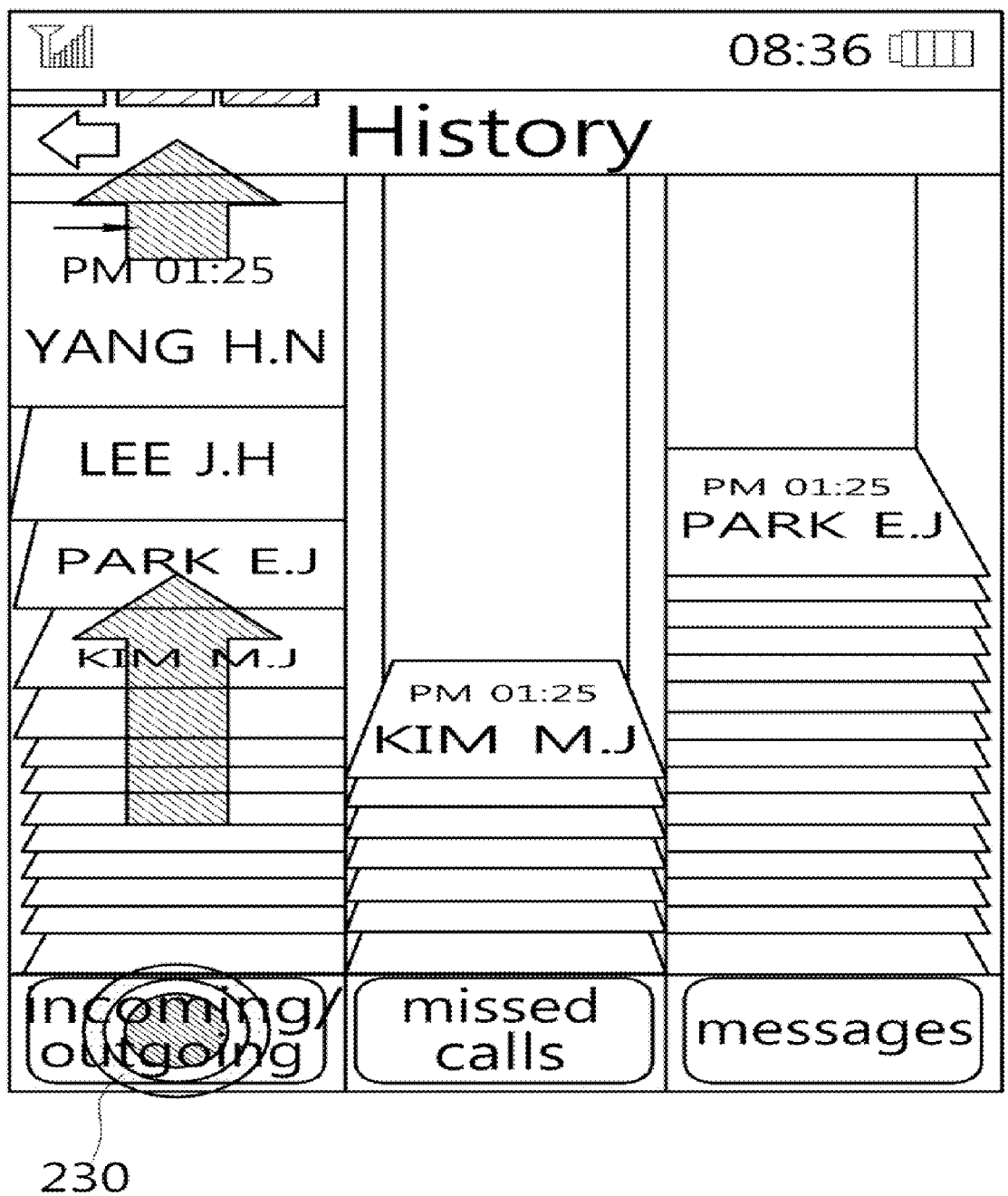

As a result, call records are displayed in the touch screen as shown in FIG. 48. When the Touch Down & Press Down 220 is applied to the item "incoming and outgoing" in FIG. 48, incoming and outgoing records are scrolled in order as shown in FIG. 49. When the touch manipulation is changed to the Touch Down & Press Down & Stronger 230 and the touch pressure increases as shown in FIG. 49, the scroll speed of the incoming and outgoing records increases as shown in FIG. 50.

Figure 50:
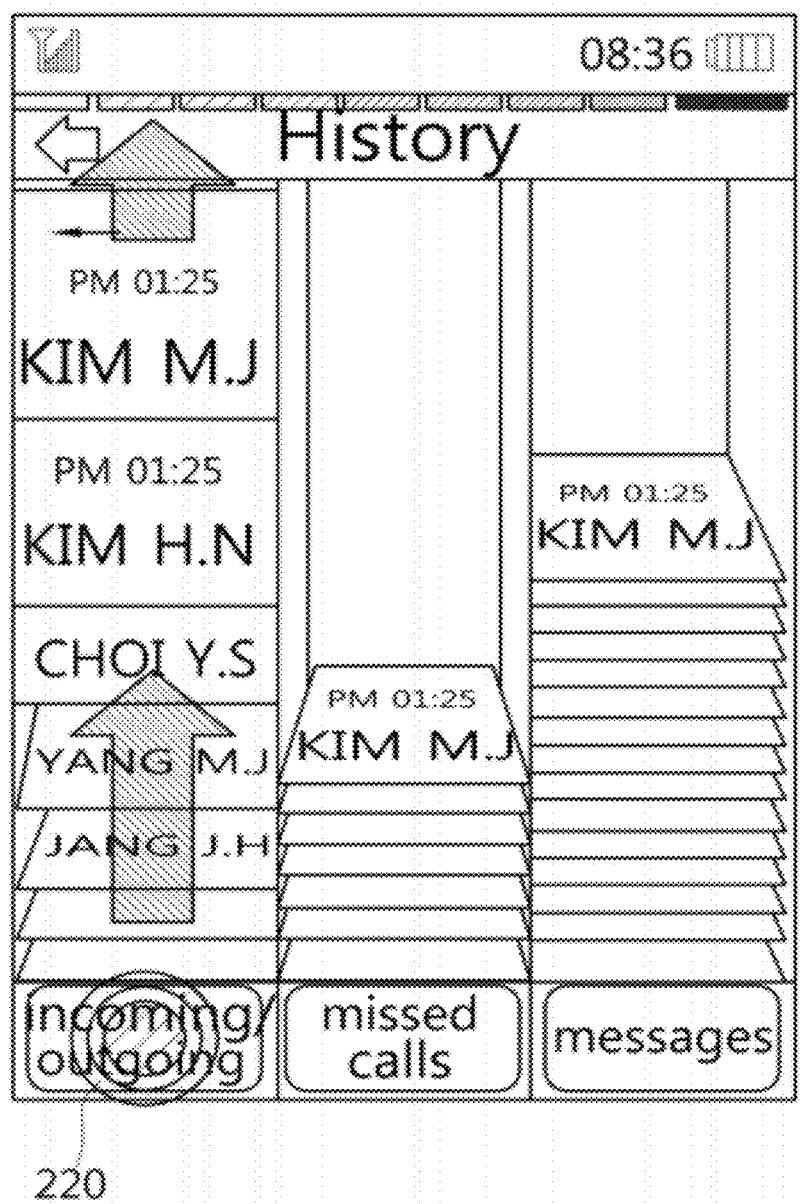
Figure 51:
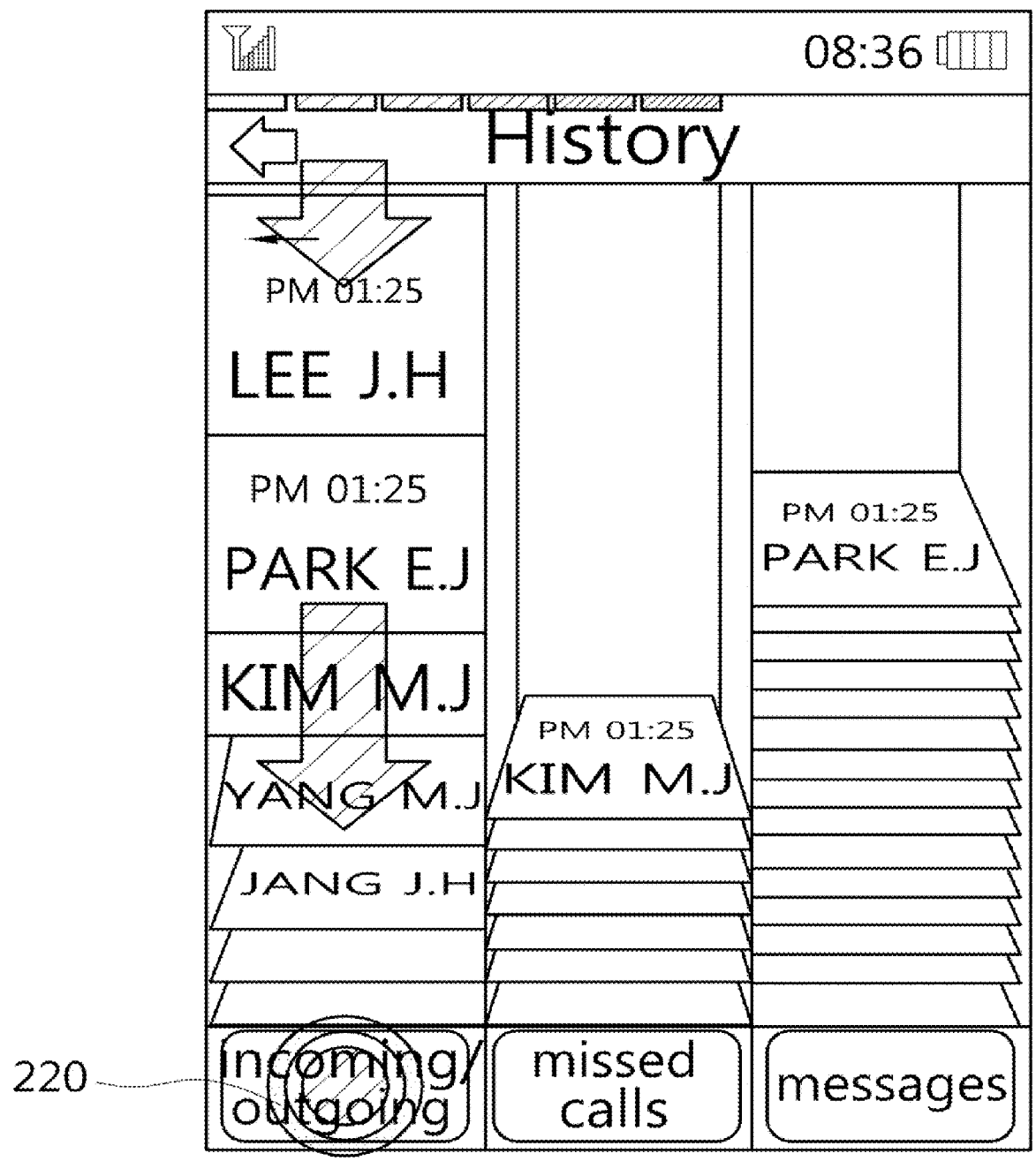

When the touch manipulation is changed to the Touch Down & Press Down 220 and the touch pressure decreases as shown in FIG. 50, the scroll direction is switched as shown in FIG. 51. Namely, the scroll direction and speed of the call records are determined by the touch pressure.

Figure 52:
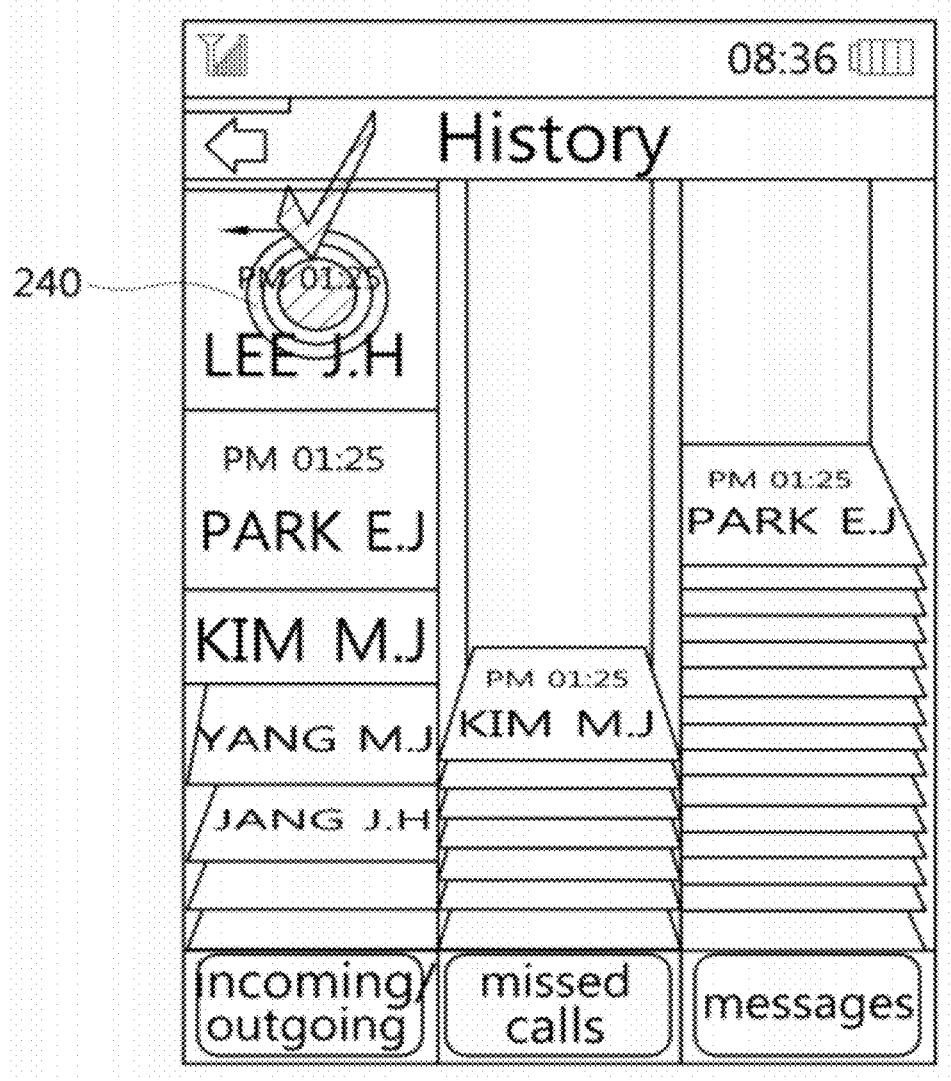
Figure 53:

In so doing, when the Touch Down & Press Down & & Up 240 is applied to a particular call record as shown in FIG. 52, the call is attempted for the call record applied the Touch Down & Press Down & Up 240 as shown in FIG. 53.

A method for automatically setting a text mode according to the touch pressure is illustrated by referring to FIGS. 54 through 59. Particularly, a method for inputting "ㄱ A" is explained in detail.

Figure 54:
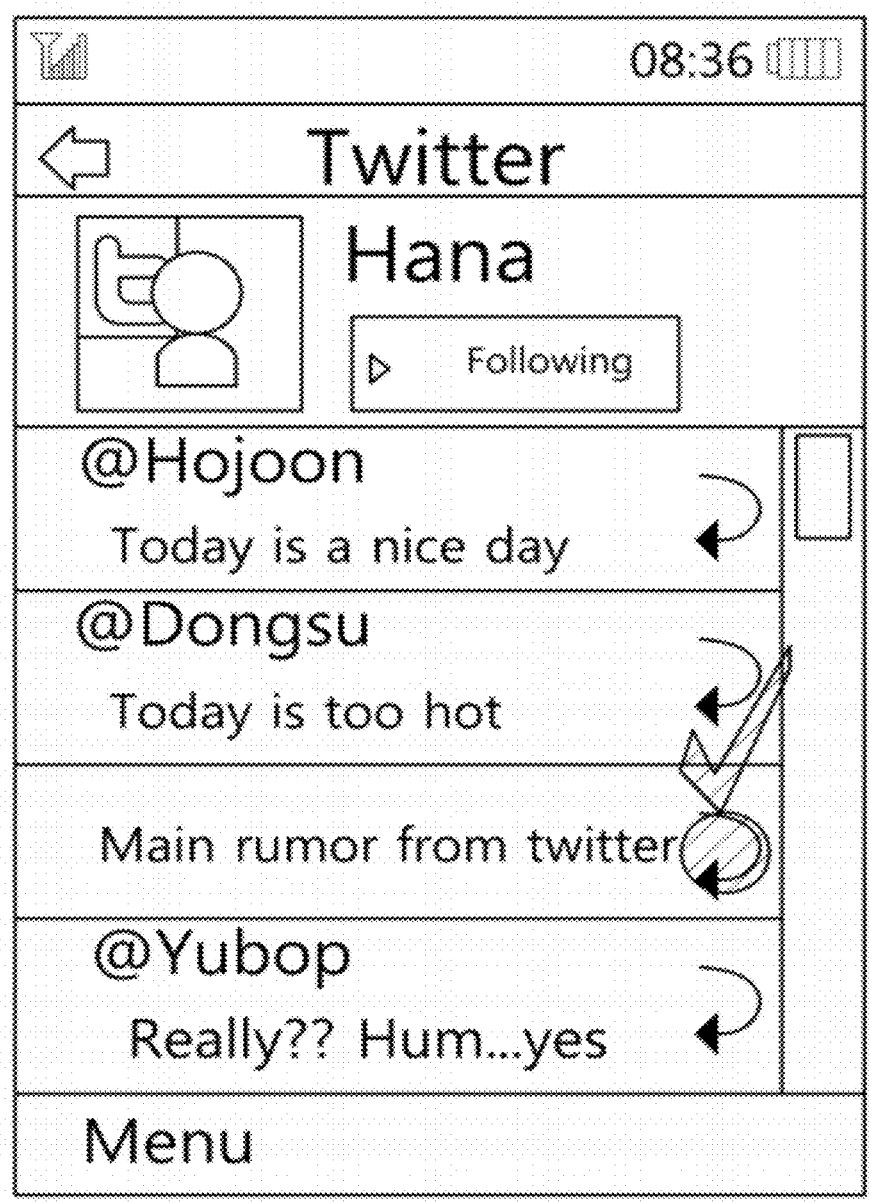
Figure 55:
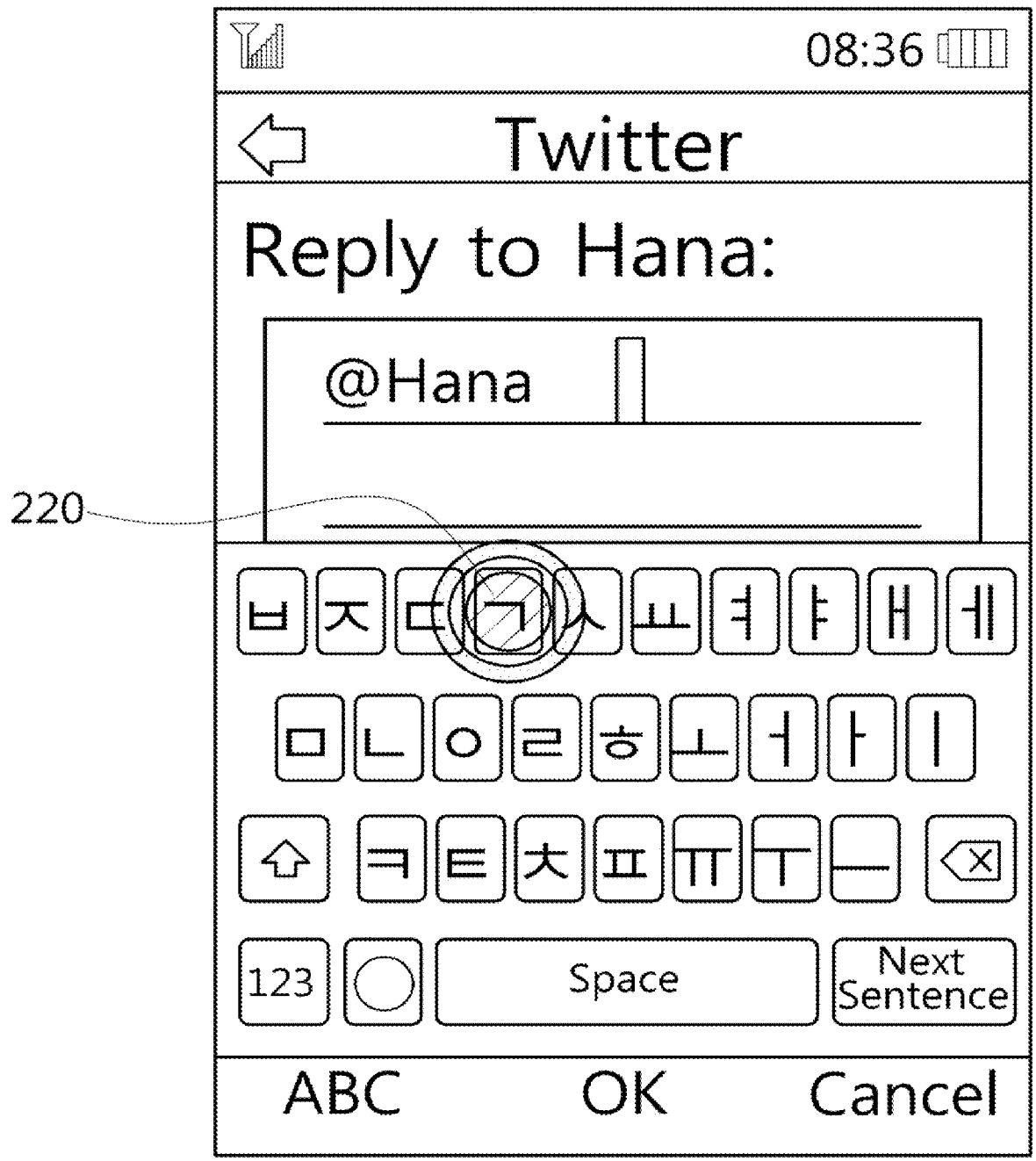
Figure 56:
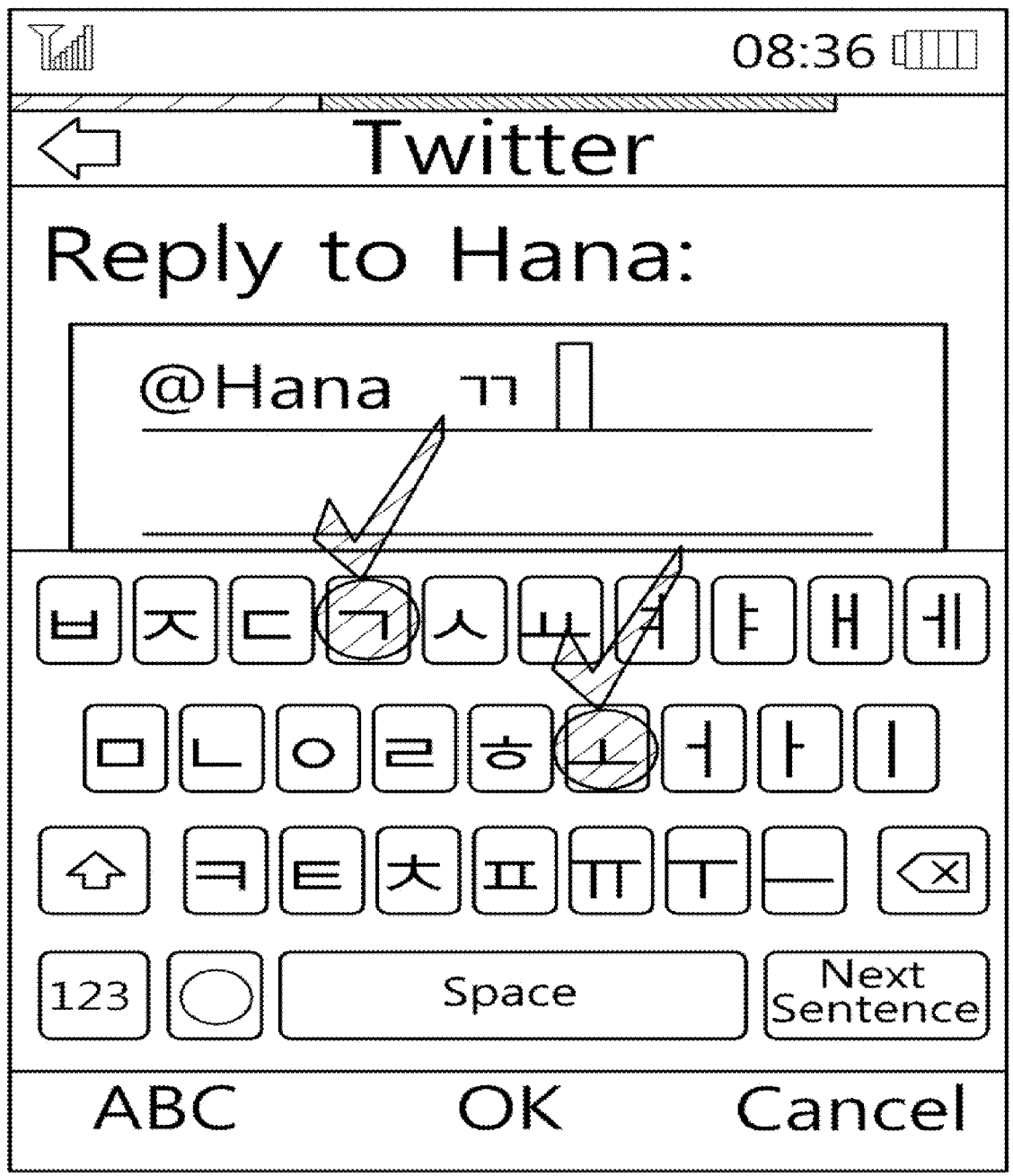

After a replay message input item is tapped and selected as shown in FIG. 54, when the Touch Down & Press Down 220 is applied to a key "ㄱ" as shown in FIG. 55, "ㄲ" is input as shown in FIG. 56. Next, when "ㅗ" and "ㄱ" are tapped in sequence as shown in FIG. 57, "ㄲ" is completed as shown in FIG. 58.

Figure 57:
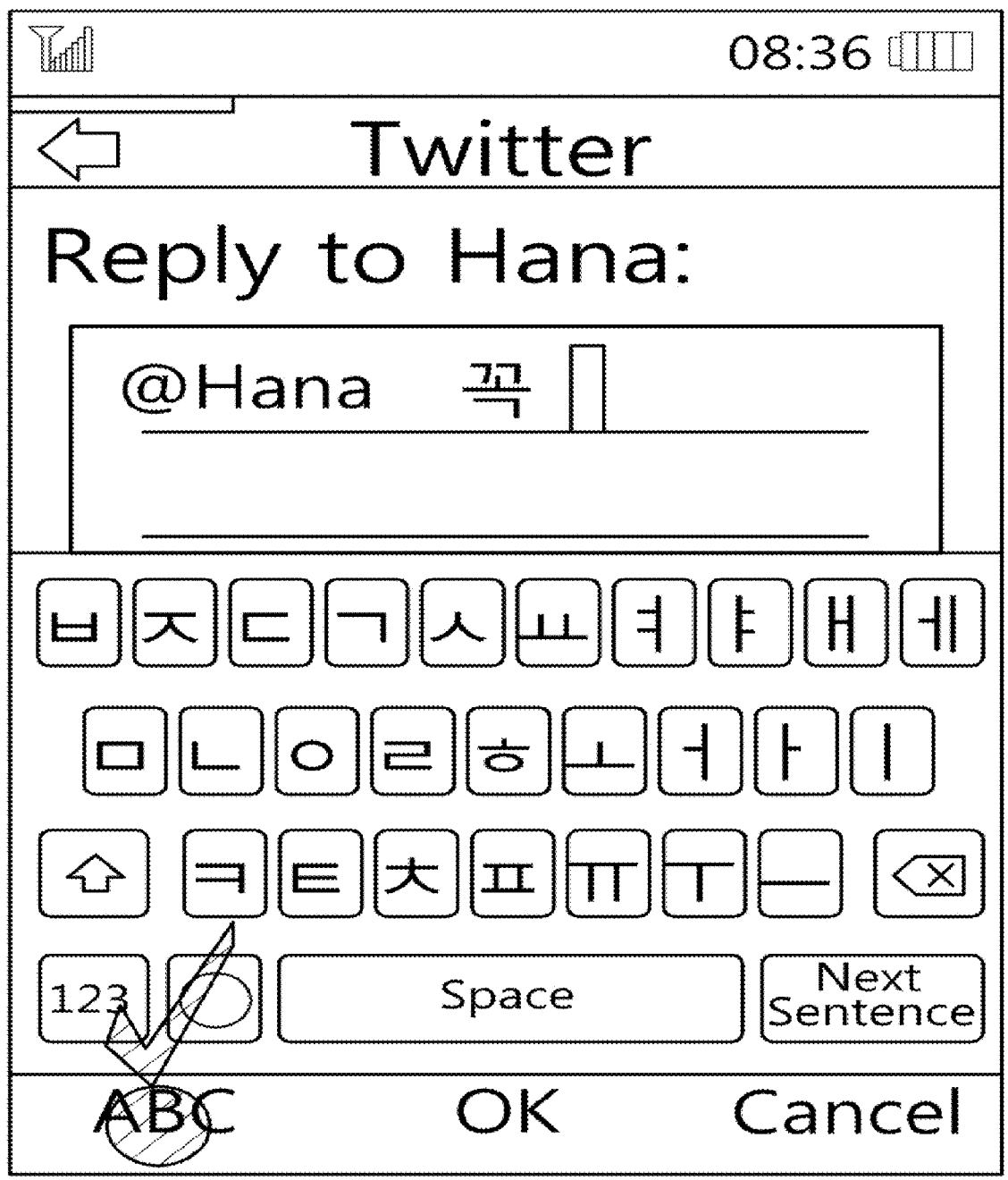
Figure 58:
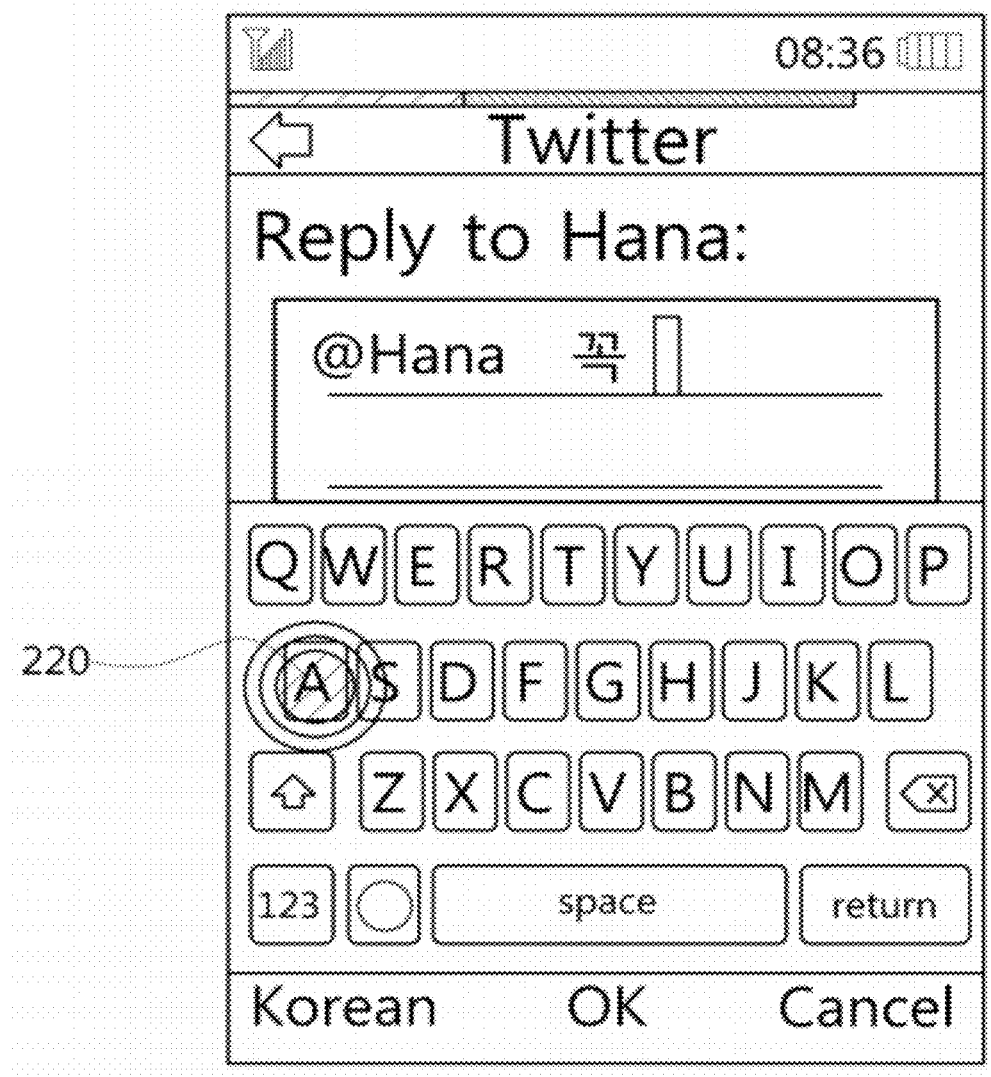
Figure 59:

After a Korea/English conversion icon "ABC" is tapped as shown in FIG. 57, when the Touch Down & Press Down 220 is applied to "A" as shown in FIG. 58, a capital letter "A" in English is input. When "A" is tapped, a lower case "a" is input.

While the corresponding function is executed when the touch pressure has a preset magnitude, the corresponding function may be not carried out when the touch pressure does not have the preset magnitude.

FIGS. 60 through 67 depict an unlocking method based on the touch pressure.

Figure 60:
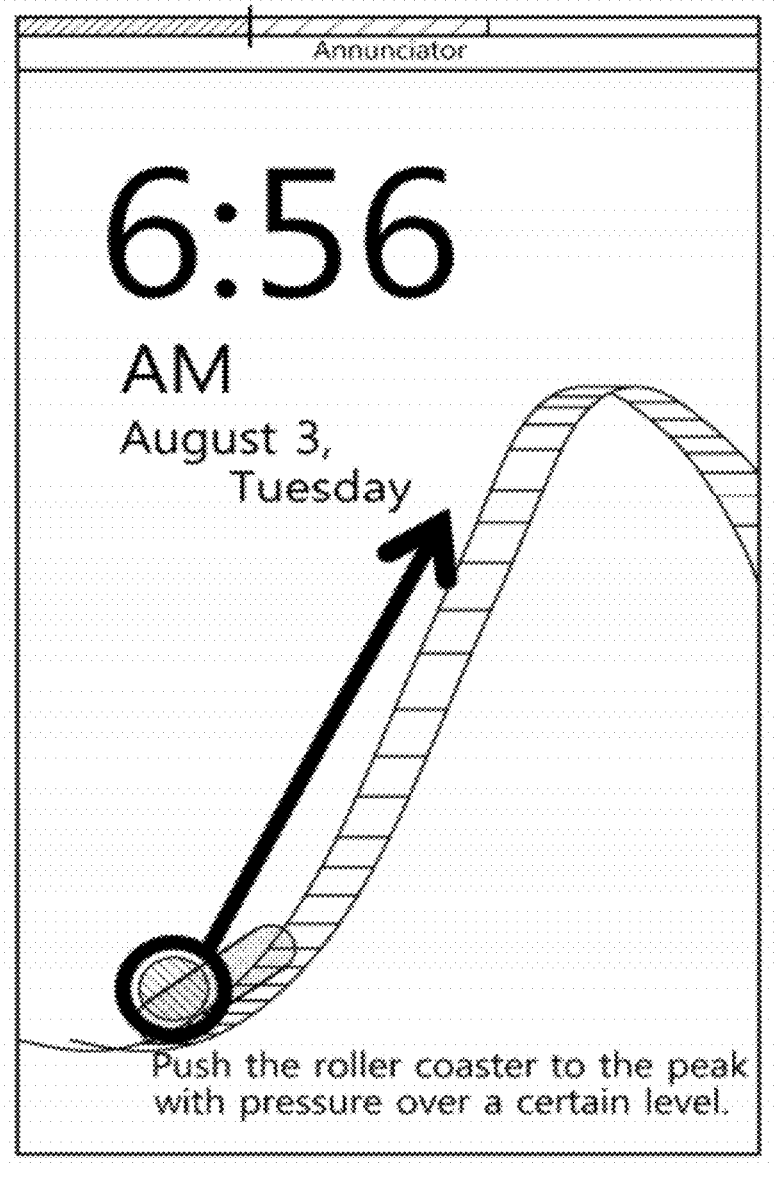
Figure 61:
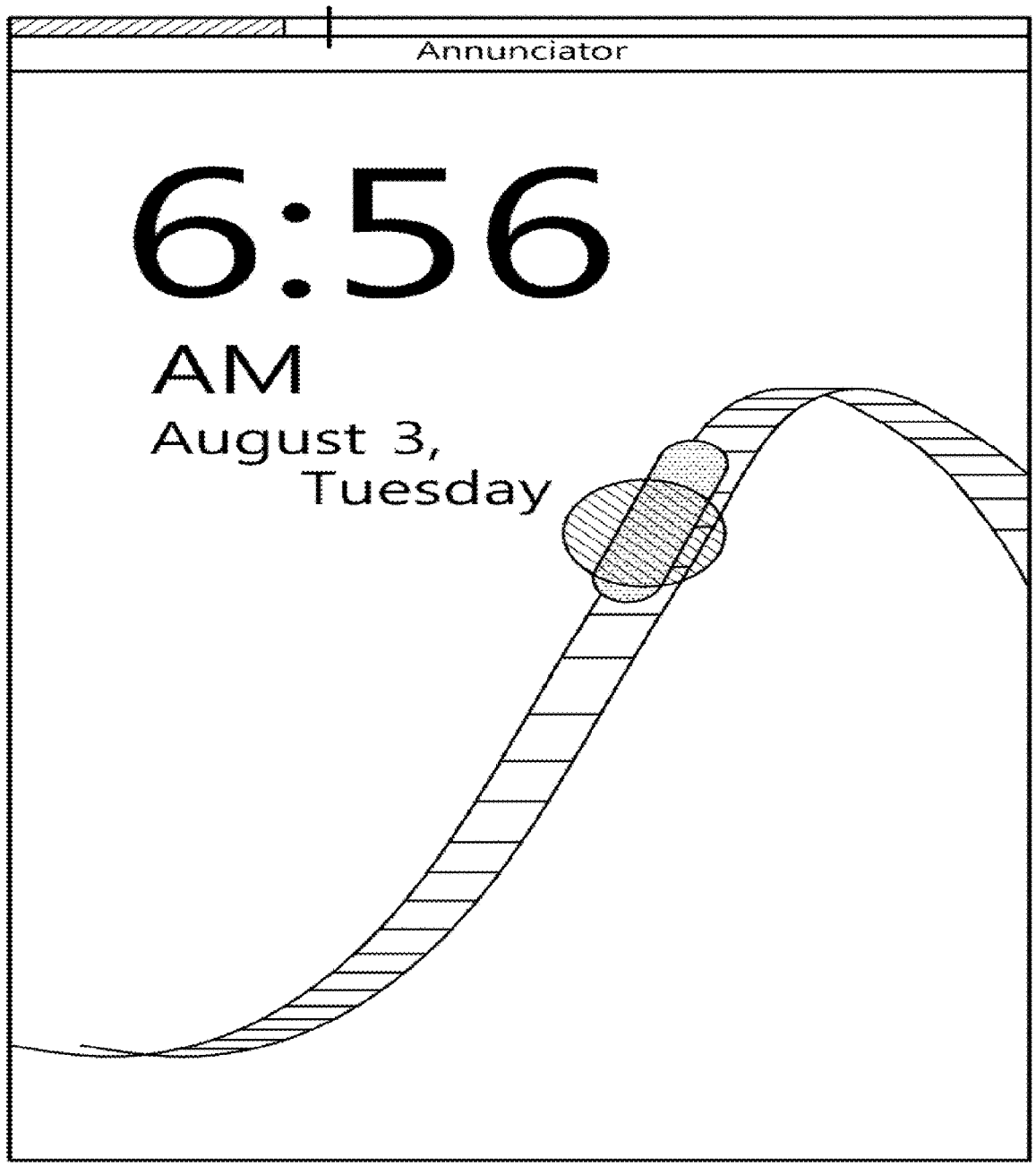

FIG. 60 shows a lock view displayed in the touch screen. At the bottom of the lock view, a phrase for guiding the unlocking method is displayed in FIG. 60. FIG. 61 shows the dragging while the touch pressure over a certain magnitude is applied to a roller coaster. Upon dragging the roller coaster, the guide phrase disappears as shown in FIG. 61.

Figure 62:
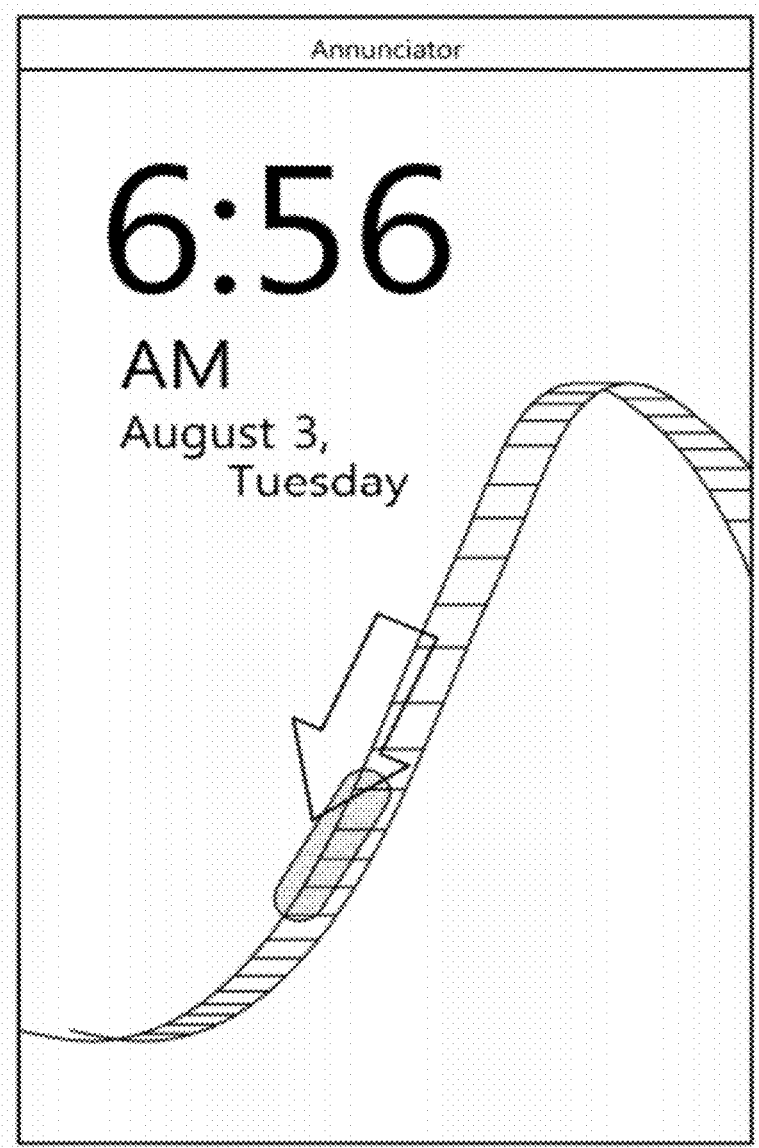
Figure 63:
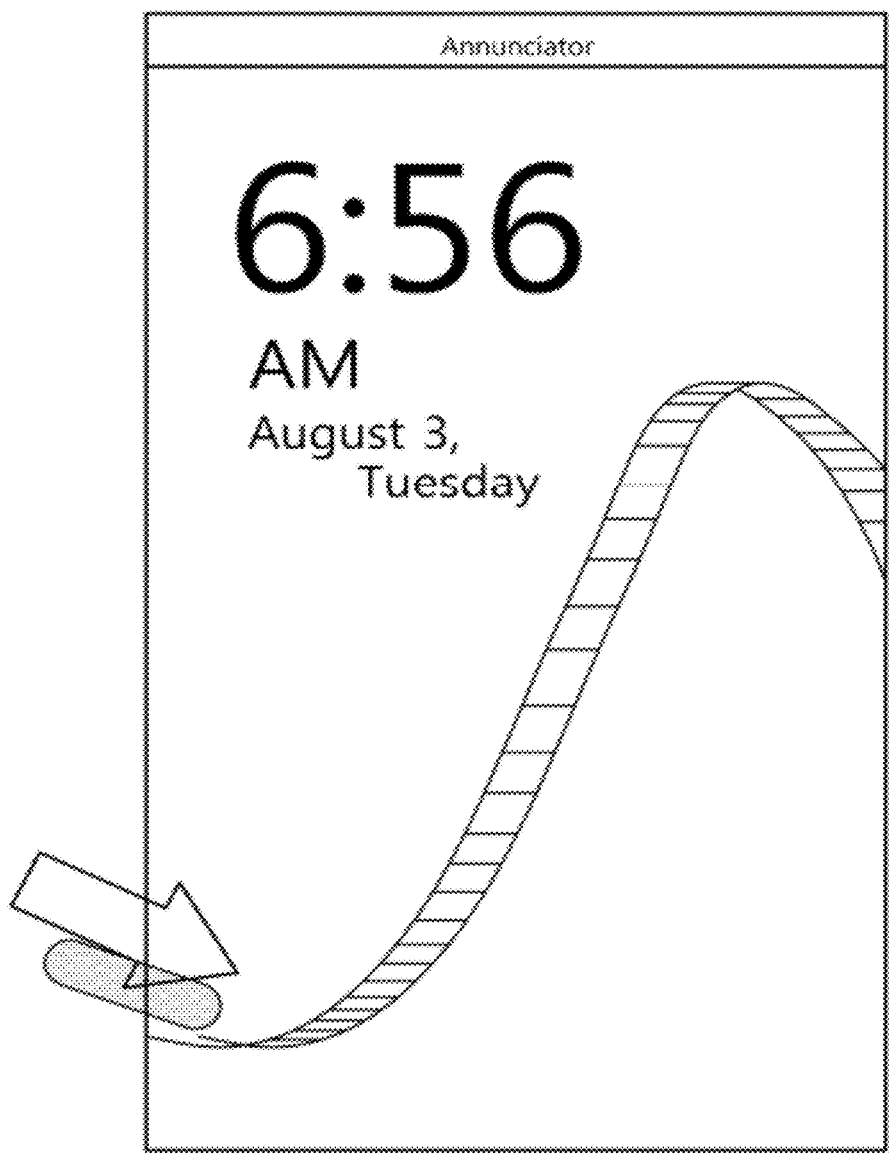

In FIG. 62, the touch pressure applied to the roller coaster falls below a particular magnitude and the roller coaster falls. Next, the roller coaster is pushed back by the rebound and then returns to the initial position as shown in FIG. 63. When the roller coaster returns to its initial position, the guide phrase reappears.

Figure 64:
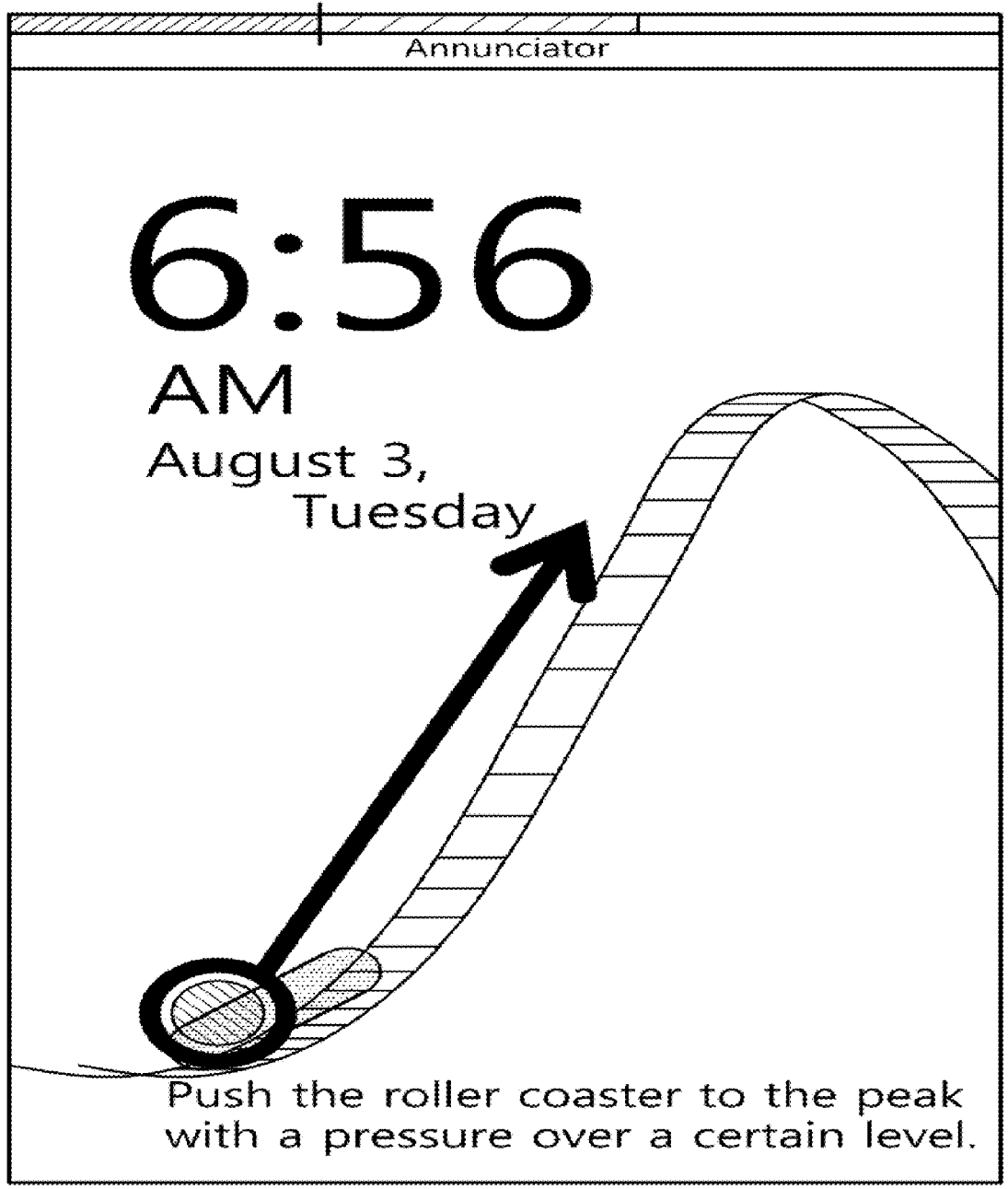
Figure 65:
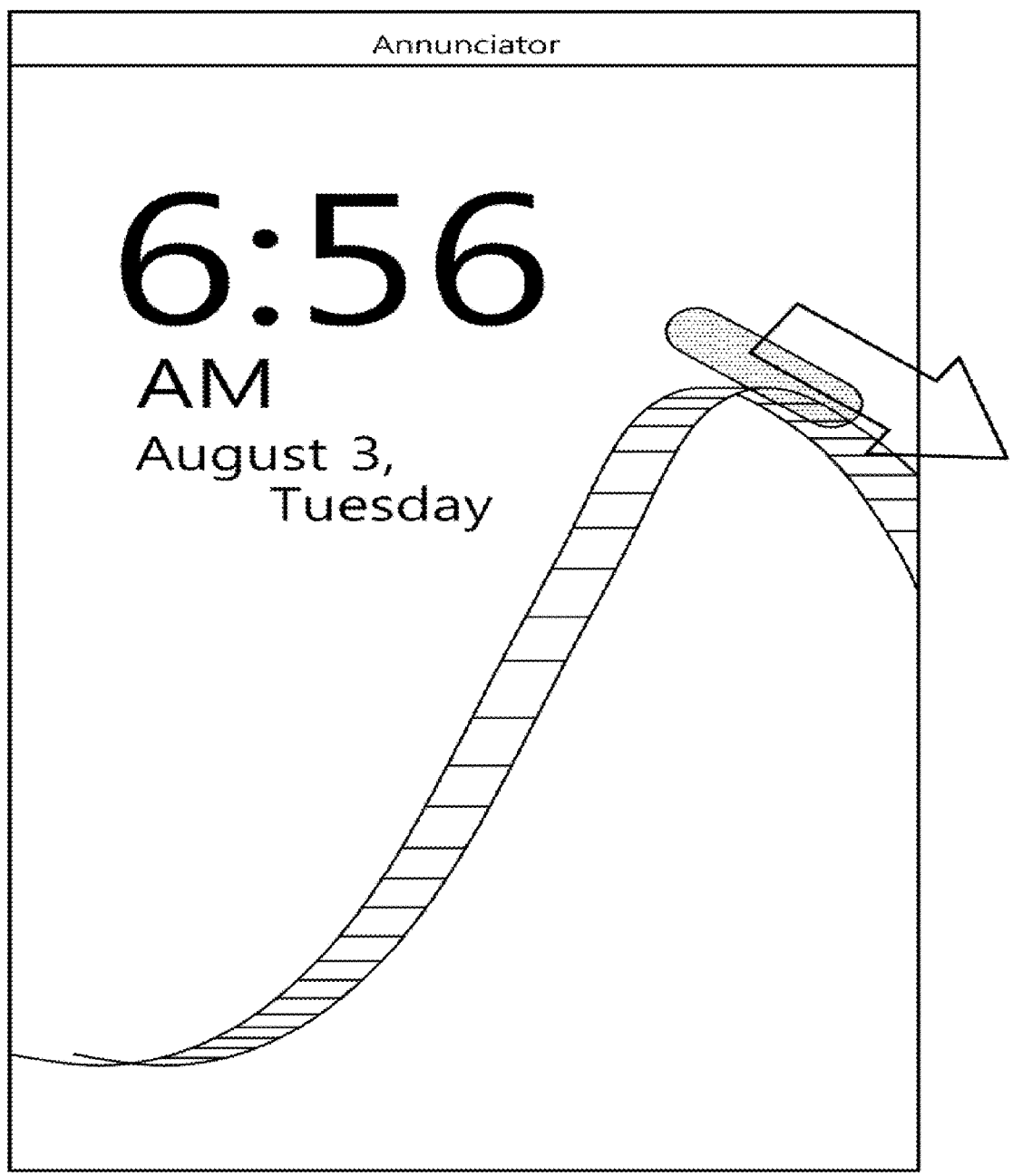
Figure 66:
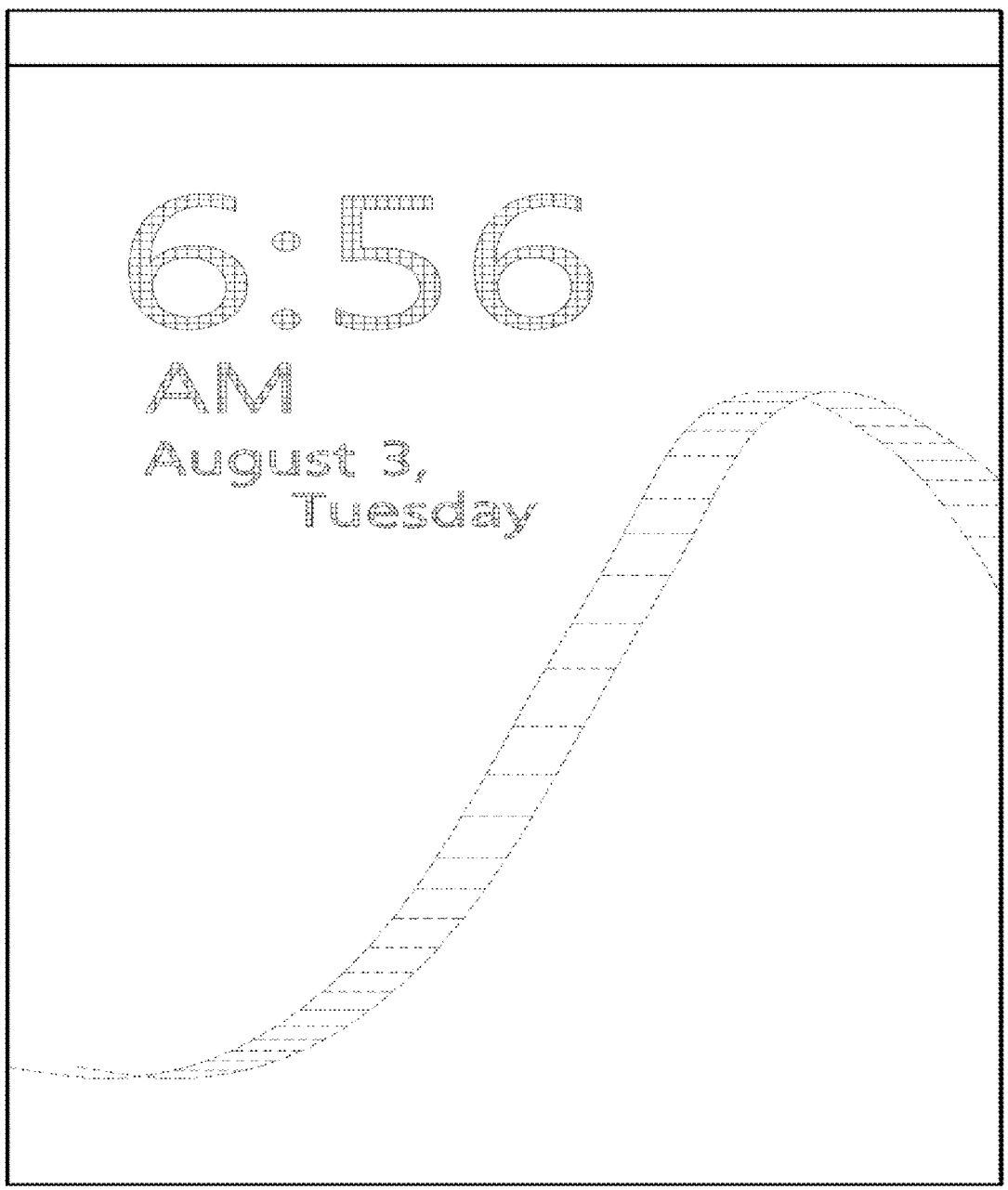
Figure 67:
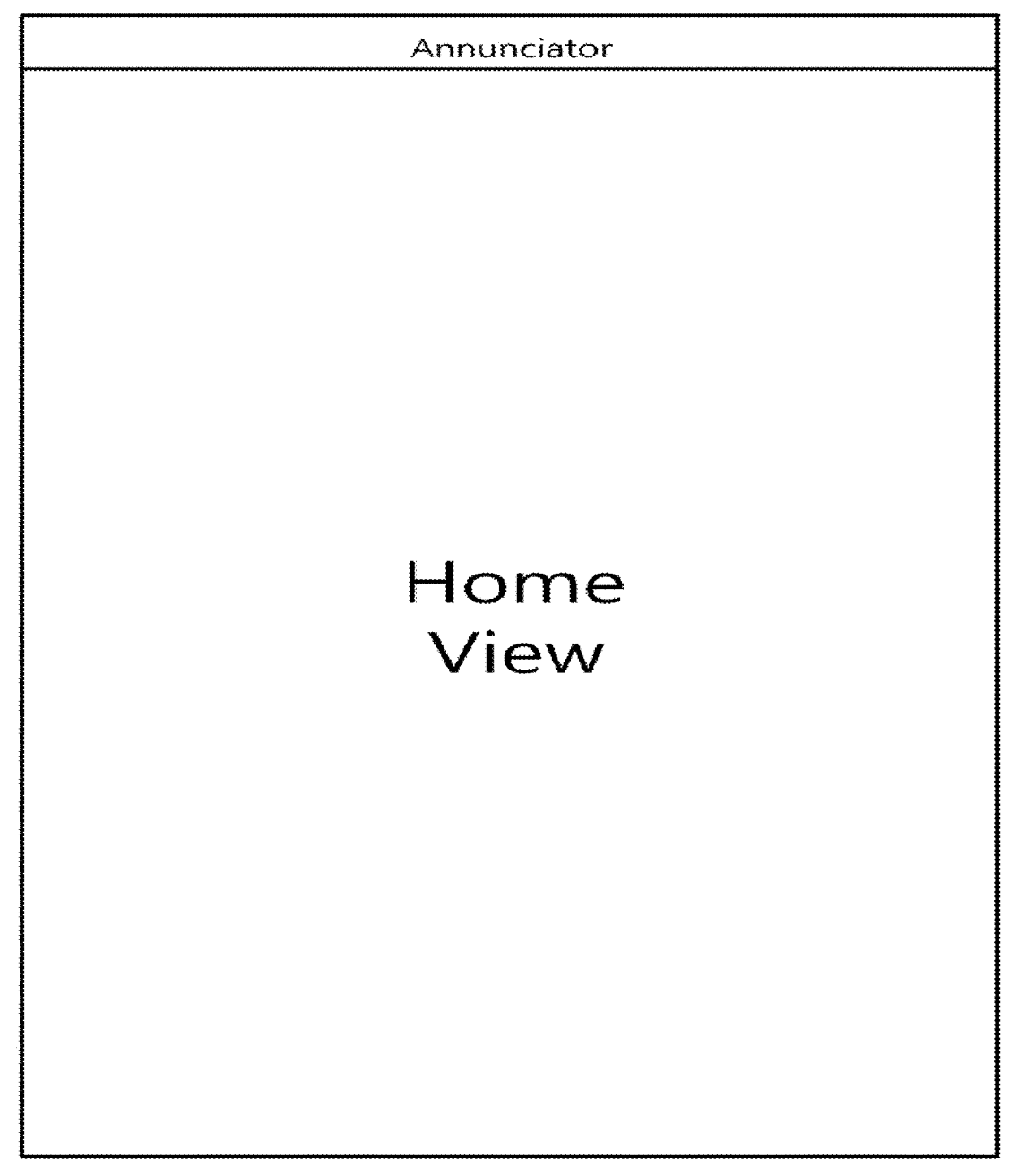

When the roller coaster is dragged to the peak while applying the touch pressure over a certain magnitude as shown in FIG. 64, the roller coaster automatically moves along the download slope as shown in FIG. 65. Next, as the lock view gradually disappears from the touch screen as shown in FIG. 66, the initial view slowly appears. FIG. 67 shows the initial view.

FIGS. 68 through 75 depict another unlocking method based on the touch pressure. Herein, an unlock pressure pattern is predefined, and the unlock is accomplished by inputting the predefined pressure pattern.

Figure 68:
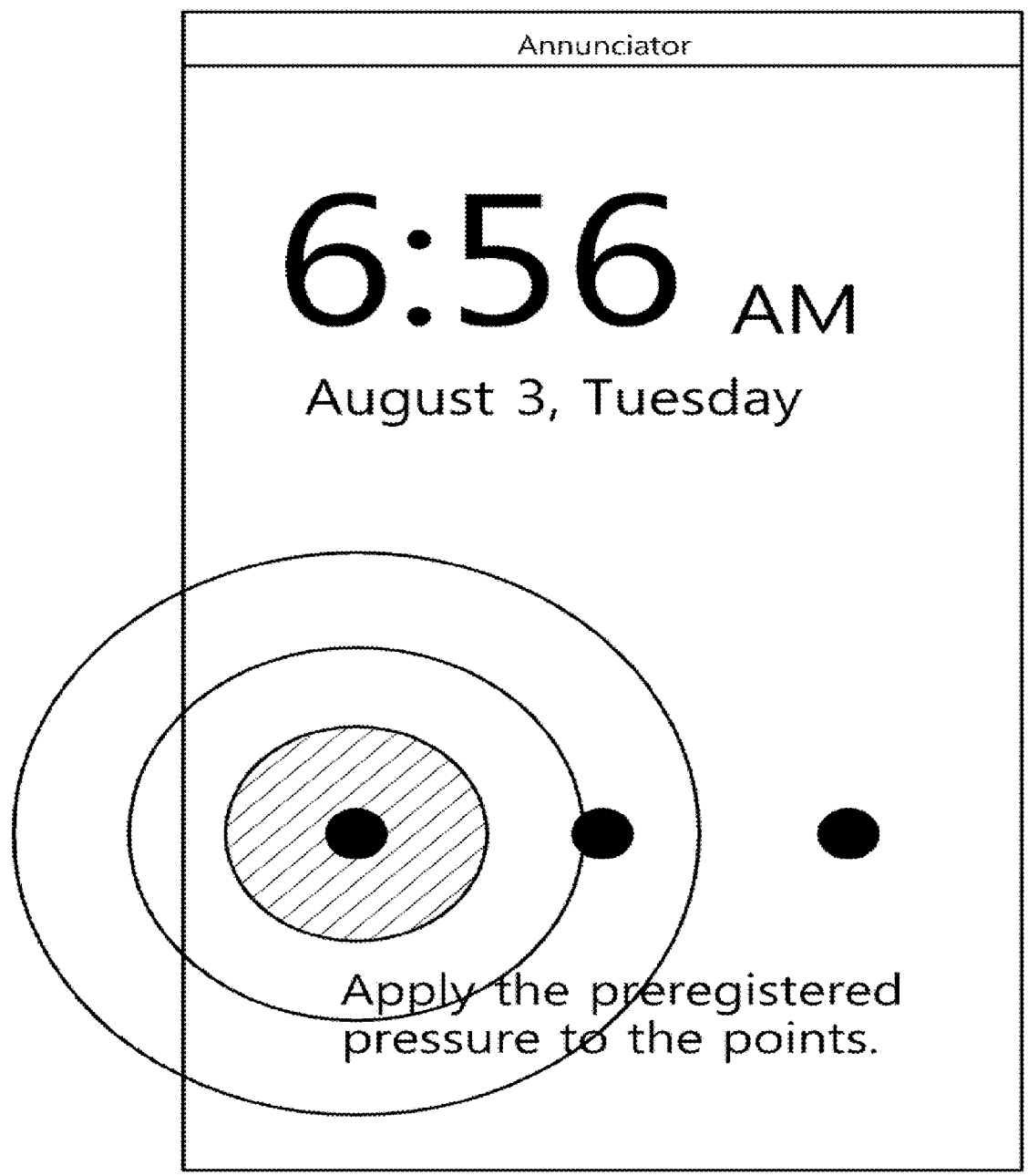

FIG. 68 shows a lock view displayed in the touch screen. A phrase for guiding the unlock method is displayed at the bottom of the lock view in FIG. 68. As shown in the guide phrase, for the unlocking, it is necessary to input the predefined pressure pattern at three points at the bottom of FIG. 68.

Herein, it is assumed that the pressure pattern is "medium-strong-weak". The pressure pattern "medium-strong-weak" implies that the touch pressure of the medium level is applied to the left point, the touch pressure of the high level is applied to the middle point, and the touch pressure of the low level is applied to the right point.

Figure 69:

The wrong touch pressure of the low level is applied to the left point in FIG. 68, and the wrong touch pressure of the high level is applied to the left point in FIG. 69.

Figure 70:
Figure 71:
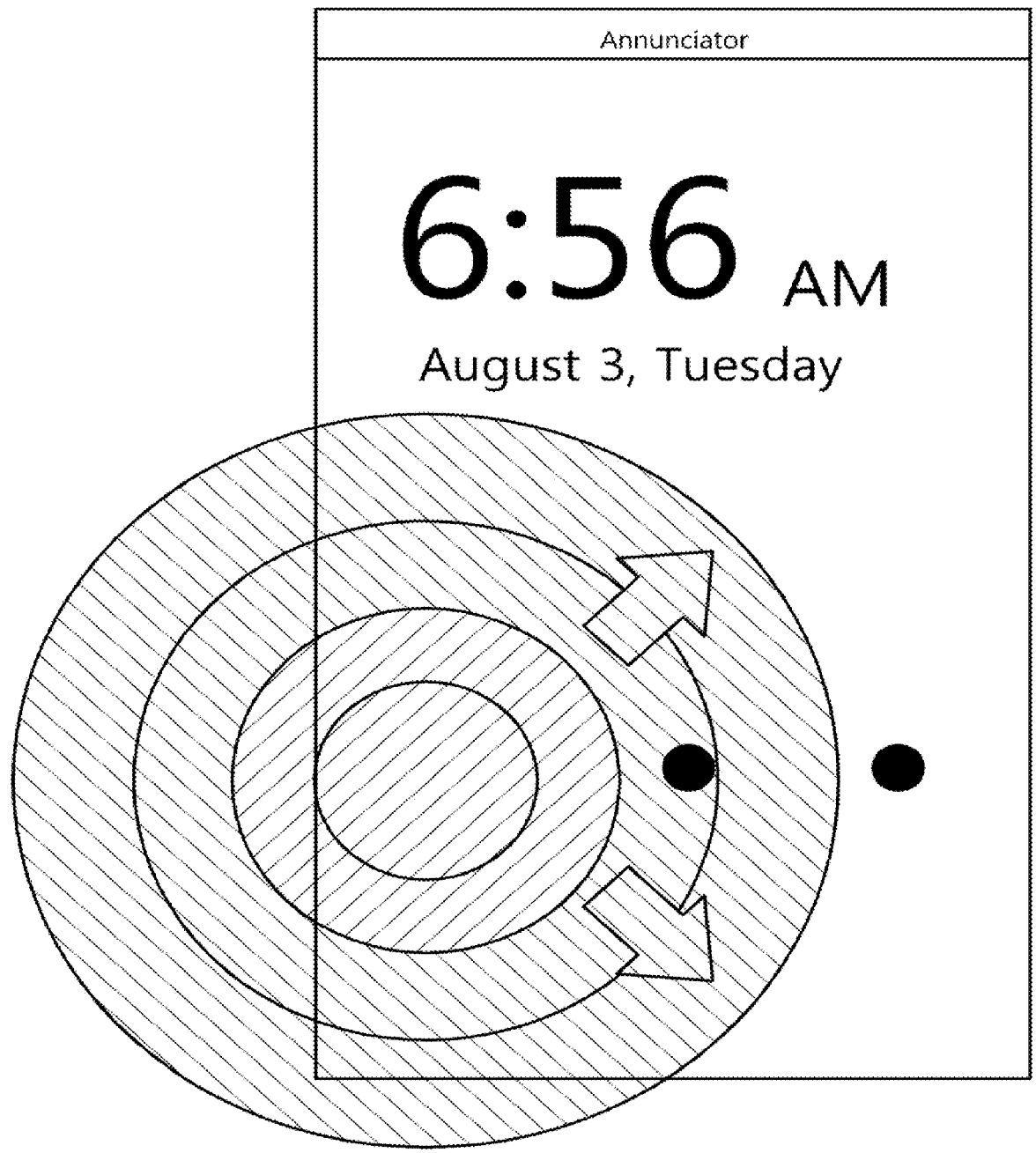
Figure 72:
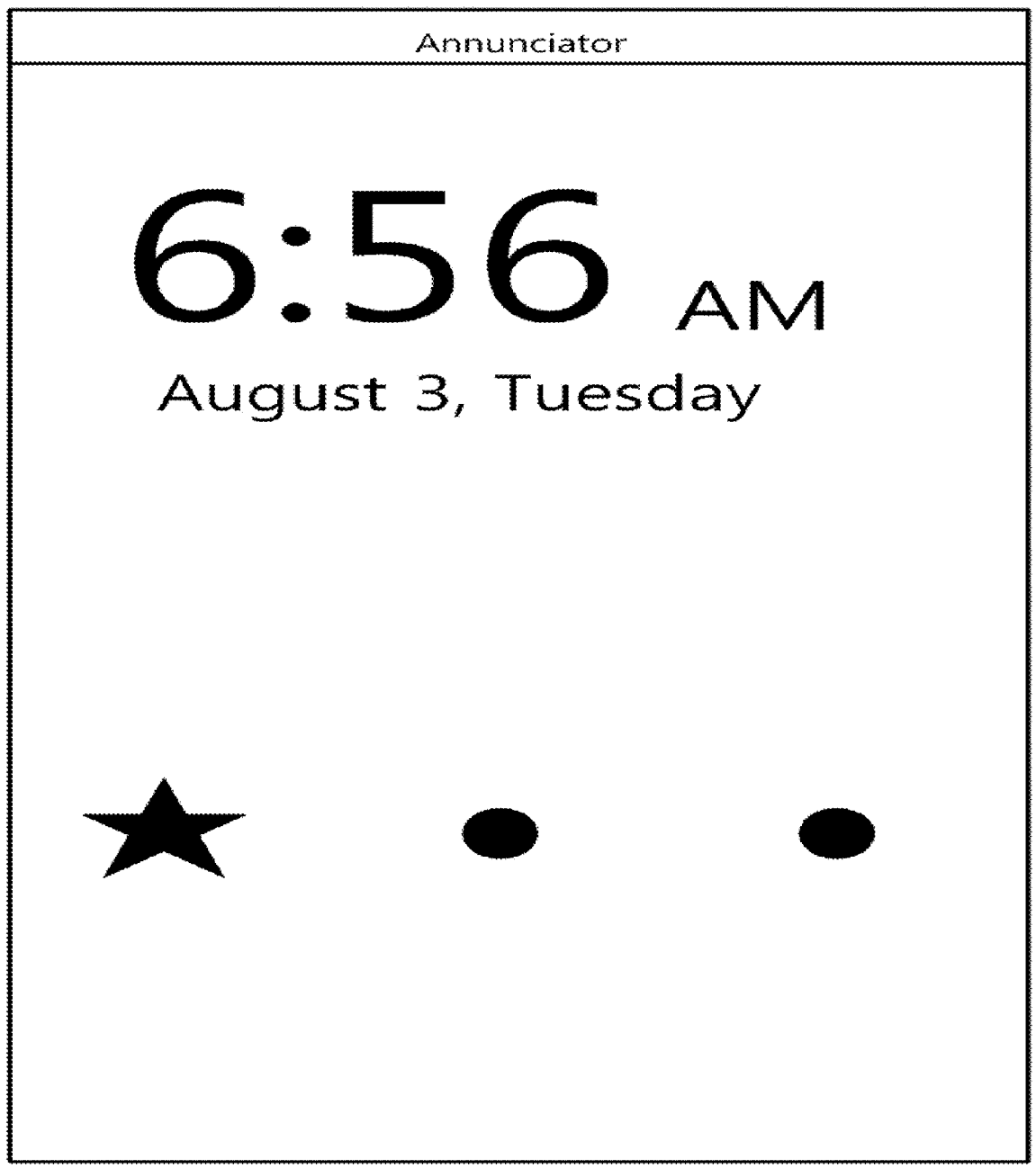

When the touch pressure of the medium level is correctly applied to the left point over 1 second as shown in FIG. 70, the feedback indicating the correct touch input is provided as shown in FIG. 71 and then the left point is displayed differently from the other points as shown in FIG. 72.

Figure 73:
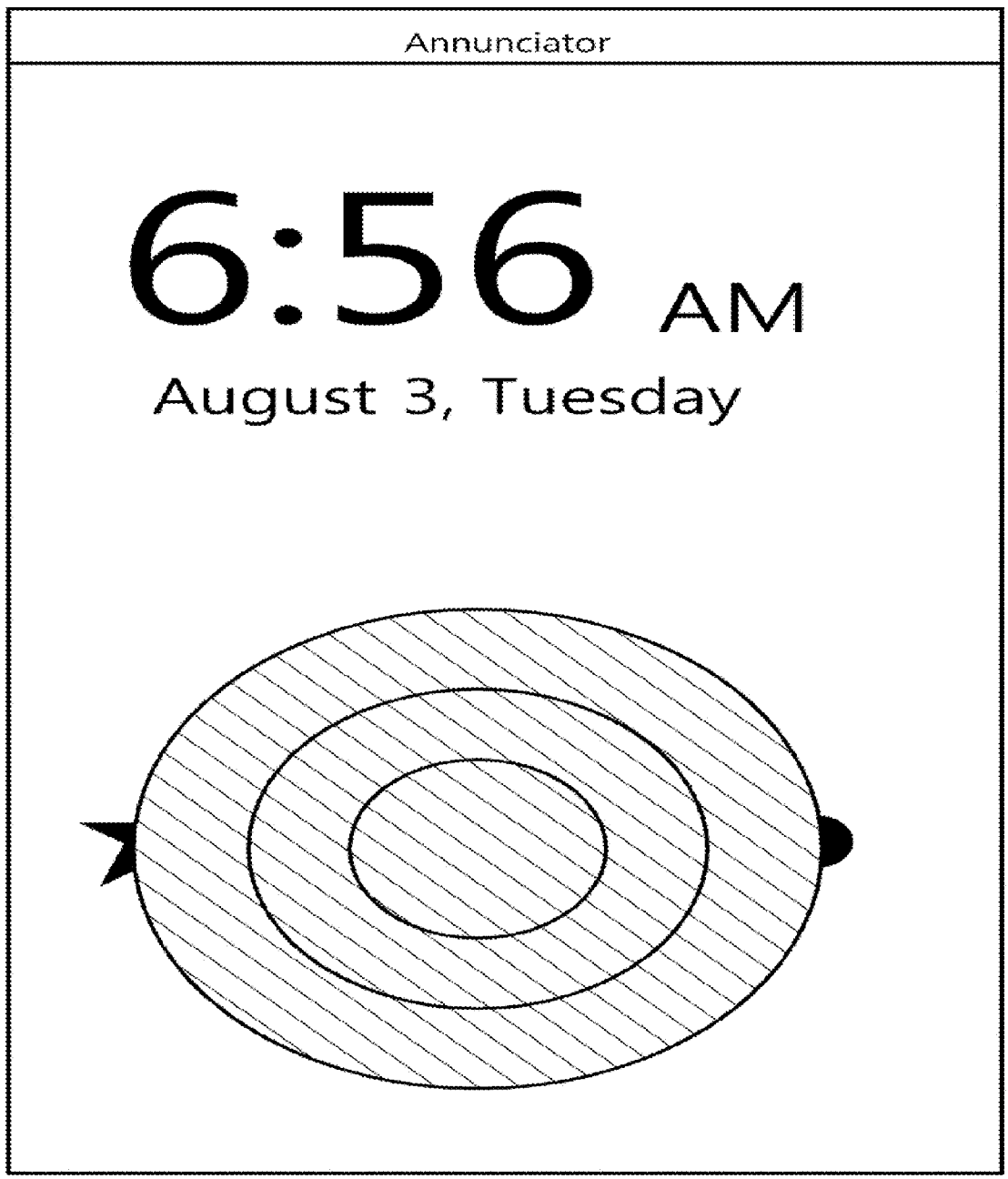
Figure 74:
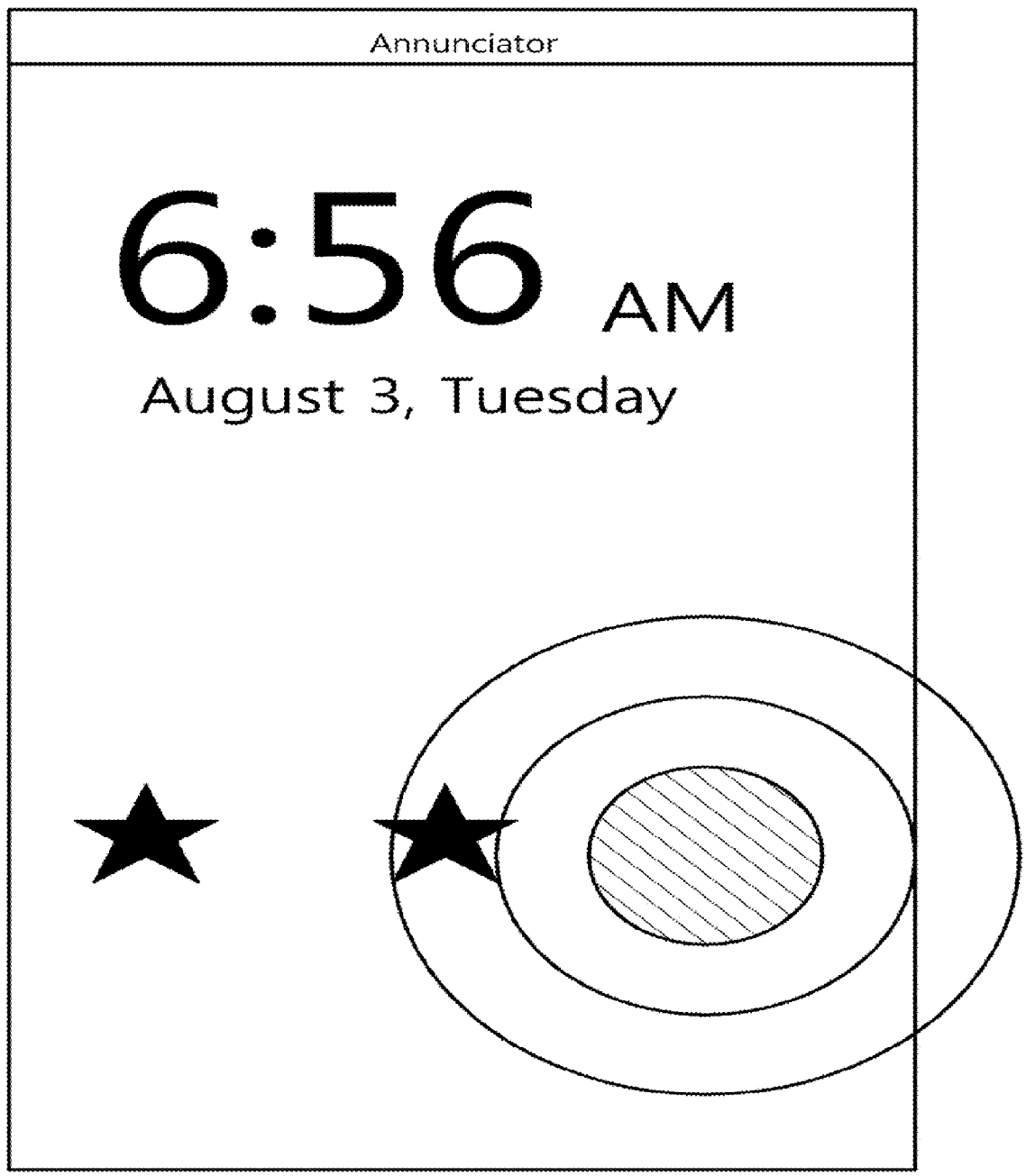
Figure 75:
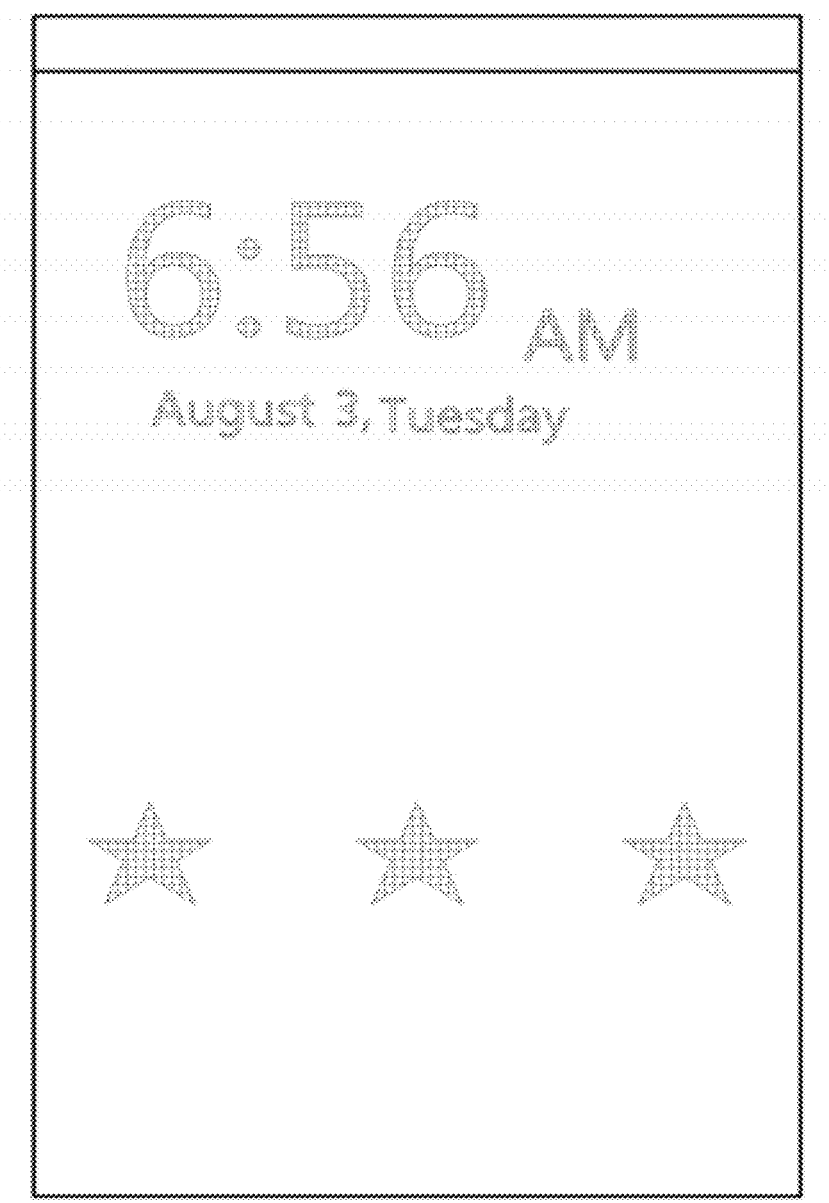

Next, when the touch pressure of the high level is applied to the middle point over 1 second as shown in FIG. 73 and the touch pressure of the low level is applied to the right point over 1 second as shown in FIG. 74, the lock view gradually disappears from the touch screen as shown in FIG. 75 and the initial view slowly appears as in FIG. 67.

2.8 Wireless Output Control According to the Touch Pressure

A wireless output strength can be controlled according to the touch pressure. In detail, 1) when the user's touch pressure is great, the wireless output strength can be increased, and 2) when the user's touch pressure is small, the wireless output strength can be decreased.

Figure 76:
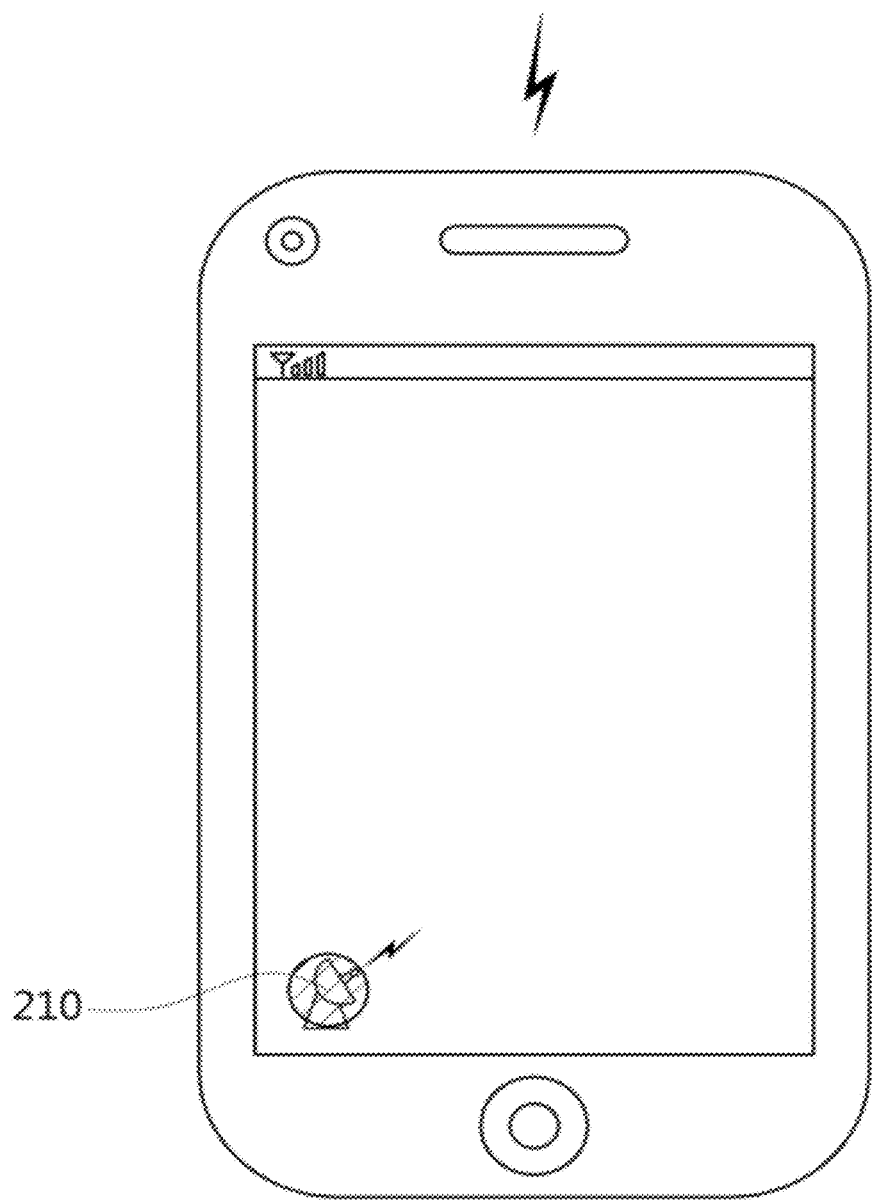
FIGS. 76 and 77 are diagrams of wireless output control according to the single touch pressure.
Figure 77:
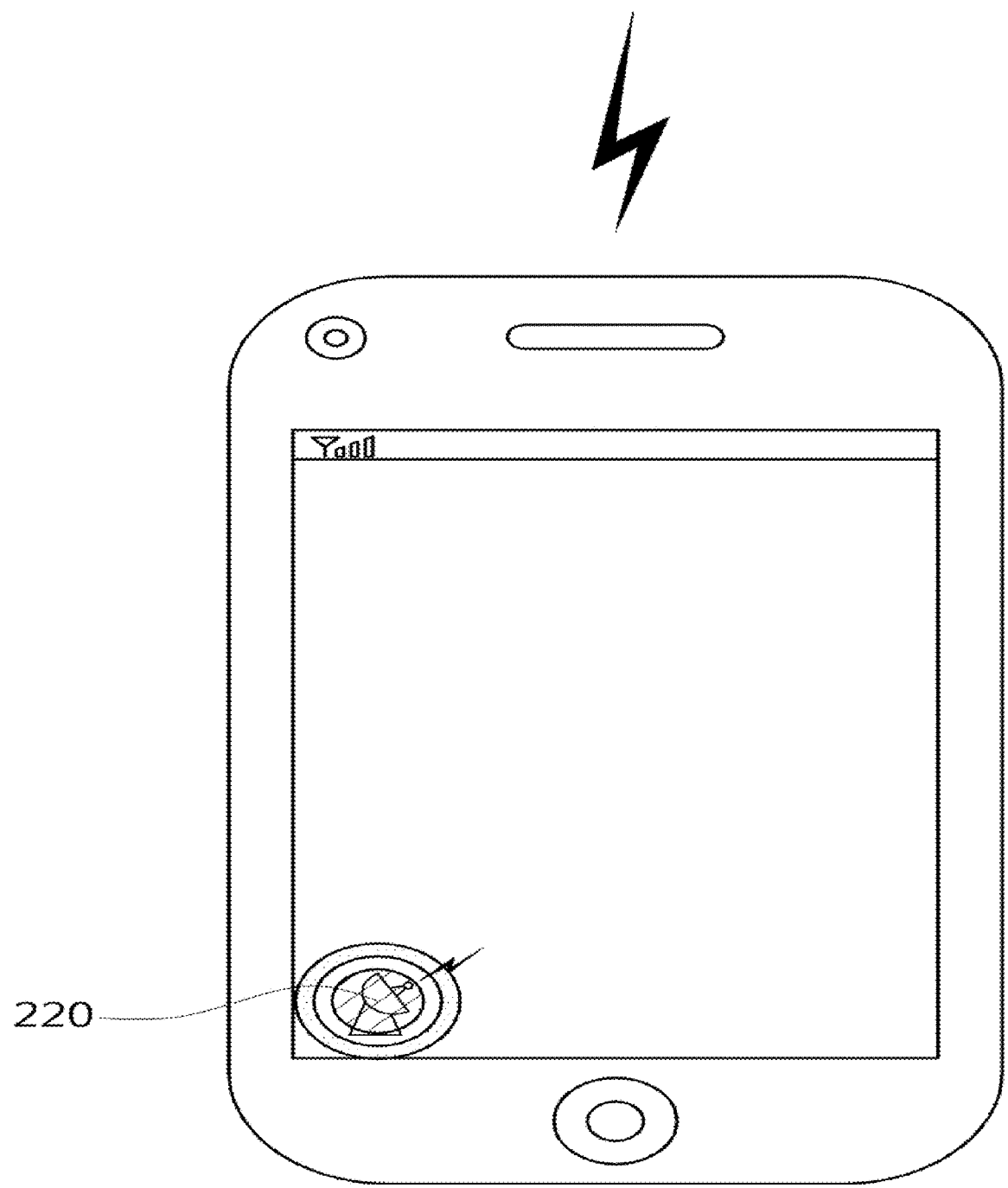

In FIG. 76, the Touch Down 210 is applied to a wireless output icon and the wireless output strength is decreased. In FIG. 77, the Touch Down & Press Down 220 is applied to the wireless output icon and the wireless output strength is increased.

Likewise, a wireless scan range can be adjusted according to the touch pressure. In detail, 1) when the user's touch pressure is great, the wireless scan range can be expanded, and 2) when the user's touch pressure is small, the wireless scan range can be narrowed.

3. Multi-Touch 3.1 Size/Zoom Adjustment According to the Touch Pressure

The sizes of the GUI elements multi-touched can be adjusted according to the touch pressures. In detail, among the multi-touched GUI elements, 1) the size of the GUI element with the greater touch pressure can be increased and 2) the size of the GUI element with the small touch pressure can be decreased.

Figure 78:
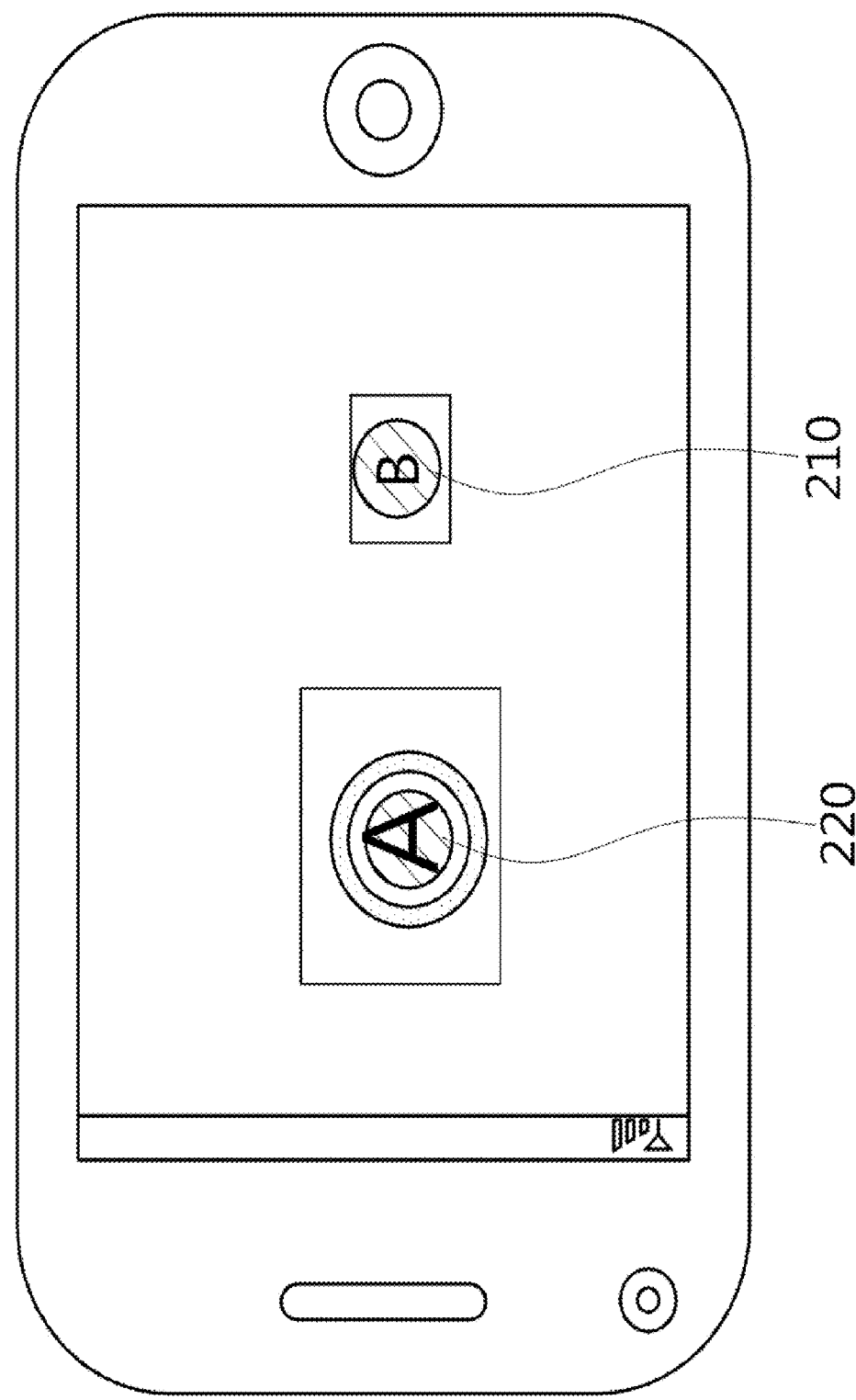
FIGS. 78, 79 and 80 are diagrams of the size/zoom adjustment according to a multi-touch pressure.

Of the same contents in FIG. 78, 1) the content "A" applied the Touch Down & Press Down 220 is enlarged and 2) the content "B" applied the Touch Down 210 is reduced.

The zoom state of the multi-touched GUI elements can be adjusted based on the touch pressures. In detail, among the multi-touched GUI elements, 1) the GUI element with the greater touch pressure can be zoomed in and 2) the GUI element with the small touch pressure can be zoomed out.

Figure 79:
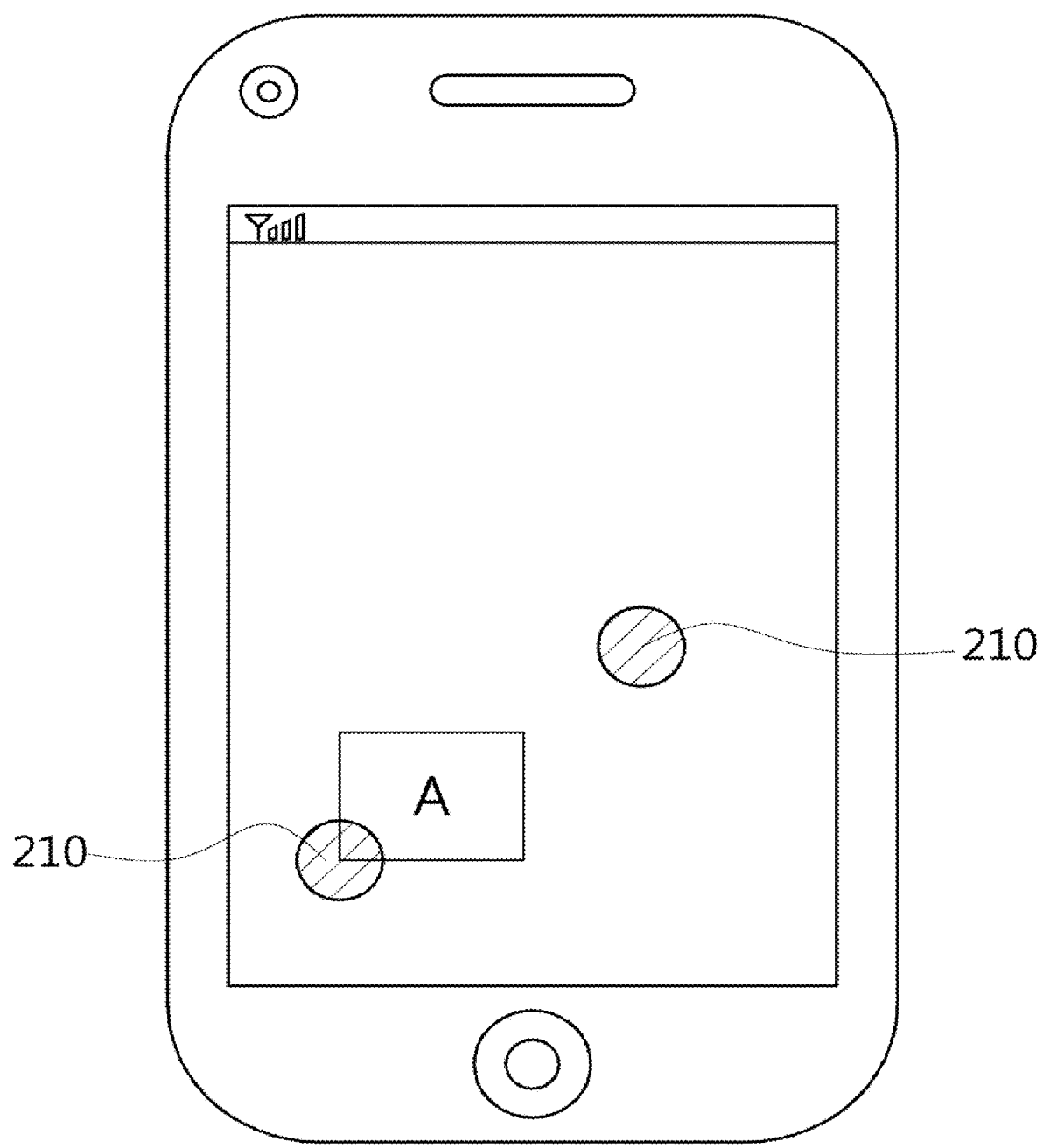
Figure 80:
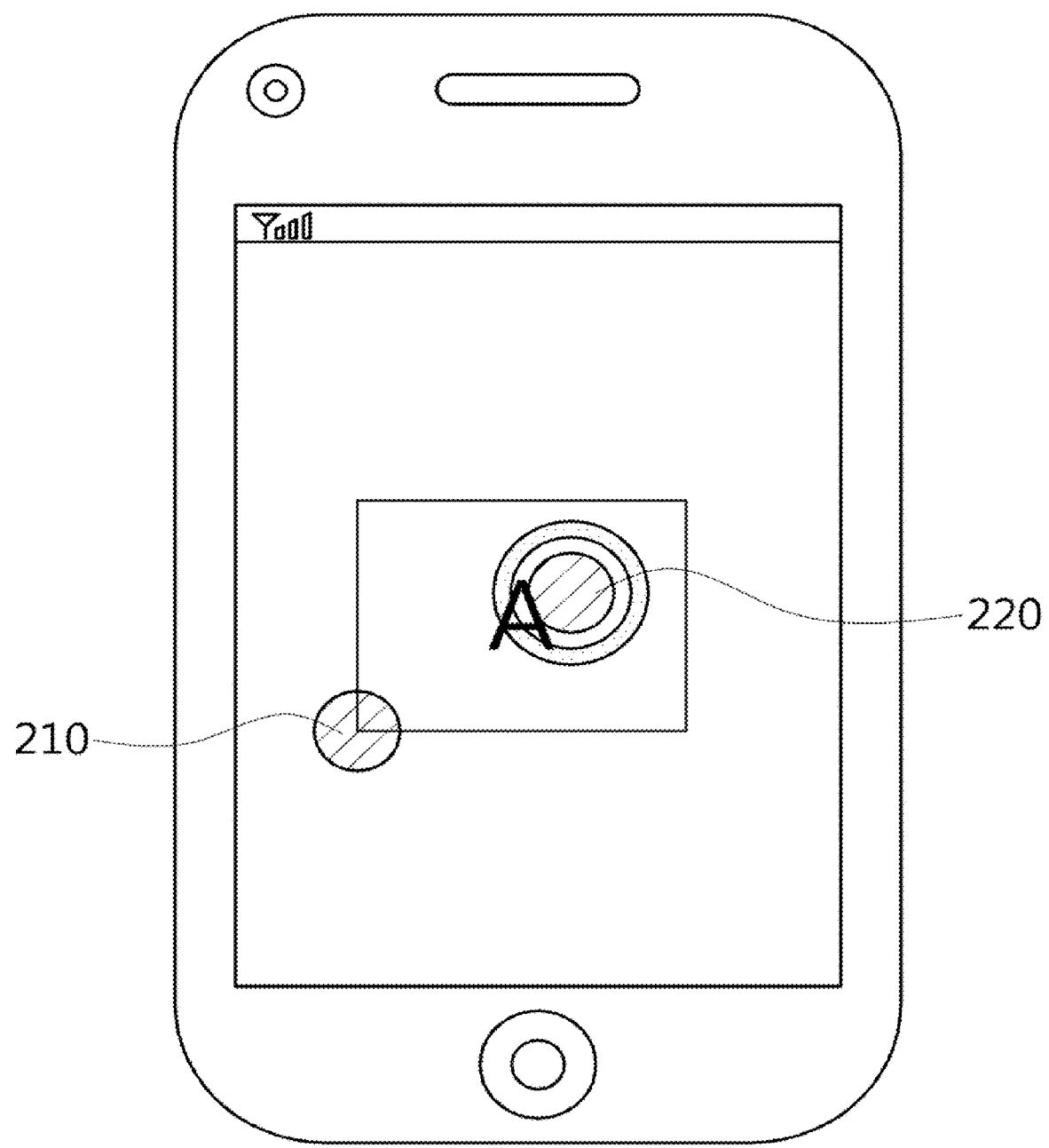
Figure 81:
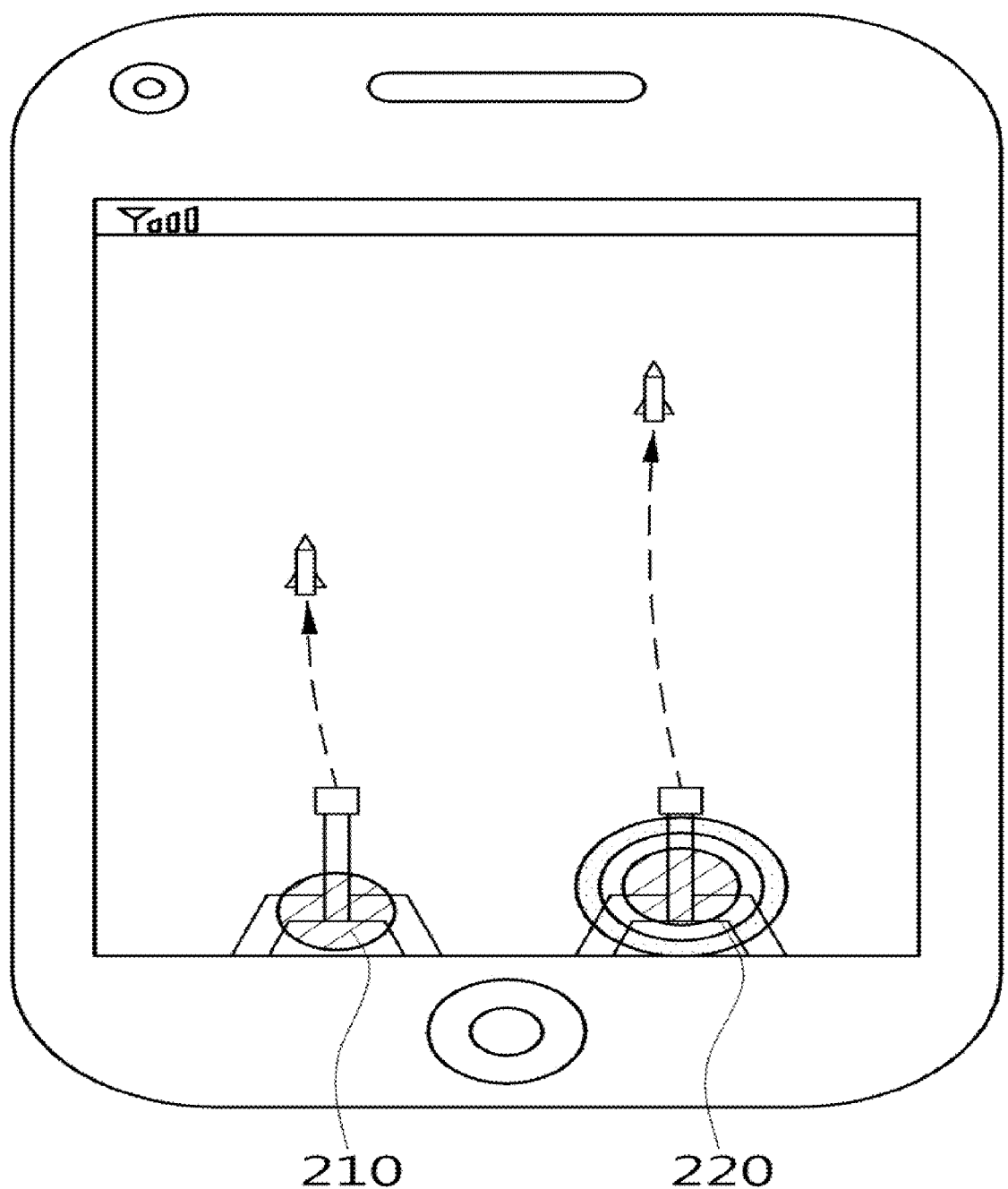
FIGS. 81, 82 and 83 are diagrams of movement/rotation control according to the multi-touch pressure.

Based on the touch pressures of the multi-touched points, a new function can be conducted. For example, when two points are multi-touched with the Touch Down 210 as shown in FIG. 79, it is treated as the simple two-point multi-touch. When the Touch Down 210 is applied to one point 210 and the Touch Down & Press Down 220 is applied to another point 220, the size of the GUI element "A" can be enlarged based on the point 210 in the direction from the point 210 to the point 220.

3.2 Movement/Rotation Control According to the Touch Pressure

The movements of the GUI elements multi-touched can be adjusted according to the touch pressures. In detail, among the multi-touched GUI elements, 1) the movement of the GUI element with the greater touch pressure can be increased and 2) the movement of the GUI element with the small touch pressure can be decreased.

That is, 1) a missile fired from a launch pad applied the Touch Down & Press Down 220 can be moved farther and 2) a missile fired from a launch pad applied the Touch Down 210 can be moved near.

Figure 82:
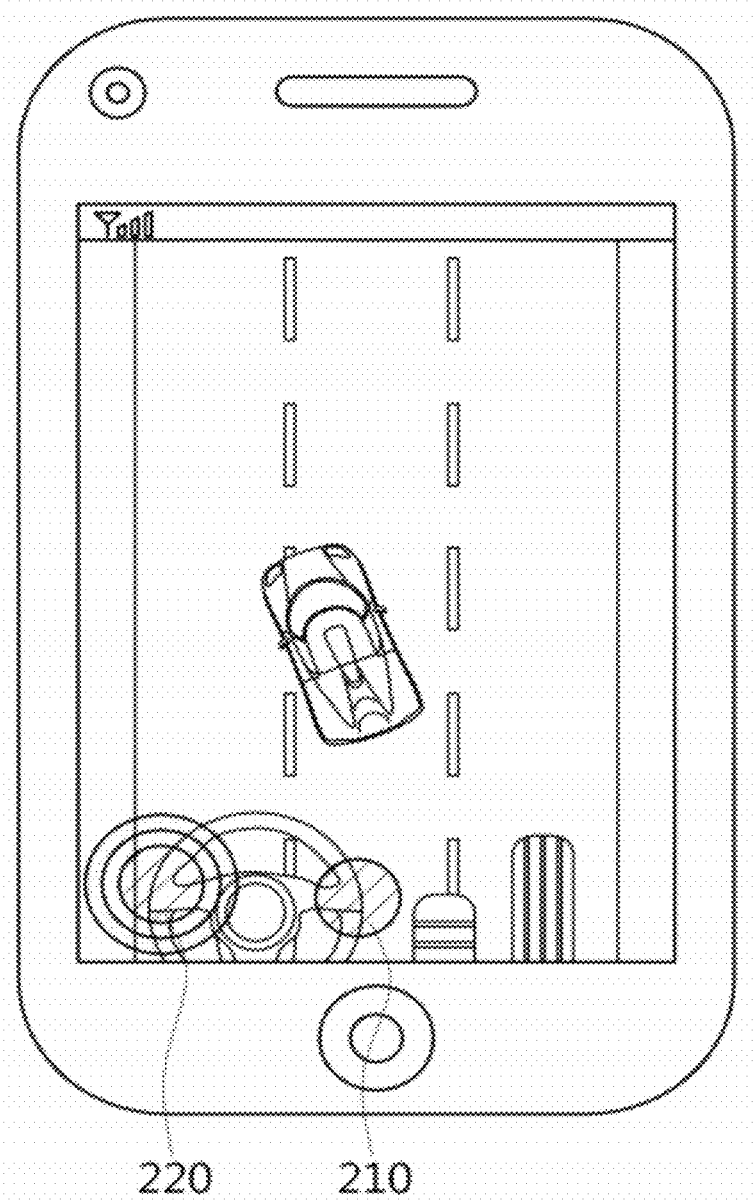
Figure 83:
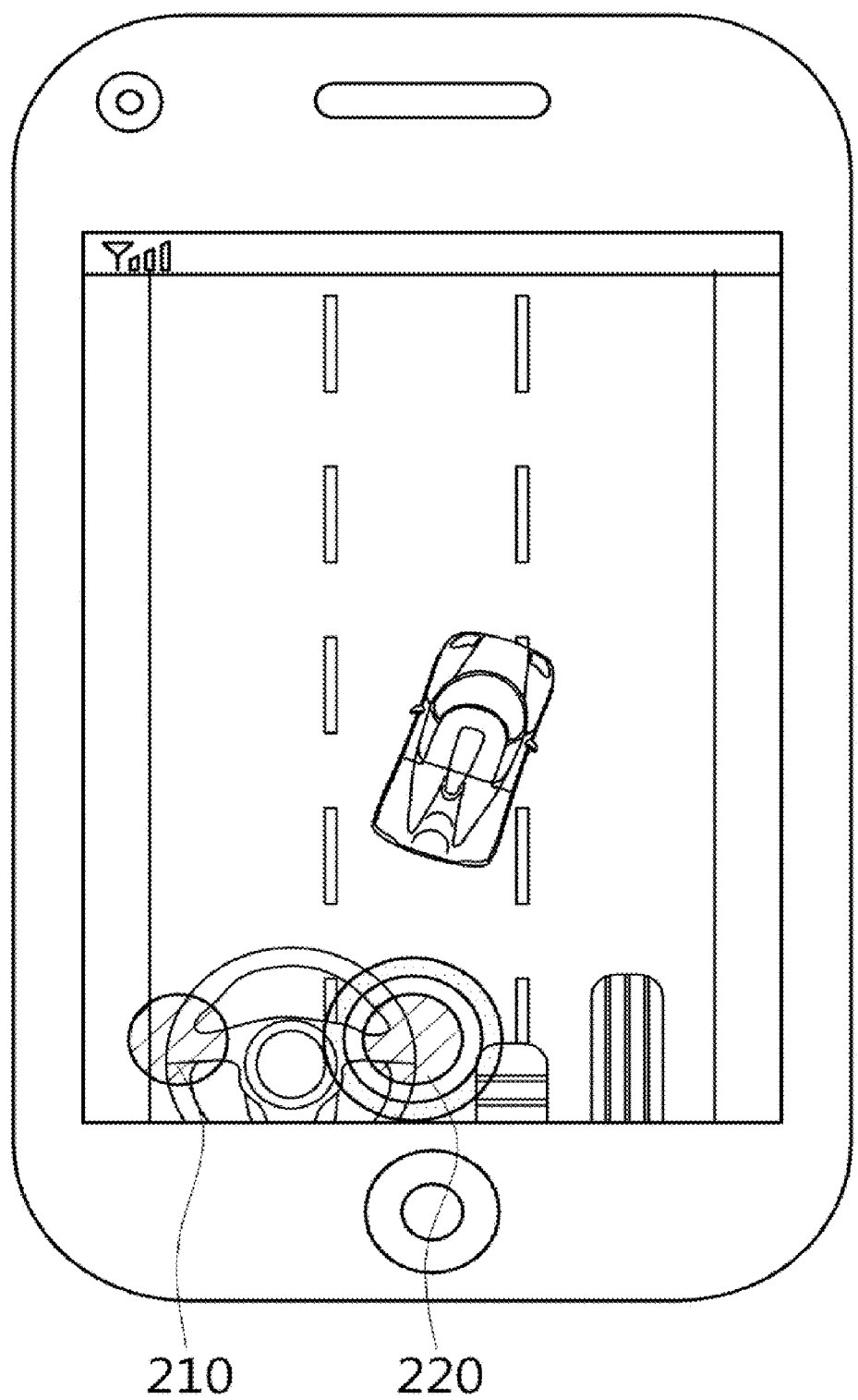

The rotation of the GUI element can be adjusted based on the combination of the multi-touch pressures. For example, 1) when the Touch Down & Press Down 220 is applied to the left of the steering wheel and the Touch Down 210 is applied to the right of the steering wheel as shown in FIG. 82, the automobile can rotate to the left, and 2) when the Touch Down & Press Down 220 is applied to the right of the steering wheel and the Touch Down 210 is applied to the left of the steering wheel as shown in FIG. 83, the automobile can rotate to the right.

3.3 Thickness/Saturation/Color Control According to the Pressure

The thicknesses of the GUI elements multi-touched can be adjusted according to the touch pressures. In detail, among the multi-touched texts, 1) the thickness of the text with the greater touch pressure can be thickened and 2) the thickness of the text with the small touch pressure can be thinned.

The saturations of the multi-touched GUI elements can be adjusted based on the respective multi-touch pressures. In detail, of the multi-touched texts, 1) the text of the great touch pressure can be darkened and 2) the text of the small touch pressure can be desaturated.

The colors of the multi-touched GUI elements can be adjusted based on the respective multi-touch pressures. In detail, of the multi-touched texts, 1) the color of the text of the great touch pressure can be set to a warm color (a red color) and 2) the color of the text of the small touch pressure can be set to a cool color (a blue color).

3.4 Speed (to Move, to Turn a Page, to Play) Control According to the Touch Pressure The speeds (move, turn a page, and play) of the GUI elements multi-touched can be controlled according to the touch pressures. In detail, among the multi-touched texts, 1) the speed (move, turn a page, and play) of the GUI element with the great touch pressure can be increased and 2) the speed (move, turn a page, and play) of the GUI element with the small touch pressure can be decreased.

Figure 84:
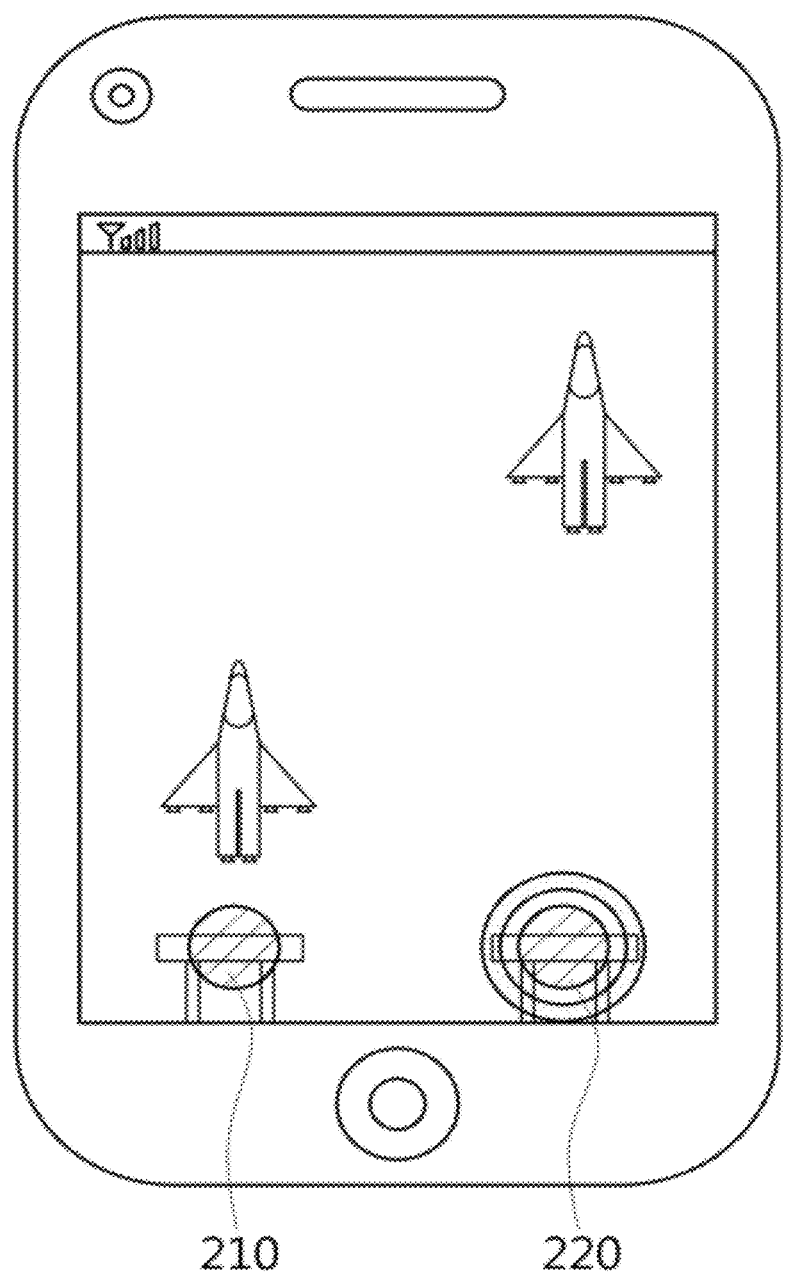
FIGS. 84, 85 and 86 are diagrams of the speed (to move, to turn a page, to play) control according to the multi-touch pressure.

That is, as shown in FIG. 84, 1) a plane manipulated with a lever of the Touch Down & Press Down 220 can fly fast and 2) a plane manipulated with a lever of the Touch Down 210 can fly slowly.

Figure 85:
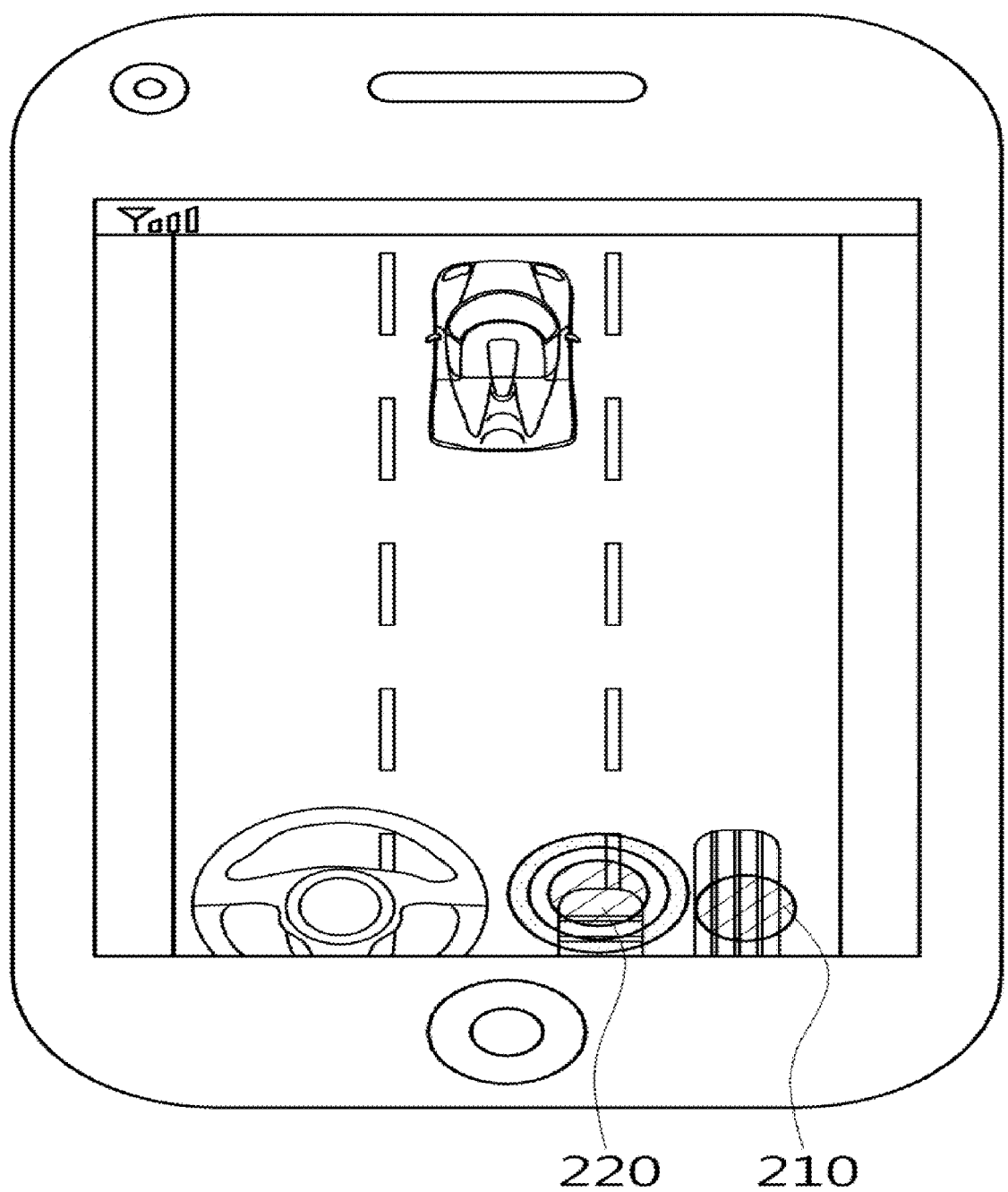
Figure 86:
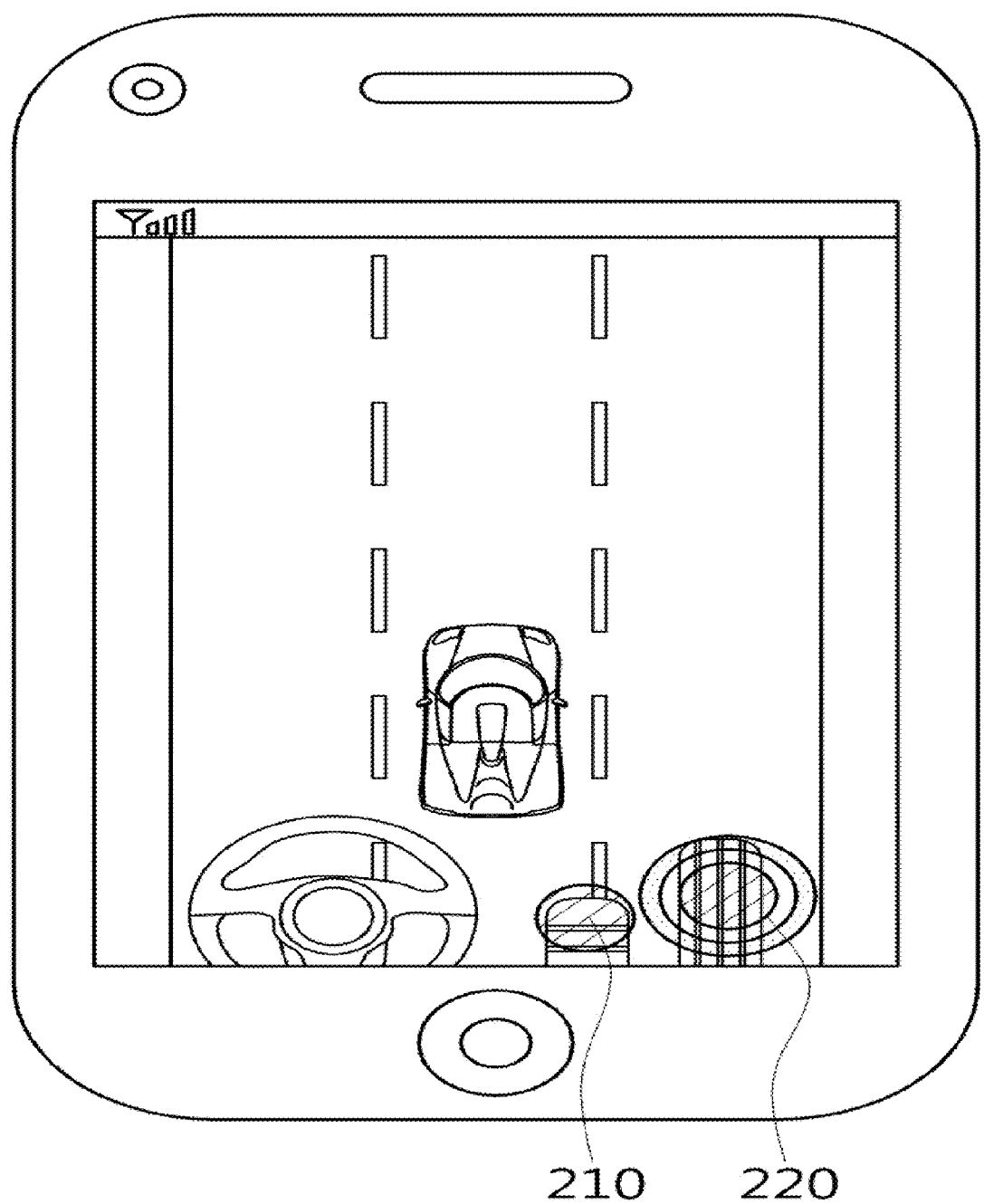

The rotation of the GUI element can be controlled based on the combination of the multi-touch pressures. For example, 1) when the Touch Down & Press Down 220 is applied to a brake and the Touch Down 210 is applied to an accelerator pedal as shown in FIG. 85, the car drives at a low speed, and 2) when the Touch Down & Press Down 220 is applied to the accelerator pedal and the Touch Down 210 is applied to the brake as shown in FIG. 86, the car drives at a high speed.

3.5 Weightiness Representation According to the Touch Pressure

When different touch pressures required to drag the GUI elements given the different weights are applied together as the multi-touch, the GUI elements of the different weights can be dragged together.

3.6 Acoustic/Tactile Output Control According to the Touch Pressure

Based on the touch pressures of the multi-touched points, the sound can be controlled in three dimensions.

Figure 87:
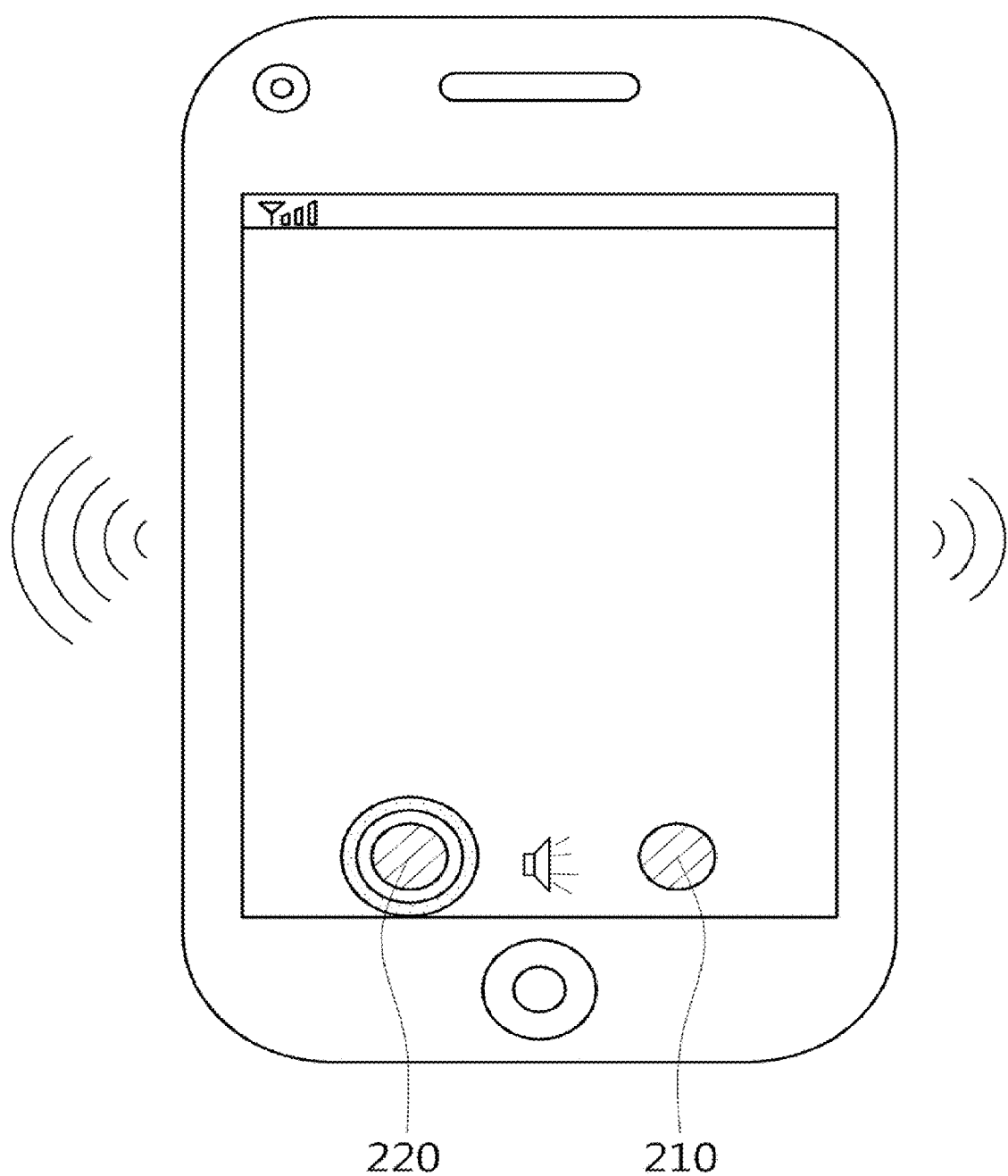
FIGS. 87 through 91 are diagrams of the acoustic/tactile output control according to the multi-touch pressure.
Figure 88:
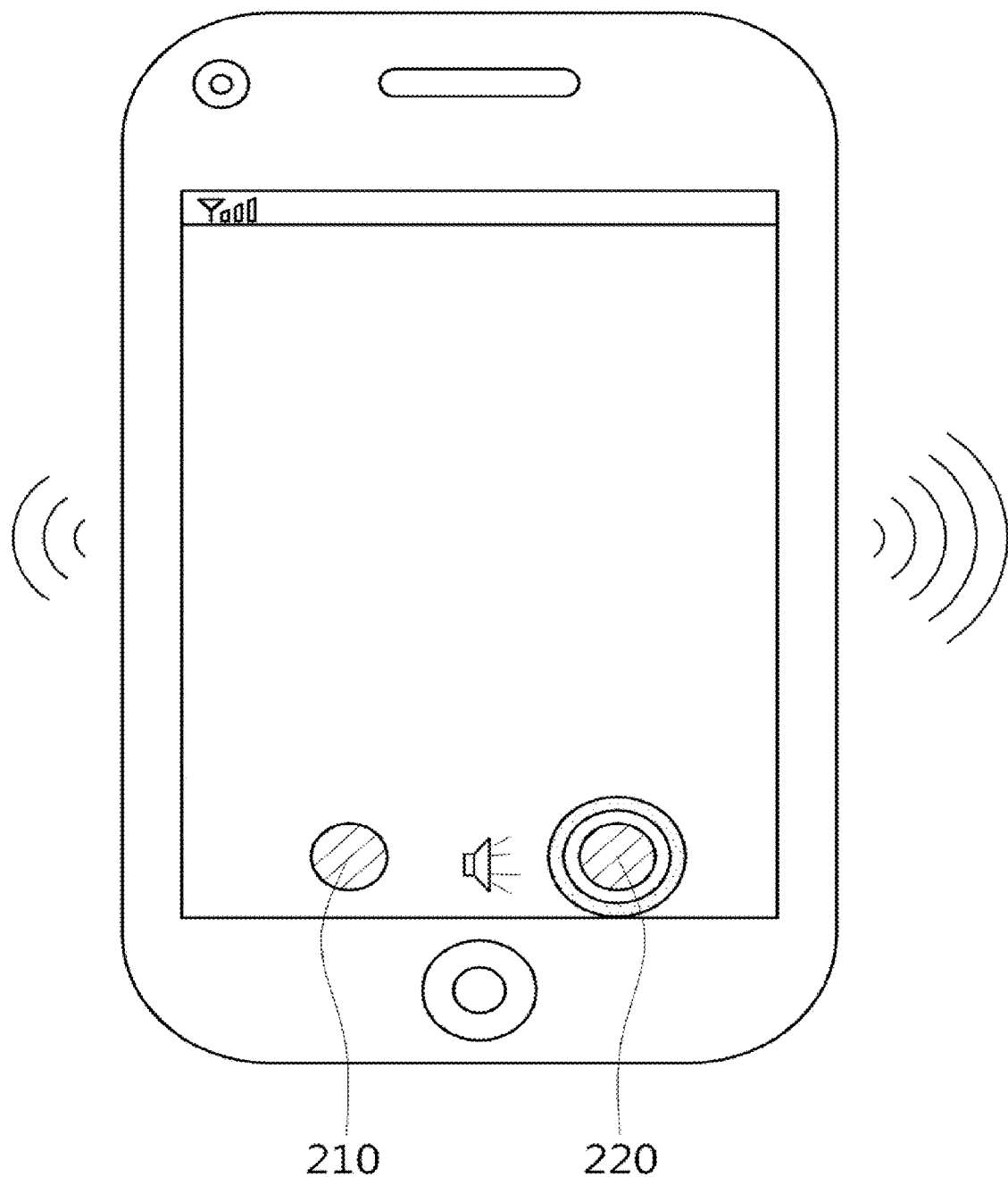

For example, 1) when the Touch Down & Press Down 220 is applied to the left of the sound control icon and the Touch Down 210 is applied to the right as shown in FIG. 87, a left speaker can output the sound louder than a right speaker, and 2) when the Touch Down & Press Down 220 is applied to the right of the sound control icon and the Touch Down 210 is applied to the left as shown in FIG. 88, the right speaker can output the sound louder than the left speaker.

Likewise, 1) when the Touch Down & Press Down 220 is applied to the top of the sound control icon and the Touch Down 210 is applied to the bottom, an upper speaker can output the sound louder than a lower speaker, and 2) when the Touch Down & Press Down 220 is applied to the bottom of the sound control icon and the Touch Down 210 is applied to the top, the lower speaker can output the sound louder than the upper speaker.

Based on the touch pressures of the multi-touched points, the vibration can be controlled in three dimensions.

Figure 89:
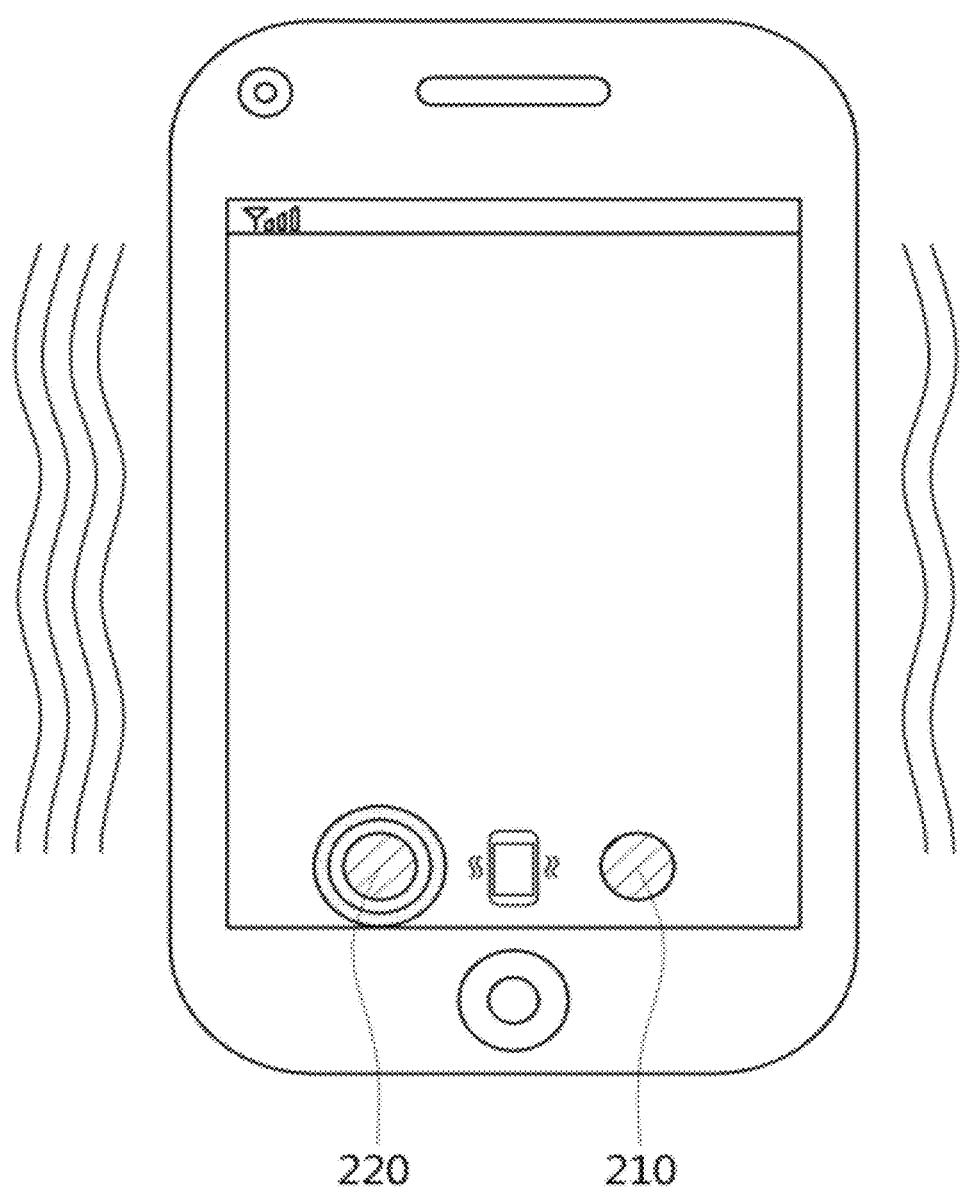
Figure 90:
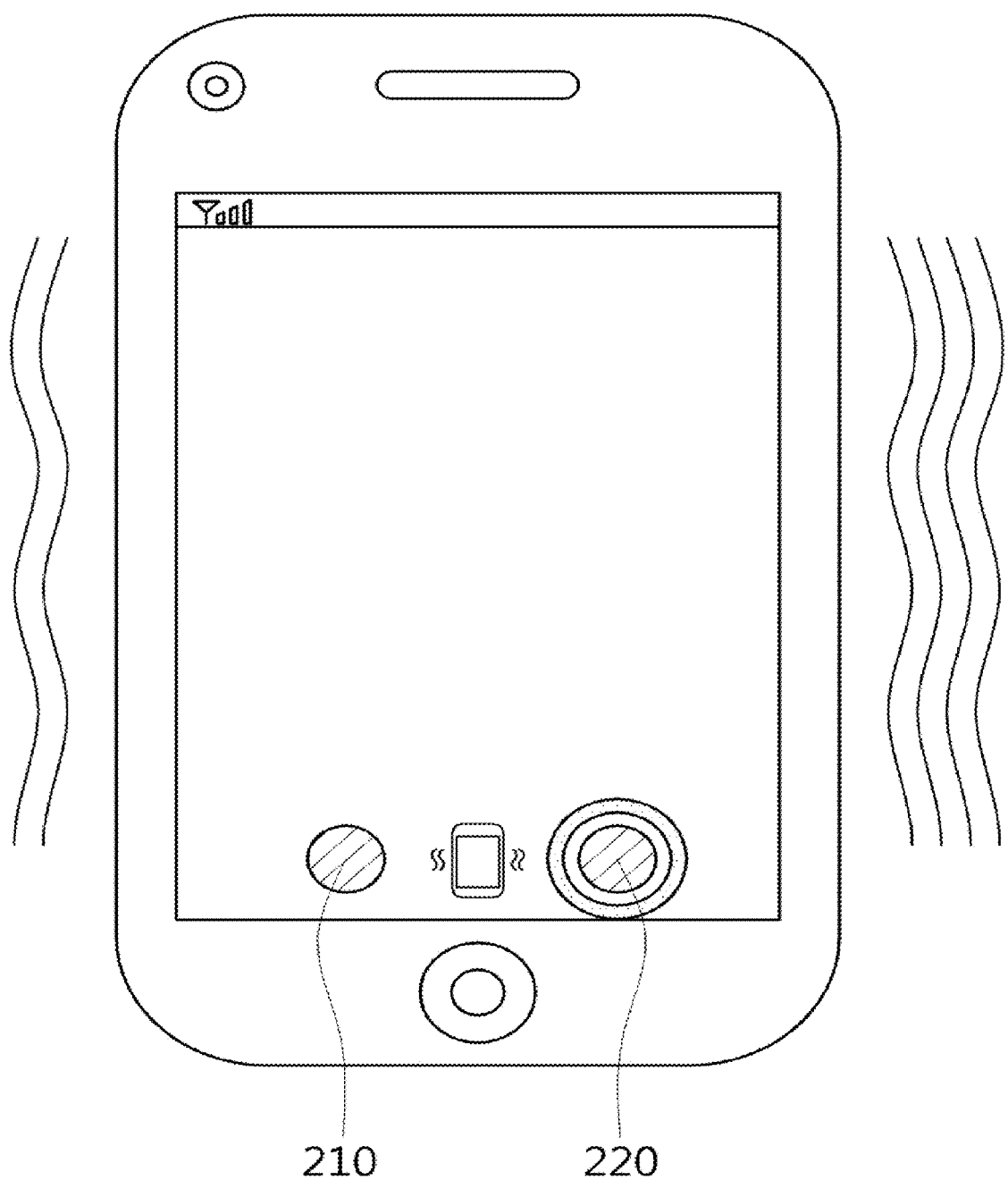

For example, 1) when the Touch Down & Press Down 220 is applied to the left of the vibration control icon and the Touch Down 210 is applied to the right as shown in FIG. 89, a left vibration motor can operate harder than a right vibration motor, and 2) when the Touch Down & Press Down 220 is applied to the right of the vibration control icon and the Touch Down 210 is applied to the left as shown in FIG. 90, the right vibration motor can operate harder than the left vibration motor.

Likewise, 1) when the Touch Down & Press Down 220 is applied to the top of the vibration control icon and the Touch Down 210 is applied to the bottom, an upper vibration motor can operate harder than a lower vibration motor, and 2) when the Touch Down & Press Down 220 is applied to the bottom of the vibration control icon and the Touch Down 210 is applied to the top, the lower vibration motor can operate harder than the upper vibration motor.

Figure 91:
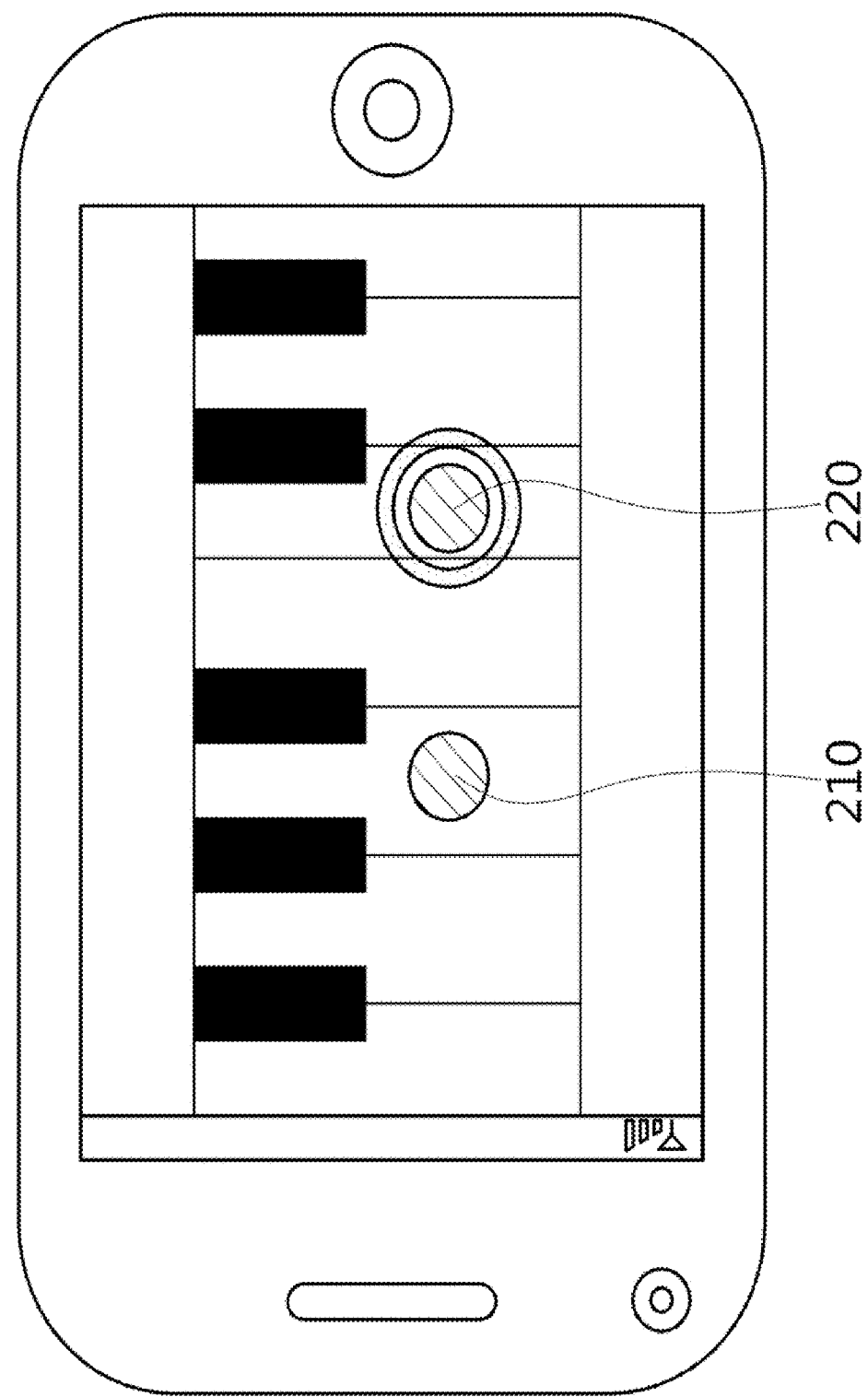

Meanwhile, when different pressures multi-touch two keys of a graphic piano displayed in the touch screen as shown in FIG. 91, the sounds of the multi-touched keys can be output and their output strengths can be proportional to the touch pressures.

3.7 Setting/Executing a Function According to the Touch Pressure

The touch pressure of the multi-touched points can be measured and a different function can be set/executed according to the measured touch pressure. This implies that one of various functions is selected and set/executed according to the touch pressure, to be explained with various examples.

Figure 92:
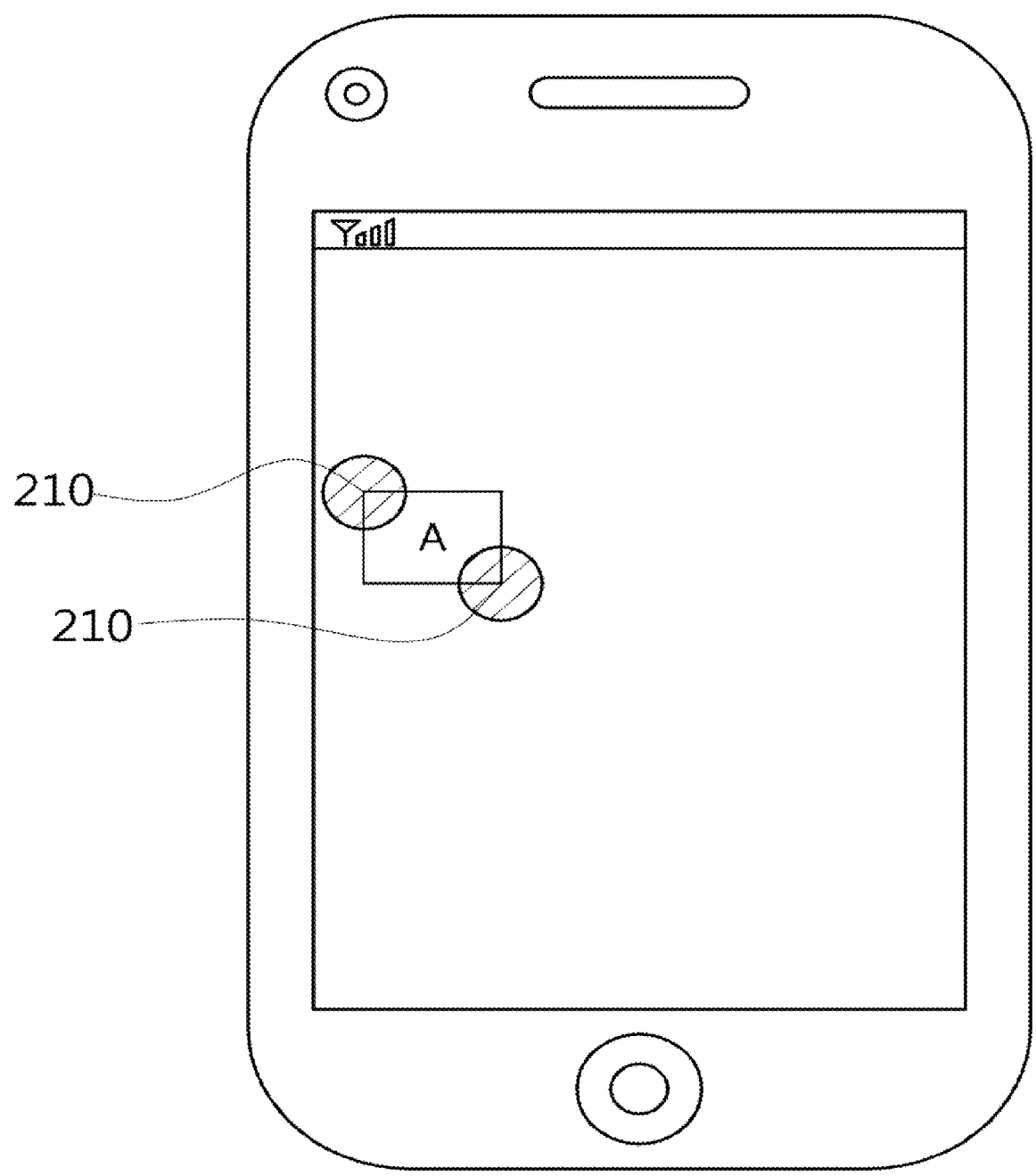
FIGS. 92 through 95 are diagrams of the function setting/execution according to the multi-touch pressure.
Figure 93:
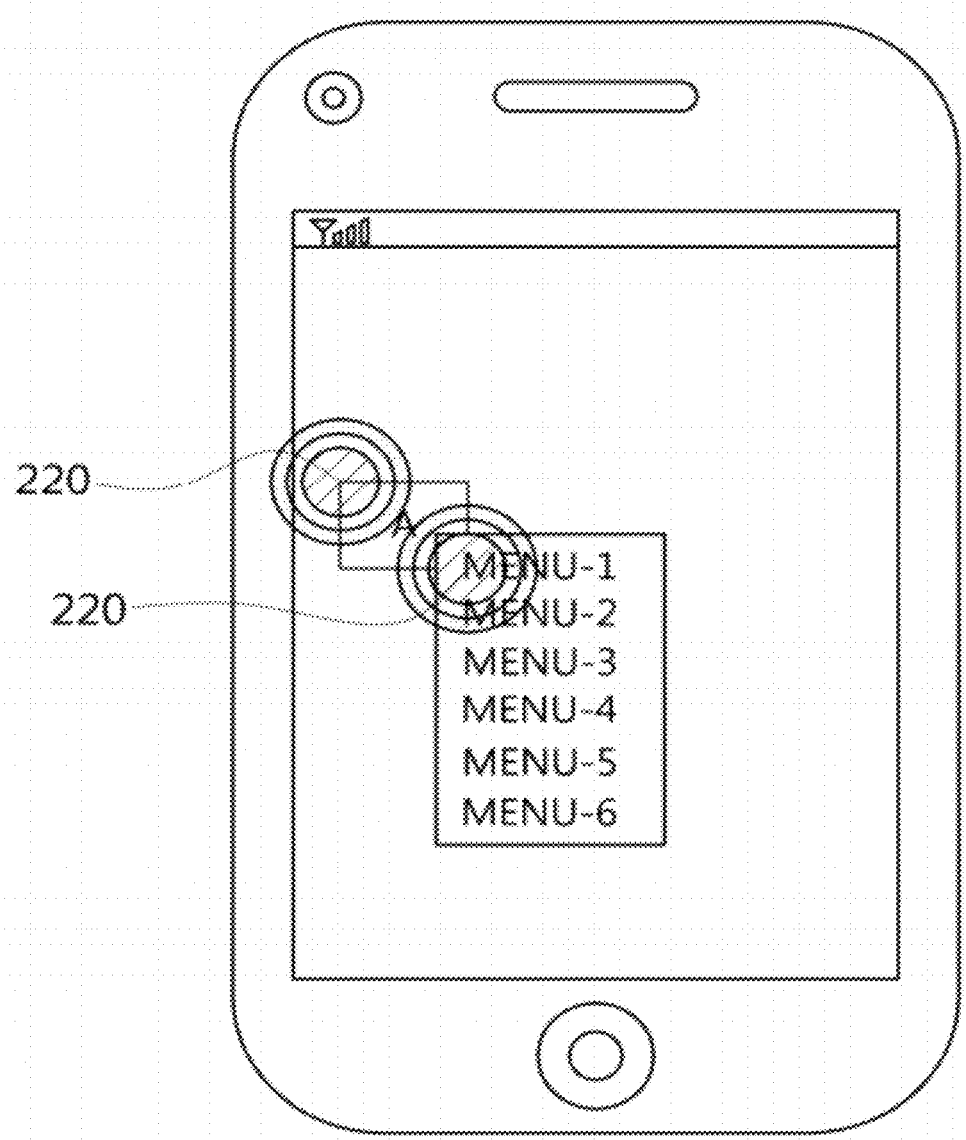

1) When the Touch Down 210 is applied to corner points of the GUI element "A" as shown in FIG. 92, it is treated as the simple multi-touch. 2) When the Touch Down & Press Down 220 is applied to the corner points of the GUI element "A" as shown in FIG. 93, a list of menu items of the GUI element "A" can be provided.

Figure 94:
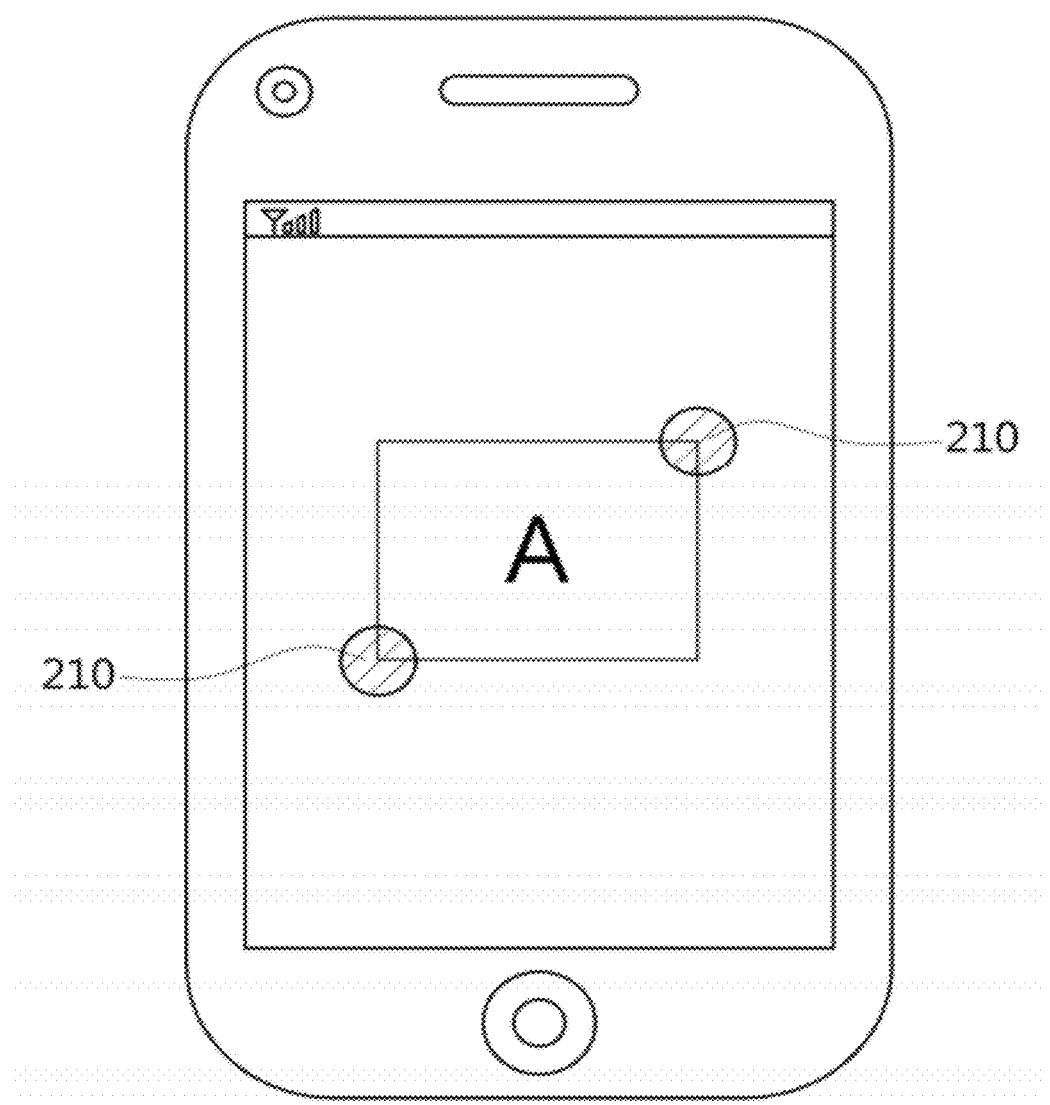
Figure 95:
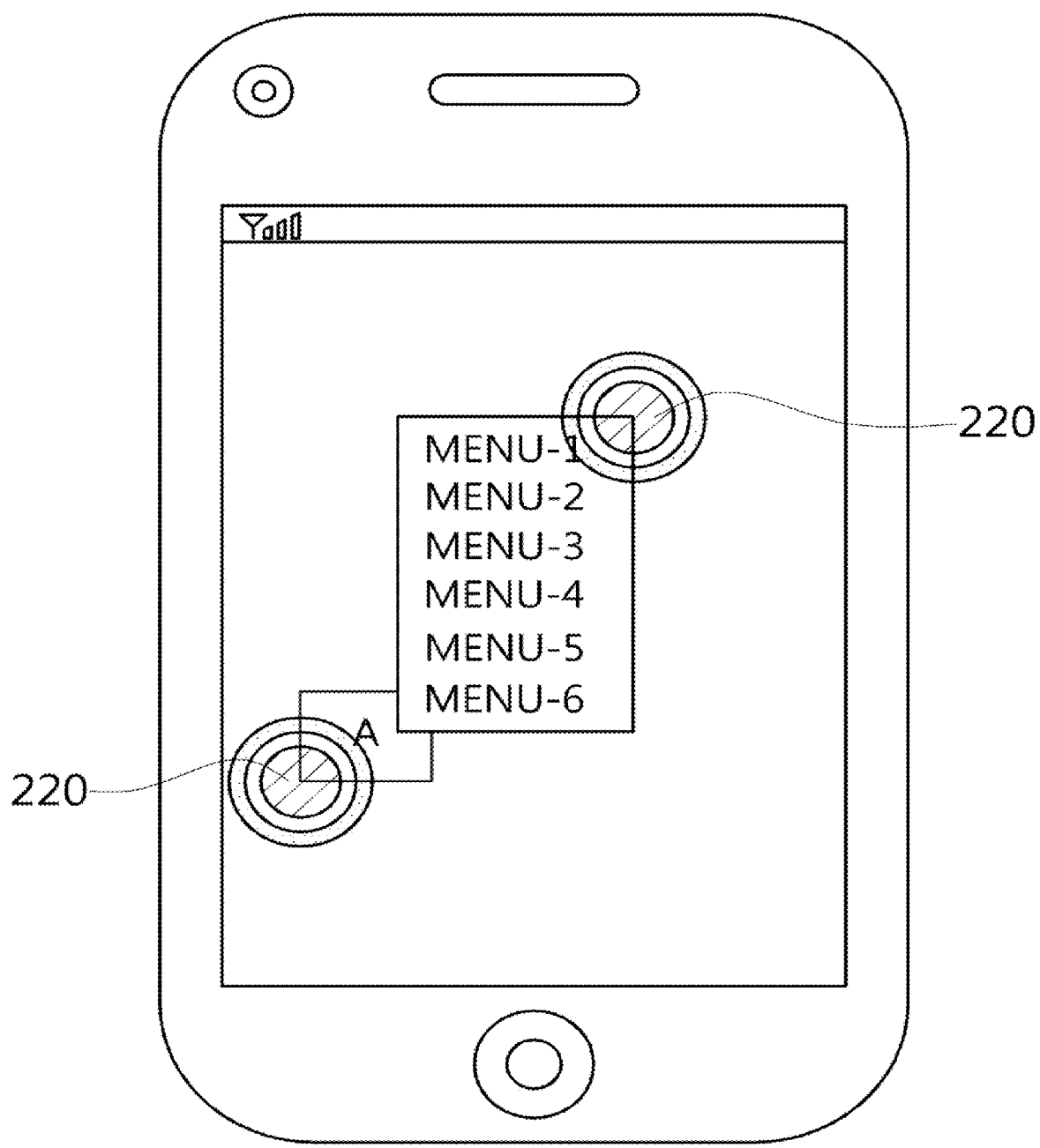

1) When the Touch Down 210 is applied to one corner of the content "A" and one point of the wallpaper, the content "A" is enlarged and displayed in a region defined by the multi-touch as shown in FIG. 94. 2) When the Touch Down & Press Down 220 is applied to one corner of the content "A" and one point of the wallpaper, the list of the menu items of the content "A" can be provided in a region defined by the multi-touch while not hiding much the content "A" as shown in FIG. 95.

3.8 Wireless Output Control According to the Touch Pressure

Based on the touch pressures of the multi-touched points, the wireless output can be controlled in three dimensions.

Figure 96:
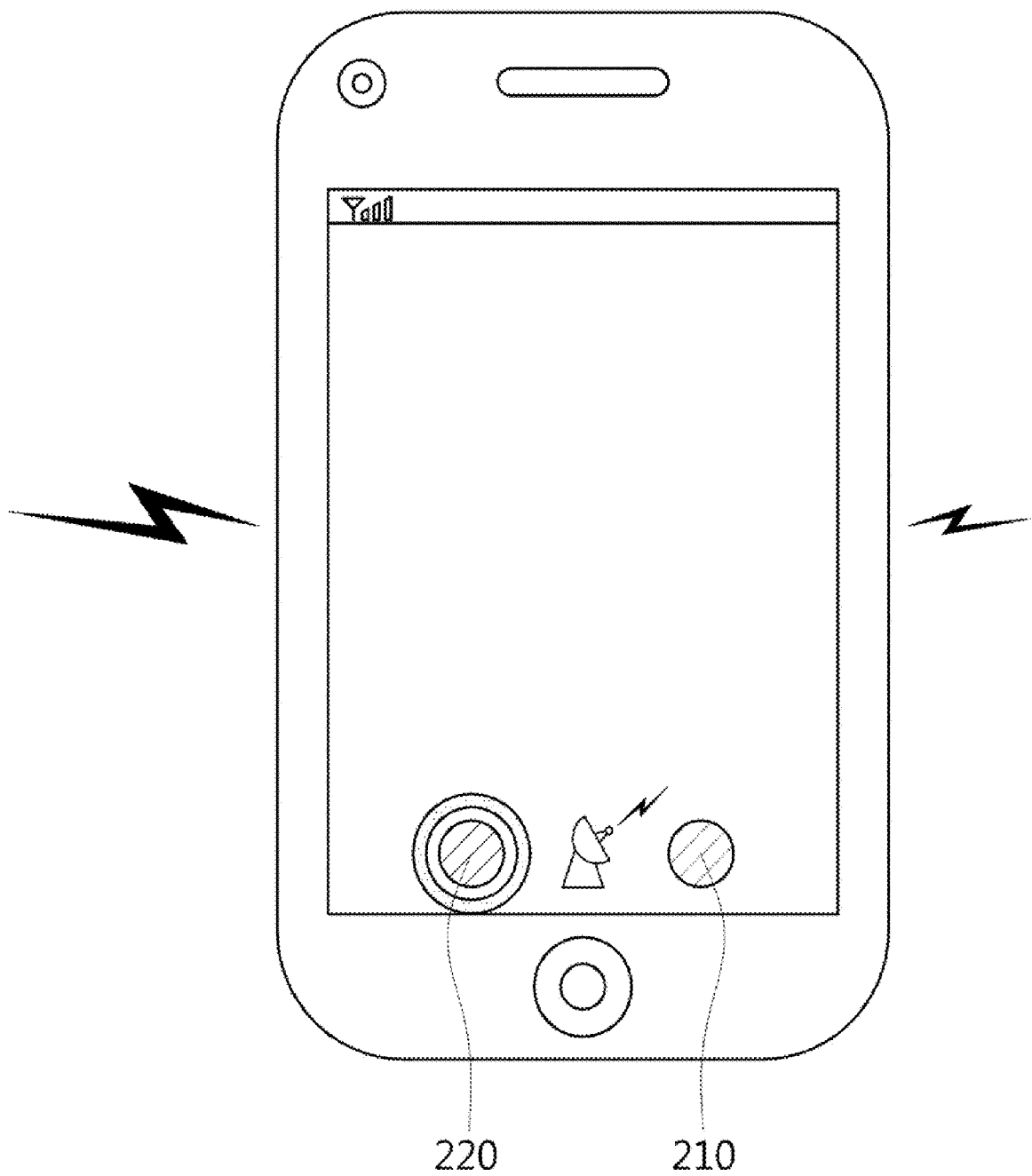
FIGS. 96 and 97 are diagrams of the wireless output control according to the multi-touch pressure.
Figure 97:
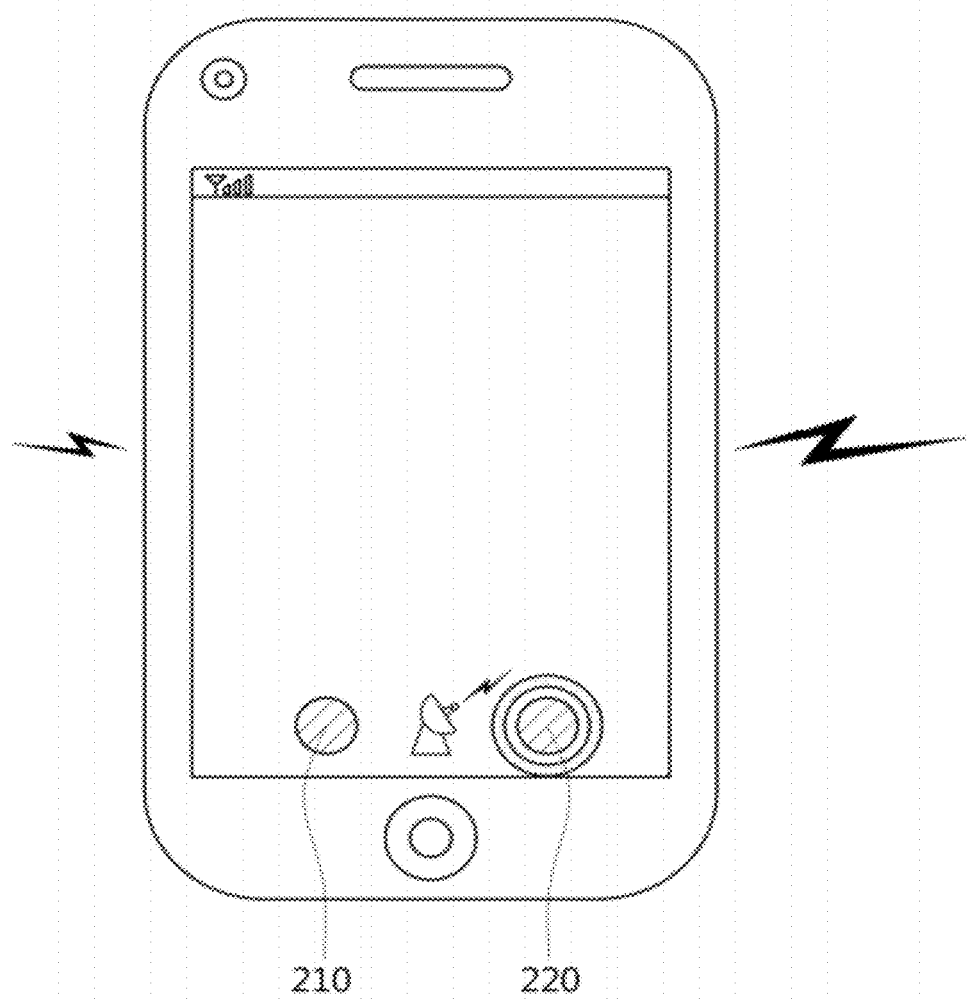

For example, 1) when the Touch Down & Press Down 220 is applied to the left of the wireless output icon and the Touch Down 210 is applied to the right as shown in FIG. 96, the wireless output of a left antenna can be greater than a right antenna, and 2) when the Touch Down & Press Down 220 is applied to the right of the wireless output icon and the Touch Down 210 is applied to the left as shown in FIG. 97, the wireless output of the right antenna can be greater than the left antenna.

Likewise, 1) when the Touch Down & Press Down 220 is applied to the top of the wireless output icon and the Touch Down 210 is applied to the bottom, the wireless output of an upper antenna can be greater than a lower antenna, and 2) when the Touch Down & Press Down 220 is applied to the bottom of the wireless output icon and the Touch Down 210 is applied to the top, the wireless output of the lower antenna can be greater than the upper antenna.

4. Touch Pressure Guide

In FIG. 39, the magnitude of the touch pressure can be displayed as the gauge and guided to the user to ease the understanding. Yet, the touch pressure magnitude can be guided differently. For example, a circular guide having a radius proportional to the touch pressure of the touched point can be provided, or the color of the gauge or the circular guide can change according to the touch pressure.

In addition, the touch pressure guide can be output as the sound or the vibration. Such a guide can be applied to the multi-touch.

5. Electronic Device Applicable

FIG. 98 is a block diagram of an electronic device for providing the UIs as explained so far. As shown in FIG. 98, the electronic device for providing the UIs includes a touch screen 110, a communication part 120, a control part 130, an audio/vibration output part 140, and a storage part 150.

The touch screen 110 functions as a display for displaying the UI and as an input means for receiving a user command through the touch. The touch screen 110 can detect not only the user's touch point but also the touch pressure.

The communication part 120 is communicatively connected to an external device and/or an external communication network. The audio/vibration output part 140 outputs the sound and the vibration.

The storage part 150 is a storage medium containing a program required to drive the electronic device and a program required to provide the above UIs.

The control part 130 drives the electronic device by running the program stored to the storage part 150. Particularly, the control part 130 provides the UI through the touch screen 110, controls the display of the touch screen 110, the communication/setting of the communication part 120, and the output operation/setting of the audio/vibration output part 140 according to the user command (particularly, the user's touch pressure) input through the provided UI, executes the user's intended function, and provides the result view through the touch screen 110.

The electronic device of FIG. 98 can be implemented in various shapes. The various shapes include a folder type, a slide type, a bar type, a rotational type, a swing type, and their combination.

The type of the electronic device of FIG. 98 is not limited. The electronic device can be applied to 1) mobile devices such as smart phone and mobile PC, 2) floortype household appliances such as DTV, STB, home theatre, DVD player, audio system, and TV-based game console, 3) floortype office machines such as digital conference system, table top device, copier, printer, and multi-functional machine, and 4) outdoor display devices installed in a large-scale store or a public place, such as advertising display and guiding display.

The present invention can be realized using a basic driving program for driving the electronic device and an application program executed in the electronic device, the program installed to the devices can be applied to the electronic device, and the program can be provided as a CD bundle and wirelessly downloaded via Internet or a mobile communication network.

As set forth above, various UIs can be provided based on the touch pressure applied by the user in the touch screen. Thus, the user convenience and entertainment can be improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a User Interface (UI) of an electronic device, the method comprising:
    displaying three touch points to receive touch inputs;
    detecting touch pressures of touch inputs through a touch screen of the electronic device;
    unlocking the electronic device when each of the touch pressures of the touch inputs is within a predetermined magnitude range,
    wherein the detecting comprises:
        when a first touch pressure of the touch pressures is under the predetermined magnitude range, displaying a three-layered circle having a filled innermost circle, an unfilled middle circle, and an unfilled outermost circle, on a first touch point which corresponds to the first touch pressure;
        when a second touch pressure of the touch pressures is above the predetermined magnitude range, displaying a three-layered circle having the filled innermost circle, a filled middle circle, and a filled outermost circle, on a second touch point which corresponds to the second touch pressure;
        when a third touch pressure of the touch pressures is within the predetermined magnitude range:
            displaying a three-layered circle having the filled innermost circle, the filled middle circle, and the unfilled outermost circle, on a third touch point which corresponds to the third touch pressure; and
            when the third touch pressure, which is within the predetermined magnitude range, is sustained for a predetermined time, changing the displayed three-layered circle having the filled innermost circle, the filled middle circle, and the unfilled outermost circle to a different shape from the three-layered circle having the filled innermost circle, the filled middle circle, and the unfilled outermost circle; and
    wherein the unlocking comprises unlocking the electronic device when each of the three touch points is changed to the different shape from the three-layered circle; and
    controlling the electronic device, based on a touch pressure.

2. The method of claim 1, wherein the controlling comprises adjusting a size or a zoom of a Graphical User Interface (GUI) element displayed in the touch screen, based on the touch pressure.

3. The method of claim 2, wherein the controlling comprises controlling a speed of the GUI element displayed in the touch screen, based on the touch pressure.

4. The method of claim 2, wherein the controlling further comprises:
    changing an object to be adjusted, from the GUI element to another GUI element; and
    adjusting a size or a zoom of the another GUI element.

5. The method of claim 1, wherein the controlling comprises controlling at least one of a size, a movement, and a rotation of a GUI element displayed in the touch screen, based on the touch pressure.

6. The method of claim 1, wherein the controlling comprises controlling at least one of a thickness, a saturation, and a color of a GUI element displayed in the touch screen, based on the touch pressure.

7. The method of claim 1, wherein the controlling comprises controlling a speed of a GUI element displayed in the touch screen, based on the touch pressure.

8. The method of claim 7, wherein the speed of the GUI element is one of a speed for moving the GUI element, a speed for turning the GUI element, and a speed for playing the GUI element.

9. The method of claim 1, wherein the controlling comprises controlling a movement of a GUI element given a weight, based on the touch pressure.

10. The method of claim 1, wherein the controlling comprises controlling at least one of an acoustic output and a tactile output of the electronic device, based on the touch pressure.

11. The method of claim 1, wherein the controlling comprises selecting or executing a menu item, based on the touch pressure.

12. The method of claim 1, wherein the controlling comprises controlling a mode of the electronic device, based on the touch pressure.

13. The method of claim 1, wherein the controlling comprises controlling a wireless output of the electronic device, based on the touch pressure.

14. An electronic device, comprising:
a touch screen configured to:
display three touch points to receive touch inputs, and
detect touch pressures of touch inputs by a user, through a touch screen of the electronic device; and
a control part configured to:
unlock the electronic device when each of the touch pressures of the touch inputs is within a predetermined magnitude range, and
control operations, based on the touch pressures,
wherein the control part is further configured to:
when a first touch pressure of the touch pressures is under the predetermined magnitude range, display a three-layered circle having a filled innermost circle, an unfilled middle circle, and an unfilled outermost circle, on a first touch point which corresponds to the first touch pressure,
when a second touch pressure of the touch pressures is above the predetermined magnitude range, display a three-layered circle having the filled innermost circle, a filled middle circle, and a filled outermost circle, on a second touch point which corresponds to the second touch pressure,
when a third touch pressure of the touch pressures is within the predetermined magnitude range:
display a three-layered circle having the filled innermost circle, the filled middle circle, and the unfilled outermost circle, on a third touch point which corresponds to the third touch pressure; and
when the third touch pressure, which is within the predetermined magnitude range, is sustained for a predetermined time, change the displayed three-layered circle having the filled innermost circle, the filled middle circle, and the unfilled outermost circle to a different shape from the three-layered circle having the filled innermost circle, the filled middle circle, and the unfilled outermost circle; and
unlock the electronic device when each of the three touch points is changed to the different shape from the three-layered circle.

\* \* \* \* \*